United States Patent
Fujita et al.

(10) Patent No.: US 6,754,560 B2
(45) Date of Patent: Jun. 22, 2004

(54) ROBOT DEVICE, ROBOT DEVICE ACTION CONTROL METHOD, EXTERNAL FORCE DETECTING DEVICE AND EXTERNAL FORCE DETECTING METHOD

(75) Inventors: Masahiro Fujita, Saitama (JP); Tsuyoshi Takagi, Kanagawa (JP); Rika Hasegawa, Chiba (JP); Osamu Hanagata, Tokyo (JP); Jun Yokono, Kanagawa (JP); Gabriel Costa, Tokyo (JP); Hideki Shimomura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/980,132

(22) PCT Filed: Apr. 2, 2001

(86) PCT No.: PCT/JP01/02867

§ 371 (c)(1),
(2), (4) Date: Mar. 14, 2002

(87) PCT Pub. No.: WO01/72478

PCT Pub. Date: Oct. 4, 2001

(65) Prior Publication Data

US 2002/0158599 A1 Oct. 31, 2002

(30) Foreign Application Priority Data

Mar. 31, 2000 (JP) ........................................ 2000-101364
Sep. 14, 2000 (JP) ........................................ 2000-280871

(51) Int. Cl.⁷ .............................................. G06F 19/00
(52) U.S. Cl. .................... 700/245; 700/31; 700/246; 700/253; 700/257; 700/258; 700/264; 345/174; 345/823; 318/568.12
(58) Field of Search ................................ 700/245, 246, 700/31, 253, 264, 257, 258, 260; 345/174, 823; 178/20.01; 318/568.12

(56) References Cited

U.S. PATENT DOCUMENTS 4,698,461 A * 10/1987 Meadows et al. ........... 345/174
4,707,845 A * 11/1987 Krein et al. .............. 178/20.01
5,119,079 A *  6/1992 Hube et al. .................. 345/823
5,963,663 A    10/1999 Tani ............................ 382/153
6,175,772 B1 *  1/2001 Kamiya et al. ............... 700/31
2001/0001318 A1 *  5/2001 Kamiya et al. ............. 700/246

FOREIGN PATENT DOCUMENTS

| JP | 63-156672 | 6/1988 |
| JP | 9-81205 | 3/1997 |
| JP | 10-83455 | 3/1998 |
| JP | 11-143849 | 5/1999 |

OTHER PUBLICATIONS

Shimoga et al., Touch and force reflection for telepresence surgery, 1994, IEEE, pp. 1049–1050.*

Mascaro et al., Virtual switch human–machine interface using fingernail touch, 1999, IEEE, pp. 2533–2538.*

Bischoff, Advances in the development of humanoid service robot HERMES, 1999, Internet, pp. 1–6.*

Hwang et al., Implementation of an intelligent roving robot using multiple sensors, 1994, IEEE, pp. 763–770.*

* cited by examiner

Primary Examiner—William A. Cuchlinski, Jr.
Assistant Examiner—McDieunel Marc
(74) Attorney, Agent, or Firm—Frommer Lawrence & Haug LLP; William S. Frommer; Dennis M. Smid

(57) ABSTRACT

A robot is proposed which has a speech recognition unit to detect information supplied simultaneously with or just before or after detection of a touch by a touch sensor, an associative memory/recall memory to store action made correspondingly to the touch and input information (speech signal) detected by the speech recognition unit in association with each other, and an action generator to control the robot to make action recalled by the associative memory/recall memory based on a newly acquired input information (speech signal). The robot has also a sensor data processor to allow the robot to act correspondingly to the touch detection by the touch sensor. Thus, the robot can learn action in association with an input signal such as speech signal.

29 Claims, 38 Drawing Sheets

IMAGE FEATURE SPACE

SOUND FEATURE SPACE

THIRD FEATURE SPACE

ROBOT DEVICE, ROBOT DEVICE ACTION CONTROL METHOD, EXTERNAL FORCE DETECTING DEVICE AND EXTERNAL FORCE DETECTING METHOD

TECHNICAL FIELD

The present invention generally relates to a robot apparatus, method for controlling the action of the robot apparatus, and an external-force detecting apparatus and method.

BACKGROUND ART

Conventionally, the knowledge acquisition or language acquisition are based mainly on the associative memory of visual information and audio information.

The "Learning Words from-Natural Audio-Visual Input" (by Deb Roy and Alex Pentland) (will be referred to as "Document 1" hereinunder) discloses the study of language learning from input speech and input image. The learning method in the Document 1 is as will be outlined below.

Image signal and speech signal (acoustic signal) are supplied to a learning system simultaneously with each other or at different times. In the Document 1, the event of image and speech in such a pair supplied simultaneously with each other or at different times is called "AV event".

When the image signal and speech signal are thus supplied, an image processing is made to detect a color and shape from the image signal by an image processing, while a speech processing is made to detect a recurrent neural network from the speech signal and make a phonemic analysis of the speech signal. More particularly, the input image is classified to each class (class for recognition of a specific image or image recognition class) based on a feature in the image feature space, while the input speech is classified to each class (class for recognition of a specific sound or sound recognition class) based on a feature in the sound feature space. The feature space is composed of a plurality of elements as shown in FIG. 1. For example, for the image signal, the feature space is composed of a two-dimensional or multi-dimensional space of which the elements are color-difference signal and brightness signal. Since the input image has a predetermined mapping of elements thereof in such a feature space, color can be recognized based on the element mapping. In the feature space, the classification is made in view of a distance to recognize a color.

For recognition of a sound for example, the continuous recognition HMM (hidden Markov model) method is employed. The continuous recognition HMM method (will be referred to simply as "HMM" hereunder) permits a speech signal to be recognized as a phoneme sequences. Also, the above recurrent neural network is a one through which a signal feed back to the input layer side.

Based on a correlation concerning a concurrence (correlative learning), a classified phoneme is correlated with a stimulus (image) classified by the image processing for the purpose of learning. That is, a name and description of a thing indicated as an image are acquired as a result of the learning.

As shown in FIG. 2, in the above learning, an input image is identified (recognized) according to image classes including "red thing", "blue thing", . . . each formed from image information, while an input speech is identified (recognized) according to classes including uttered "red", "blue", "yellow", . . . formed from sound information.

Then the image and speech classified as in the above are correlated with each other by the correlative learning, whereby when "a red thing" is supplied as an input image, a learning system 200 in FIG. 2 can output an phoneme sequences of "red" (uttered) as a result of the correlative learning.

Recently, there has been proposed a robot apparatus which can autonomously behave in response to a surrounding environment (external factor) and internal state (internal factor such as state of an emotion or instinct). Such a robot apparatus (will be referred to as "robot" hereunder) is designed to interact with the human being or environment. For example, there have been proposed so-called pet robots and the like each having a shape like an animal and behaving like the animal.

For example, capability of having such a robot learn various kinds of information will lead to an improvement of its amusement. Especially the capability of learning action or behavior will enhance the fun to play with the robot.

The application of the aforementioned learning method (as in the Document 1) to a robot designed to be controllable to act encounters the following problems.

First, the above learning method is not appropriately set to control the robot to act.

As disclosed in the Document 1, utterance will create and output an appropriate phoneme sequences if a stored word is created in response to an input signal or the input signal is judged to be a new signal. However, the robot is not required to utter an input signal as it is for the interaction with the human being or environment but it is required to act appropriately in response to an input.

Also, when classified based on a distance in the image feature space and sound feature space, acquired image and speech will be information near to each other in the image and sound feature spaces. However, the robot is required to act differently in response to the image and speech in some cases. In such a case, the classification has to be done for appropriate action. However, the conventional methods cannot accommodate such requirements.

The conventional knowledge or language acquisition system includes mainly the following:

(1) Means for classifying image signal and generating new classes (2) Means for classifying acoustic signal and generation new classes (3) Means for correlating results from items (1) and (2) with each other or learning image and sound in association with each other Of course, some of the conventional knowledge or language acquisition systems use other than the above functions. But the above three functions are essential ones for such systems.

The classifications as in the above items (1) and (2) including mapping in a feature space, parametric discrimination of significant signal with a foreseeing knowledge, use of a probabilistic classification, etc.

Generally, an image can be recognized for example by controlling a threshold of a color template for each of colors such as red, blue, green and yellow in the color space or by determining, for a presented color stimulus, a probability of each color based on a distance between an existing color storage area and input color in the feature space. For example, for an area already classified as a feature in a feature space as shown in FIG. 1, a probability of the classification is determined from a distance of an area defined by a feature of an input image from the existing feature area. Also, a method by a neural net is effectively usable for this purpose.

On the other hand, for learning a speech, a phoneme sequences supplied by the HMM through a phoneme detection and a stored phoneme sequences are compared with each other and a word is probabilistically recognized based on a result of the comparison.

The means for generating new classes as in the above items (1) and (2) include the following:

An input signal is evaluated to determine whether it belongs to an existing class. When the input signal is determined to belong to the existing class, it is made to belong to that class and fed back to the classification method. On the other hand, if the input signal is judged not to belong to any class, a new class is generated and a learning is made for the classification to be done based on an input stimulus.

A new class is generated as follows. For example, if an image class is judged not to belong to any existing classes (class of image A, class of image B, . . . ), the existing class (e.g., class of image A) is divided to generate a new image class as shown in FIG. 3A. If a sound class is judged not to belong to any existing classes (class of sound α, class of sound β, . . . ), the existing class (e.g., class of sound β) is divided to generate a new sound class as shown in FIG. 3B.

Also, the association of an image and sound as in the item (3) includes an associative memory or the like.

A discrimination class for an image is called a vector (will be referred to as "image discrimination vector" hereunder) IC [i](i=0, 1, . . . , NIC−1) and a discrimination class for a sound is called a vector (will be referred to as "sound discrimination vector" hereunder) SC[j](j=0, 1, . . . , NSC=1). For an image signal and sound signal presented (supplied for learning), a probability or result of evaluation of each recognition class are set to vector values, respectively.

In a self-recalling associative memory, an image recognition vector IC and sound recognition vector SC are made a single vector given by the following equations (1) and (2):

$$CV[n]=IC[n](0 \leq n<NIC) \quad (1)$$

$$CV[n]=SC[n-NIC](0 \leq n<NSC) \quad (2)$$

Note that in the field of the self-recalling associative memory, the so-called Hopfield net proposed by Hopfield is well known.

The above vectors are made a single vector as will be described below. On the assumption that the vector CV is a column vector, the self-recalling associative memory is made by adding a matrix $delta_{\_W}$ as given by the following equation (3) to a currently stored matrix W:

$$delta_{\_W} = CV \times trans(CV) \quad (3)$$

Thus, an image stimulus (input image) can be regarded as a class and a word as a result of speech recognition (e.g., class of HMM) can be associated with the class. By presenting a new image (e.g., red thing) and entering an speech "red" each of the image and sound classes is depicted in red of the image stimulus to have an appropriate size for a stimulus or distance in the feature space, and similarly, each class reacts to an appropriate extent for the phoneme sequences of the speech "red". These classes are handled as a correlative matrix in the above equations and stochastically averaged so that the image and speech classes have high values with respect to the same stimulus, namely, they have a high correlation between them. Thus, when a red image is presented, an HMM class "red (uttered)" is stored in association with the red image.

On the other hand, the "Perceptually Grounded Meaning Creation" (by Luc Steels, ICMAS, Kyoto, 1996) (will be referred to as "Document 2" hereunder) discloses a meaning acquisition by an experiment called "discrimination game". The discrimination game is as will be outlined below.

The "discrimination game" system includes a plurality of sensor channels and feature detectors not limited for image and sound as in the above. A thing called "agent" (e.g., a software) tries, by means of the feature detectors, to differentiate between a newly presented object and another object (already recognized one), namely, it makes a differentiation between the objects based on a feature. If there exists no feature with which a differentiation between objects can be done, a new feature detector is created which corresponds to the newly presented object. If an object has not a feature with which a differentiation can be done from another object, namely, when a corresponding feature detector is not available for an object, the agent is judged to have won the discrimination game. If an object has a corresponding feature detector, the agent is judged to be a winner of the game.

Then, the entire system works based on the principle of "selectionist". That is, an object having won the game has a higher probability of survival, while an object having lost the game will create a new feature detector. However, the new feature detector will be used in a next game and it is not known whether the detector will provide a correct result. Thus, an agent capable of a better differentiation will survive.

The discrimination game has been outlined in the above. In other words, such a discrimination game may be regarded as a method for creating a better feature detector through a natural selection.

Also, "The Spontaneous Self-Organization of An Adaptive Language" (by Luc Steels, Muggleton, S. (ed.), 1996, Machine, Intelligence 15.) (will be referred to as "Document 3" hereunder) reads an language generation by a "language game" method. The "language game" includes the following three steps:

| | |
|---|---|
| First step: | Propagation |
| Second step: | Creation. In this step, an agent creases a new word and associates it with a new feature. |
| Third step: | Self-organization. In this step, the system organizes itself through sorting and selection. |

More specifically, the language game includes a first step for a so-called image processing, a second step for a word related with language processing (actually, however, no speech is recognized but so-called character is entered), and a third step in which an image acquired in the first step (step 1) is associated with the word. The aforementioned discrimination game has no part equivalent to the second step but it is applied only to a differentiation effected in an existing feature space.

Also, the "Language Acquisition with A Conceptual Structure-Based Speech Input from Perceptual Information" (by Iwasaki and Tamura, Sony Computer Science Laboratory) (will be referred to as "Document 4" hereunder) discloses an acquisition of a grammar using HMM for the speech recognition and a typical pattern (in circular, triangular or other shapes, and red, blue and other colors) in which an image is displayed in colors on a computer monitor for the image recognition.

In the Document 4, the user simultaneously clicks a pointing device or mouse (with a pointer 212 pointed) on a pattern (an object) on a monitor 210 as shown in FIG. 4, and utters "red circle" or the like. The discrimination game theory for color images and speech recognition for HMM are used to effect the first to third steps probabilistically in the language game in the Document 3.

For generation of a new class, a predetermined method for verification is effected. In the method disclosed in the Document 4, when it is judged that a new class should be generated by the verification using HMM for the speech recognition, the HMM is subdivided to generate the new class.

Further, a pattern 211 (first object (Obj 1) selected by pointing the cursor thereto and clicking the mouse is moved onto a second object (Obj2) 213 as indicated with an arrow in FIG. 4, and at the same time, an uttered speech "mount" is supplied to recognize a movement of a pattern, made on the monitor 210. The movement thus recognized is classified by HMM.

As in the foregoing, a variety of techniques for knowledge or language acquisition has been proposed. However, these techniques are not advantageous as in the following concerning the aspect of action acquisition (action learning) in the robot.

(1) Evaluation of distance in feature space and belongingness to a class, of input signal
(2) Creation and evaluation of action
(3) Sharing of target object between robot and user. So-called target object sharing The above problem (1) is difficult to solve since evaluation of the belongingness of an input image signal to a class is influenced only by information related to the image signal, sound signal supplied at the same time or by stored information recalled based on the two signal. Note that a belongingness-to-class evaluation is an index for a class to which of classes an input signal belongs.

Assume here that there has been entered an image signal considered very near to image signals in an existing class in the feature space. In this case, classes A and B are near to each other in the image feature space as shown in FIG. 5A. However, it is assumed that the image signal thus entered is intended to generate a new class.

On the other hand, if there is made under these conditions a judgment that a speech signal has been entered as other information on an object corresponding to the image signal and the input speech signal is very far from the existing classes, a new class for the speech signal will be generated for the object. So, it is assumed for example that as shown in FIG. 5B, a class of sound α (sound class corresponding to the class of image A) and a class of sound β (sound class corresponding to the class of image B) are mapped differently in the sound feature space and so a threshold $S_2$ can be set.

Therefore, if the belongingness-to-class evaluation of a sound, made based on the feature space, can reflect the belongingness-to-class evaluation of an image, it is possible to generate a new class for the image. For example, by reflecting the belongingness-to-class evaluation in the sound feature space, there can be set a threshold $S_1$ between the classes of images A and B near to each other to differentiate between the classes as shown in FIG. 5A. That is, by making reference to any other belongingness-to-class evaluation, belongingness to a class can be effected more appropriately.

However, if classes of image signal or speech signal are very near to each other, the above is not sufficient to generate a new class for the image or speech. It means that when image classes or sound classes are near to each other in their respective feature space as shown in FIGS. 6A and 6B, they cannot be differentiated between them even if they have quite different features from each other as viewed from a third feature space. The third feature space may be indicative of a feature of action.

Accordingly, the present invention has an object to overcome the above-mentioned drawbacks of the prior art by providing a robot apparatus and a method for controlling the action of the robot apparatus, adapted to appropriately differentiate objects in their respective feature spaces.

The above problem (2) is to generate, when a signal to be judged to belong to a new class is supplied to the robot apparatus, new action of the robot apparatus and to evaluate the new action.

With the conventional technique, evaluation of a language creation corresponds to evaluation of generated action. With the technique disclosed in the Document 3, an arbitrary phoneme sequences is generated. It will be a name or the like of an object contained in an input signal, maybe, an image signal. However, any arbitrary motion series should not be generated to generate action.

For example, even if there is generated an arbitrary series of each joint angle of the robot apparatus having four legs having a 3 degree of freedom for example, the robot apparatus will not make any meaningful motion. When a language is generated, the phoneme sequences of the language will only be a name of the object. However, it will be a problem how to evaluate generated action, good or not good.

Also the present invention has another object to overcome the above-mentioned drawbacks of the prior art by providing a robot apparatus and a method for controlling the action of the robot apparatus, adapted to generate appropriate action for an input.

The above-mentioned problem (3) is the so-called target object sharing (shared attention). This problem is caused by the fact that information perceived by the robot apparatus is very variable. For example, even when the user or trainer tries to teach the robot apparatus by holding an orange ball in a direction not towards the image signal input unit (e.g., CCD camera) of the robot apparatus and uttering "orange ball", if an object within the field of view of the robot apparatus is a pink box, the "pink" box will be associated with the speech "orange ball".

In the Document 4, the pattern 211 on the monitor 210 is designated as a target object by pointing the cursor to the pattern 211 and clicking the mouse. Actually, however, there is not available any means for pointing or designating such a target object. Even in case the theories disclosed in the Documents 2 and 3 are applied to the robot apparatus, the trainer or user of the robot apparatus will select at random one of some things in his or her field of view and utter the name of the thus-selected thing based on his memory to direct the robot apparatus's attention towards the selected thing as a target object to be recognized by the robot apparatus. Actually, however, this is not any learning by which the robot apparatus can recognize the target object.

Also the present invention has another object to overcome the above-mentioned drawbacks of the prior art by providing a robot apparatus and a method for controlling the action of the robot apparatus, adapted to share a target object (attention sharing) in order to appropriately recognize the target object.

The conventional robot apparatus detects an external force applied to the head or the other thereof via a touch sensor or the like provided at the head, thereby interacting with the user. However, the interaction will be limited by the number of sensors provided and location of the latter.

DISCLOSURE OF THE INVENTION

Accordingly, the present invention has an object to overcome the above-mentioned drawbacks of the prior art by providing a robot apparatus, external force detector and a method for detecting an external force, capable of assuring a higher degree of freedom in interaction with a touch (external force) by the user.

The present invention has another object to provide a robot apparatus and a method for controlling the action of the robot apparatus capable of appropriately recognizing each object in its feature space.

The present invention has another object to provide a robot apparatus and a method for controlling the action of the robot apparatus, capable of generating appropriate action in response to an input.

The present invention has another object to provide a robot apparatus and a method for controlling the action of the robot apparatus, capable of sharing a target object (attention sharing) to appropriately recognize the target object.

The present invention has another object to provide a robot apparatus, external force detector and a method for detecting external force, capable of assuring a higher degree of freedom in interaction with a touch (external force) by the user.

The above object can be attained by providing a robot apparatus including:
- means for detecting a touch;
- means for detecting information supplied simultaneously with, just before or after the touch detection by the touch detecting means;
- means for storing action made correspondingly to the touch detection in association with the input information detected by the input information detecting means; and
- means for recalling action from information in the storing means based on a newly acquired information to control the robot apparatus to do the action.

In the above robot apparatus, information supplied just before or after the touch detection by the touch detecting means is detected by the input information detecting means, action made in response to the touch and input information detected by the input information detecting means are stored in association with each other into the storing means, and action is recalled by the action controlling means from information in the storing means based on a newly acquired input information to control the robot apparatus to do the action.

Thus, in the above robot apparatus, input information and action made when the input information has been detected are stored in association with each other, and when information identical to the input information is supplied again, corresponding action is reproduced.

Also the above object can be attained by providing a method for controlling the action of a robot apparatus, including the steps of:
- detecting a touch made to the robot apparatus;
- detecting information supplied simultaneously with or just before or after the touch detection in the touch detecting step;
- storing action made in response to the touch detection in the touch detecting step and input information detected in the input information detecting step in association with each other into a storing means; and
- recalling action from the information in the storing means based on newly acquired input information to control the robot to do the action.

In the above robot apparatus action controlling method, input information and action made when the input information has been detected are stored in association with each other, and when information identical to the input information is supplied again, corresponding action is reproduced.

Also the above object can be attained by providing a robot apparatus including:
- means for detecting input information;
- means for storing the input information detected by the input information detecting means and action result information indicative of a result of action made correspondingly to the input information detected by the input information detecting means; and
- means for identifying action result information in the storing means based on a newly supplied input information to control the robot apparatus to do action based on the action result information.

In the above robot apparatus, action result information indicative of a result of action made correspondingly to the input information detected by the input information detecting means and the input information are stored in association with each other into the storing means, and action result information in the storing means is identified based on a newly supplied input information to control the robot apparatus to do action based on the action result information.

Thus in the above robot apparatus, input information and action result information indicative of action made correspondingly to the input information are stored in association with each other, and when identical information is supplied again, past action is recalled based on the action result information corresponding to the input information to control the robot apparatus to do appropriate action.

Also the above object can be attained by providing a method for controlling the action of a robot apparatus, including the steps of:
- storing action result information indicative of a result of action made correspondingly to input information detected by an input information detecting means and the input information itself in association with each other into a storing means; and
- identifying action result information in the storing means based on newly supplied input information to control the robot apparatus to make action based on the action result information.

By the above robot apparatus action controlling method, the robot apparatus stores input information and action result information indicative of a result of action made based on the input information in association with each other, and when identical input information is supplied again, past action is recalled based on action result information corresponding to the input information to control the robot apparatus to do appropriate action.

Also the above object can be attained by providing a robot apparatus including:
- means for detecting input information;
- means for detecting a feature of the input information detected by the input information detecting means;
- means for classifying the input information based on the detected feature;
- means for controlling the robot apparatus to do action based on the input information; and
- means for changing the classification of the input information having caused the robot apparatus to do the action based on action result information indicative of a result of the action made by the robot apparatus under the control of the action controlling means.

In the above robot apparatus, a feature of input information detected by the input information detecting means is detected by the feature detecting means, the input information is classified based on the detected feature, the robot apparatus is controlled by the action controlling means to act based on the classification of the input information, and the classification of the input information, having caused the robot apparatus action, is changed based on action result information indicative of a result of the action made by the robot apparatus under the control of the action controlling means.

Thus the above robot apparatus acts correspondingly to the classification of input information and changes the classification based on a result of the action.

Also the above object can be attained by providing a method for controlling the action of a robot apparatus, including the steps of:

detecting a feature of input information detected by an input information detecting means;

classifying the input information based on the feature detected in the feature detecting step;

controlling the robot apparatus to act based on the classification of the input information, made in the information classifying step; and changing the classification of the input information having caused the robot apparatus to do the action based on action result information indicative of a result of the action made by the robot apparatus controlled in the action controlling step.

By the above robot apparatus action controlling method, the robot apparatus is controlled to act correspondingly to the classification of input information and changes the classification based on a result of the action.

Also, the above object can be attained by providing a robot apparatus including:

means for identifying a target object;

means for storing information on the target object identified by the target object identifying means; and means for controlling the robot apparatus to act based on information on a newly detected object and information on the target object, stored in the storing means.

The above robot apparatus stores information on a target object identified by the target object identifying means into the storing means, and is controlled by the action controlling means to act based on the information on the newly detected object and information on the target object, stored in the storing means.

Thus the above robot apparatus stores a target object, and when information on an identical object is supplied again, the robot apparatus makes predetermined action.

Also, the above object can be attained by providing a method for controlling the action of a robot apparatus, including the steps of:

identifying a target object;

storing information on the target object identified in the target object identifying step into a storing means; and controlling the robot apparatus to act based on information on a newly detected object and information on the target object, stored in the storing means.

By the above robot apparatus action controlling means, the robot apparatus stores a target object, and when an identical object is supplied again, the robot apparatus makes predetermined action.

Also the above object can be attained by providing a robot apparatus including:

moving members, joints to move the moving members, detecting means for detecting the state of the joint to which an external force is applied via the moving member; and means for learning the joint state detected by the detecting means and external force in association with each other.

In the above robot apparatus, the state of the joint to which an external force is applied via the moving member can be detected by the detecting means and the joint state detected by the detecting means and external force are learned in association with each other by the learning means. That is, the robot apparatus learns an external force in association with a joint state which varies correspondingly to the external force acting on the moving member.

Also, the above object can be attained by providing an external force detector including:

means for detecting the state of a joint which moves a moving member; and means for detecting an external force acting on the moving member based on the joint state detected by the joint state detecting means.

In the above external force detector, the state of the joint which moves the moving member is detected by the joint state detecting means and the external force acting on the moving member is detected based on the joint state detected by the joint state detecting means. Namely, the external force detector detects an external force acting on the moving member based on the state of a joint which moves the moving member.

Also, the above object can be attained by providing a method for detecting an external force, including the steps of:

detecting the state of a joint which moves a moving member;

detecting an external force acting on the moving member based on the detected joint state; and detecting the external force acting on the moving member based on the state of the joint which moves the moving member.

BEST MODE FOR CARRYING OUT THE INVENTION

The best mode for carrying out the present invention will be described in detail with reference to the accompanying drawings. The best mode concerns an autonomous robot apparatus which autonomously behaves correspondingly to its surrounding environment (external factor) or internal state (internal factor).

First the construction of the robot apparatus will be described, and then the applications of the present invention to the robot apparatus will be described in detail.

(1) Construction of the Robot Apparatus According to the Present Invention

Figure 7:
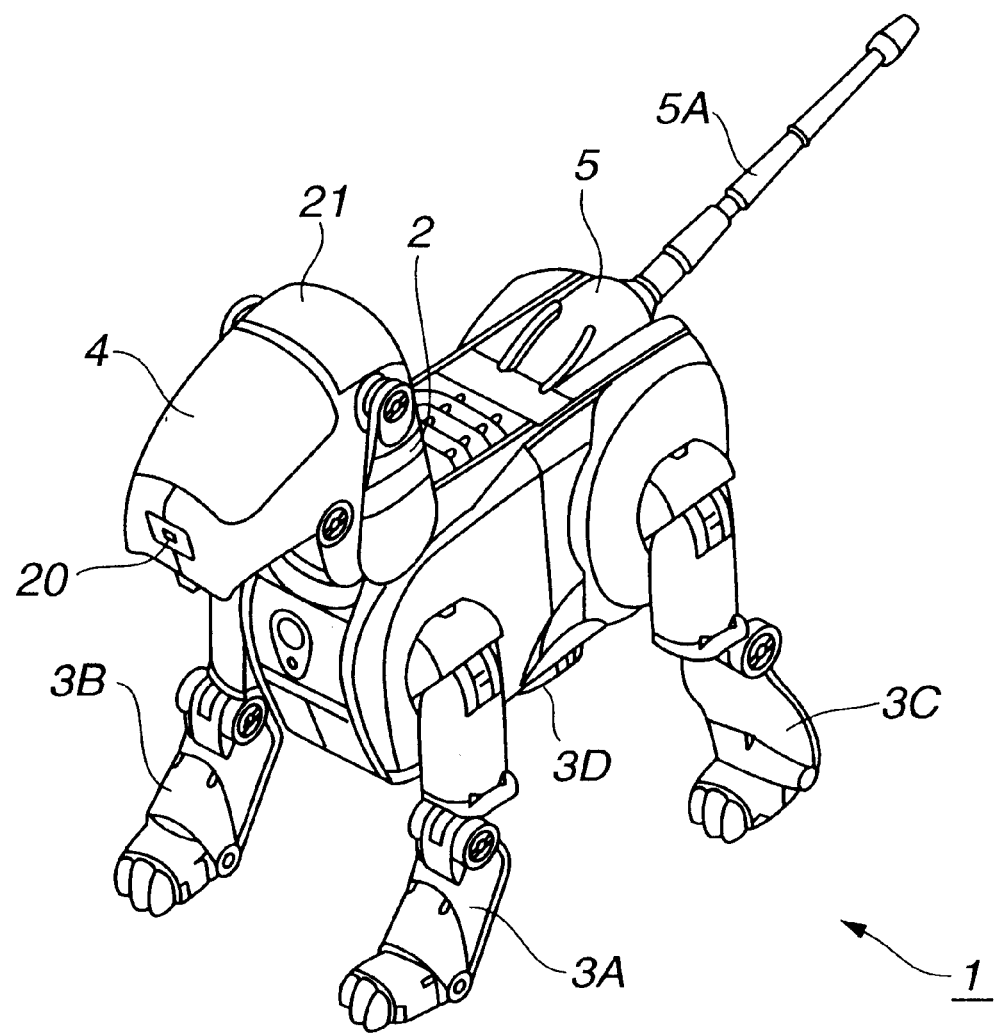
FIG. 7 is a perspective view of a robot apparatus according to the present invention.

As shown in FIG. 7, the robot apparatus (will be referred to simply as "robot" hereunder) is generally indicated with a reference 1. It is a pet robot shaped in the similitude of a "dog". As shown, the robot 1 includes a body unit 2, leg units 3A to 3D joined to the front right and left and rear right and left, respectively, of the body unit 2, and a head unit 4 and tail unit 5 joined to the front and rear ends, respectively, of the body unit 2.

Figure 8:
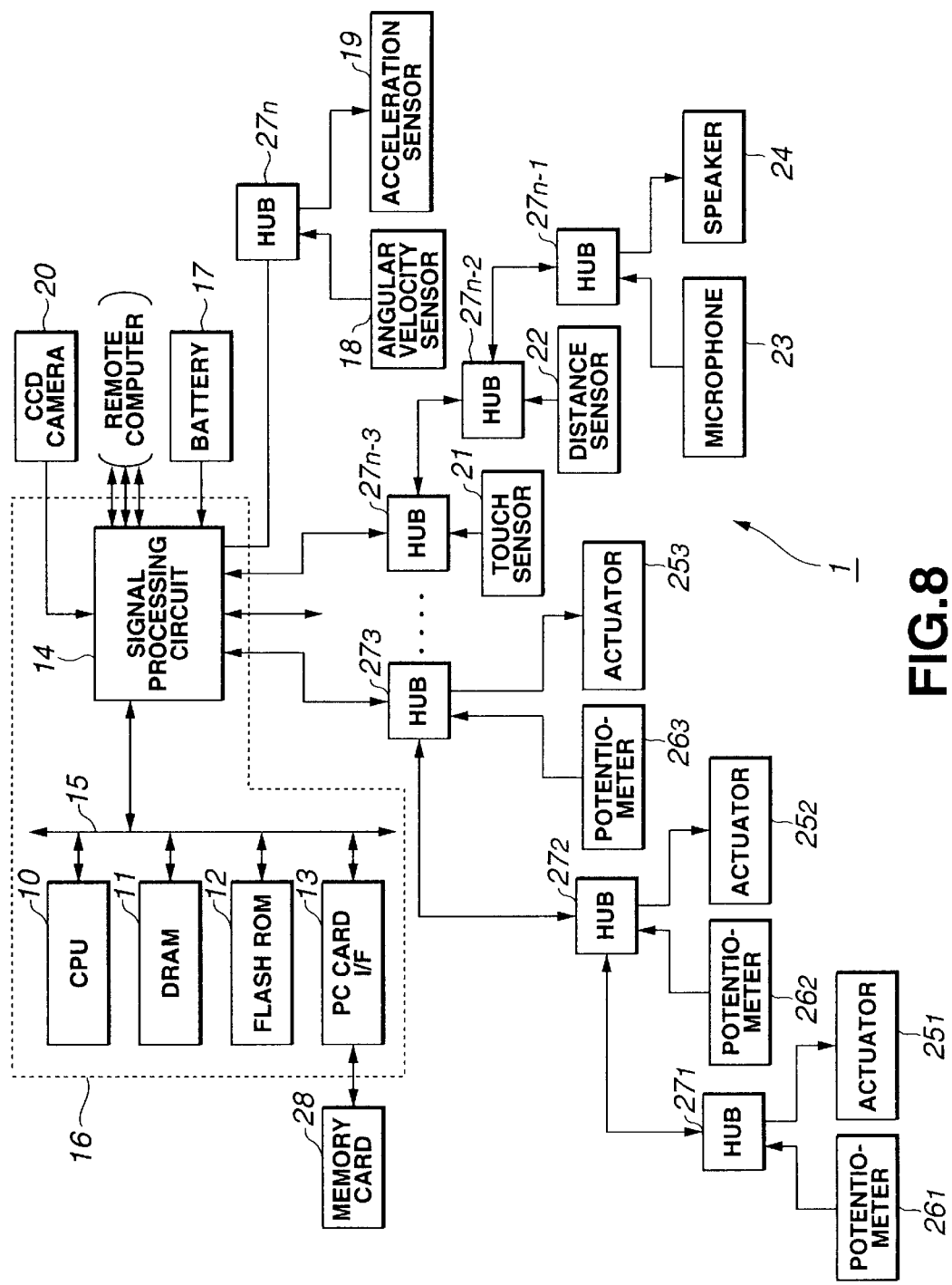
FIG. 8 is a block diagram of the circuit configuration of the robot apparatus in FIG. 7.

As shown in FIG. 8, the body unit 2 houses a CPU (central processing unit) 10, DRAM (dynamic random-access memory) 11, flash ROM (read-only memory) 12, PC (personal computer) card interface circuit 13 and a signal processing circuit 14, all connected to each other via an internal bus 15 to form a controller 16, and further a battery 17 to supply a power to the robot 1. Further the body unit 2 houses an angular velocity sensor 18 and acceleration sensor 19, to detect the orientation and acceleration of the robot 1, etc.

The head unit 4 houses a CCD (charge coupled device) camera 20 to image the environment surrounding the robot 1, a touch sensor 21 to detect a pressure given to the robot 1 as physical action such as "patting" or "hitting" by the user, a distance sensor 22 to measure a distance to an object existing before the robot 1, a microphone 23 to collect external sounds, a speaker 24 to output a sound such as barking, LEDs (light emitting diode) (not shown) as "eyes" of the robot 1, and so on, disposed in place, respectively.

Further, actuators $25_1$ to $25_n$ and potentiometers $26_1$ to $26_n$ are disposed in joints of the leg units 3A to 3D, articulations between the leg units 3A to 3D and body unit 2, an articulation between the head unit 4 and body unit 2, and in an articulation between a tail 5A and tail unit 5, respectively. The numbers of actuators and potentiometers used in each joint and articulation depend upon the degree of freedom of the actuator and potentiometer. For example, each of the actuators $25_1$ to $25_n$ uses a servo motor. As the servo motor is driven, the leg units 3A to 3D are controlled to shift to a target posture or motion.

Each of the angular velocity sensor 18, acceleration sensor 19, touch sensor 21, distance sensor 22, microphone 23, speaker 24, LEDs, actuators $25_1$ to $25_n$, and potentiometers $26_1$ to $26_n$ is connected to the signal processing circuit 14 of the controller 16 via a corresponding one of hubs $27_1$ to $27_n$, and CCD camera 20 and battery 17 are connected directly to the signal processing circuit 14.

Note that signals from the angular velocity sensor 18, acceleration sensor 19 and potentiometers $26_1$ to $26_n$ are used in learning of the motion (action) as will further be described later.

The signal processing circuit 14 sequentially acquires data supplied from each of the above sensors (will be referred to as "sensor data" hereinunder), image data and speech data, and stores each of them into place in the DRAM 11 via the internal bus 15. Also the signal processing circuit 14 sequentially acquires data supplied from the battery 17 and indicating the remaining potential in the battery 17, and stores each of them into place in the DRAM 11.

Based on each of the sensor data, image data, speech data and remaining battery potential data thus stored in the DRAM 11, the CPU 10 will control the action of the robot 1.

Actually, after the power is initially supplied to the robot 1, the CPU 10 reads a control program from a memory card 28 set in a PC card slot (not shown) in the body unit 2 or flash ROM 12 via the PC card interface circuit 13 or directly, and stores it into the DRAM 11.

Also, the CPU 10 determines the internal state of the robot 1, environment surrounding the robot 1, the existence of an instruction or action from the user, etc. based on the sensor data, image data, speech data, remaining battery potential data sequentially stored from the signal processing circuit 14 into the DRAM 11 as in the above.

Further, the CPU 10 decides next action based on the determination result and the control program stored in the DRAM 11, and drives the necessary ones of the actuators $25_1$ to $25_n$ for the next action on the basis of the result of determination to thereby shake or nod the head unit 4, wag the tail 5A of the tail unit 5 or drive the leg units 3A to 3D for walking.

Also at this time, the CPU 10 generates speech data as necessary, and supplies it as speech signals to the speaker 24 via the signal processing circuit 14, thereby outputting a voice or speech created from the speech signals, turning on or off or flickering the LEDs.

Thus, the robot 1 autonomously behaves correspondingly to its internal state or surrounding environment, or an instruction or action from the user.

(2) Software Structure of the Control Program

Figure 9:
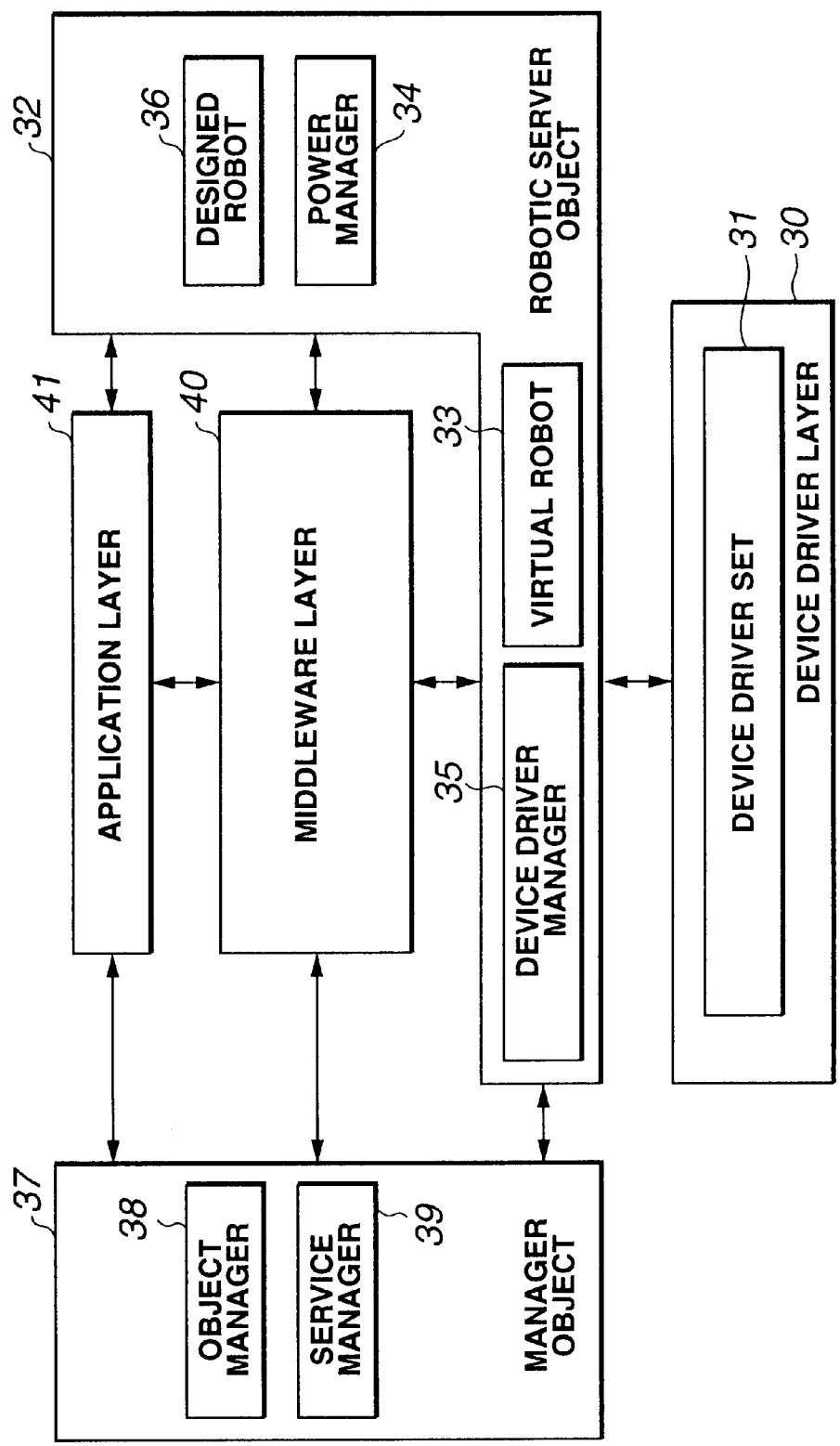
FIG. 9 is a block diagram of the software configuration of the robot apparatus in FIG. 7.

The above control program for the robot 1 has a software structure as shown in FIG. 9. As shown, a device driver layer 30 is positioned in the lowest layer of the control program, and consists of a device driver set 31 including a plurality of device drivers. In this case, each device driver is an object allowed to make a direct access to the CCD camera 20 (see FIG. 8) and an ordinary hardware used in a computer such as a timer, and works with an interruption from an appropriate hardware.

As shown in FIG. 9, a robotic server object 32 is also positioned in the lowest layer of the device driver layer 30. This object 32 consists of, for example, a virtual robot 33 including a software group which provides an interface for access to hardware such as the above-mentioned various sensors, actuators $25_{1\ to\ 25n}$, etc., a power manager 34 including a software group which manages power switching etc., a device driver manager 35 including a software group which manages other various device drivers, and a designed robot 36 including a software group which manages the mechanism of the robot 1.

There is also provided a manager object 37 consisting of an object manager 38 and service manager 39. The object manager 38 is a software group to manage start and termination of each of software groups included in the robotic server object 32, middleware layer 40 and application layer 41, respectively. The service manager 39 is a software group which manages the association between objects on the basis of information on an association between objects stated in an association file stored in the memory card 28 (see FIG. 8).

The middleware layer 40 is positioned above the robotic server object 32 and consists of a software group which provides basic functions of the robot 1 such as image processing, speech processing, etc. The application layer 41 is positioned above the middleware layer 40 and consists of a software group which decides action of the robot 1 based on the result of a process effected by each software group included in the middleware layer 40.

Figure 10:
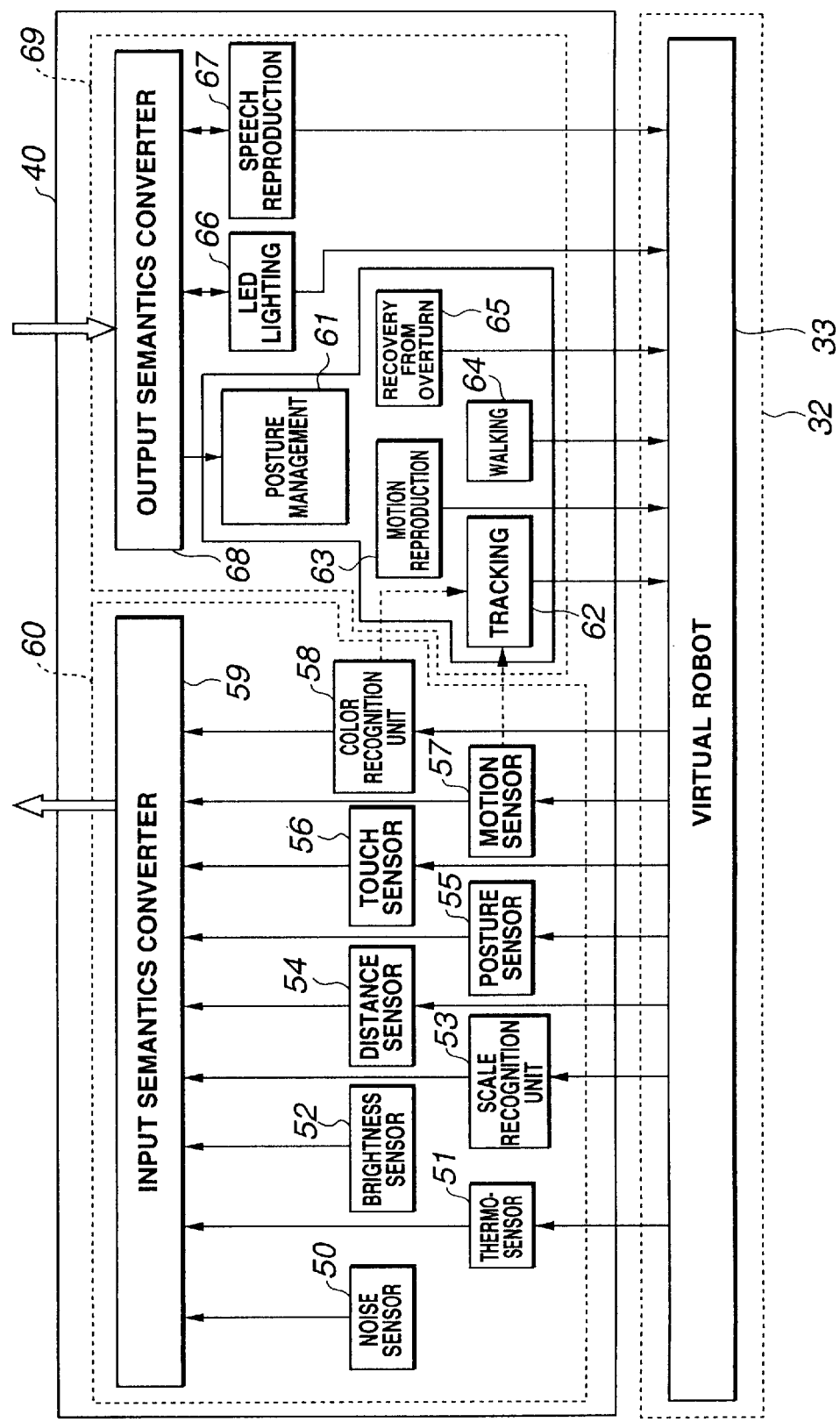
FIG. 10 is a block diagram of a middleware layer in the software configuration in the robot apparatus in FIG. 7.

The software structures of the middleware layer 40 and application layer 41 are shown in detail in FIG. 10.

As shown in FIG. 10, the middleware layer 40 consists of a recognition system 60 including signal processing modules 50 to 58 intended for noise detection, temperature detection, brightness detection, scale detection, distance detection, posture detection, touch sensing, motion detection and color recognition, respectively, and an input semantics converter module 59, and an output system 69 including an output w semantics converter module 68 and signal processing modules 61 to 67 intended for posture management, tracking, motion reproduction, walking, recovery from overturn, LED lighting and speech reproduction, respectively.

The signal processing modules 50 to 58 in the recognition system 60 acquire appropriate ones of sensor data, image data and speech data read from the DRAM 11 (see FIG. 8) by the virtual robot 33 in the robotic server object 32, process the data in a predetermined manner and supply the data processing result to the input semantics converter module 59. In this example, the virtual robot 33 is formed as a function to transfer or convert signals under a predetermined communication rule.

Based on the data processing result supplied from the signal processing modules 50 to 58, the input semantics converter module 59 recognizes the internal state and surrounding environment of the robot 1 such as "noisy", "hot", "bright", "ball was detected", "overturn was detected", "patted", "hit", "musical scale was heard", "moving object was detected" or "obstacle was detected", and an instruction or action from the user, and outputs the recognition result to the application layer 41 (see FIG. 8).

Figure 11:
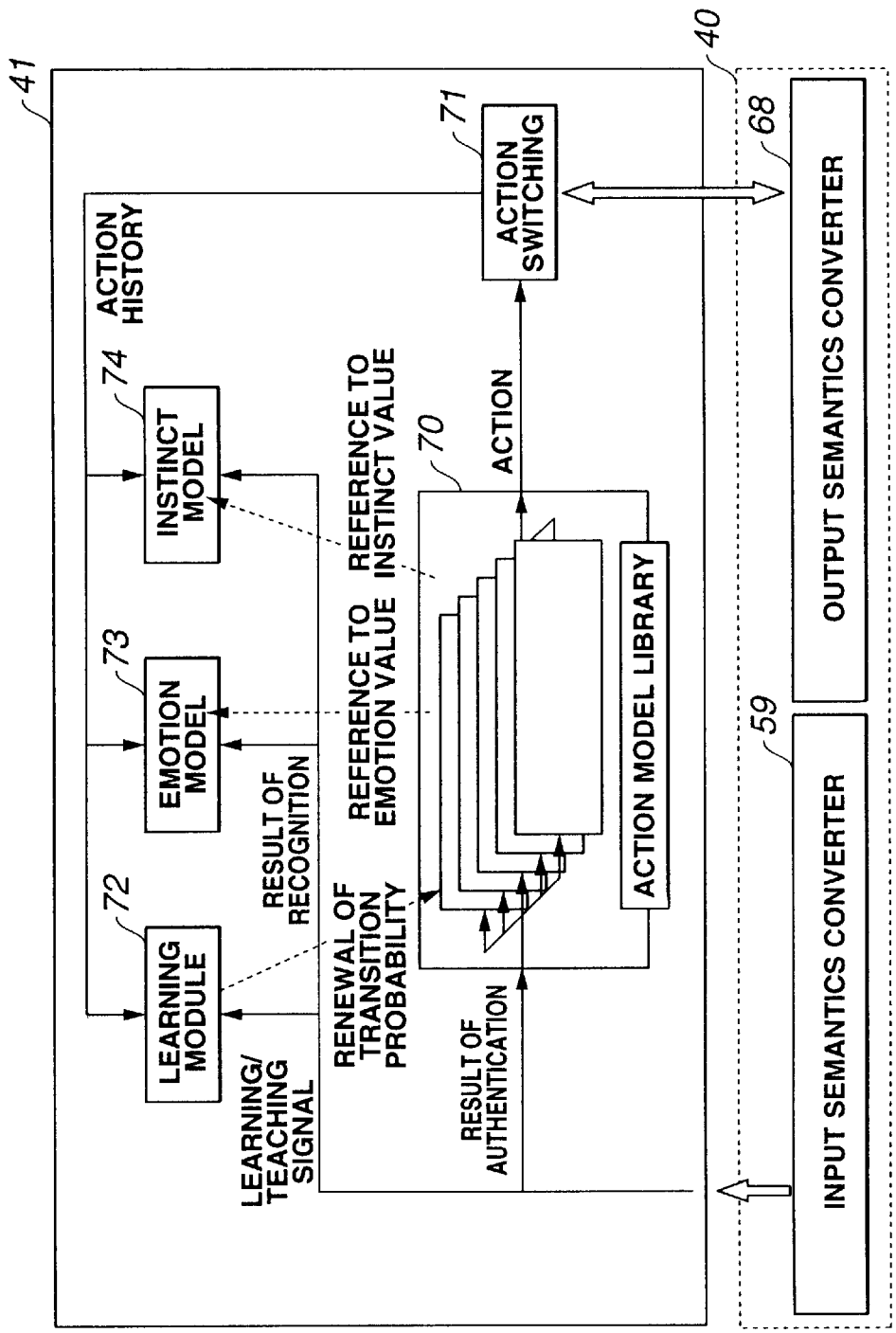
FIG. 11 is a block diagram of an application layer in the software configuration in the robot apparatus in FIG. 7.

As shown in FIG. 11, the application layer 41 is composed of five modules including action model library 70, action switching module 71, learning module 72, emotion module 73 and an instinct module 74.

Figure 12:
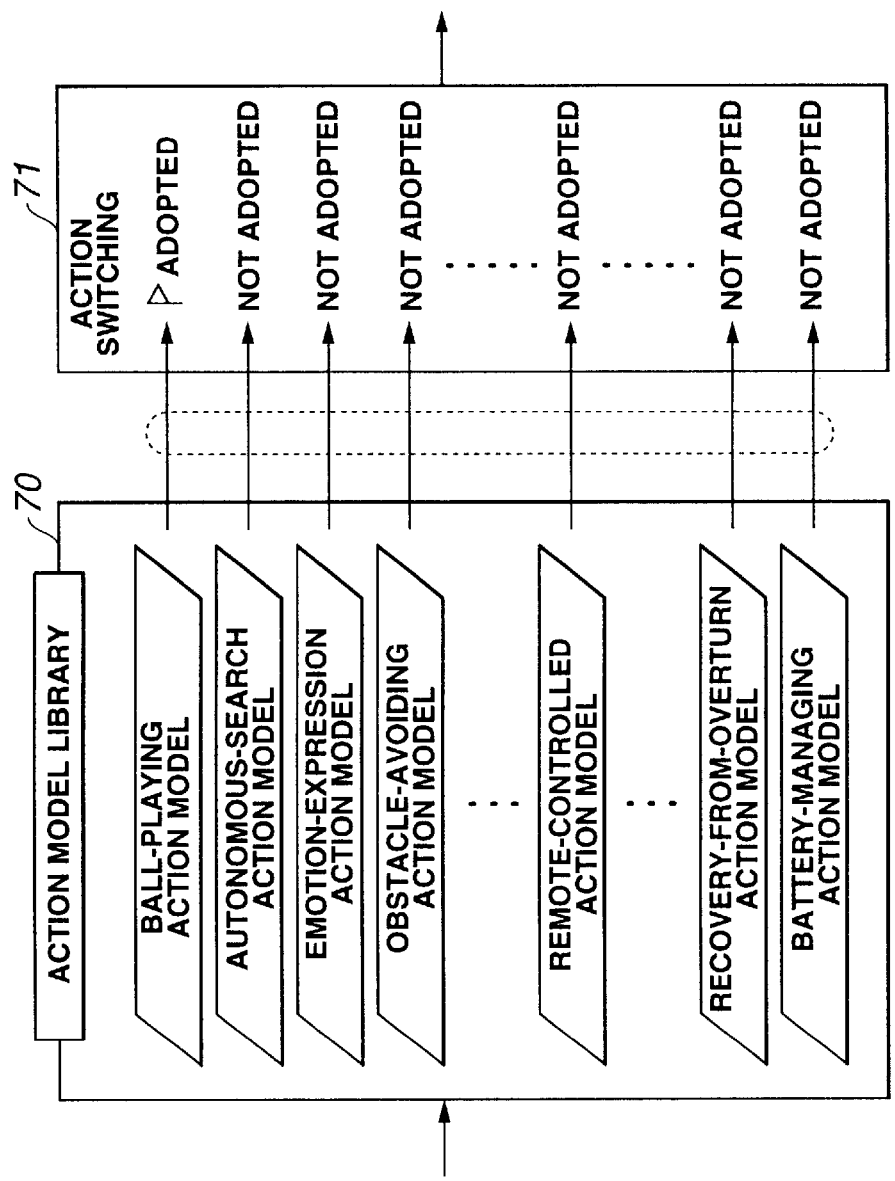
FIG. 12 is a block diagram of action model library in the application layer in FIG. 11.

As shown in FIG. 12, the action model library 70 has provided therein independent action modules $70_1$ to $70_n$ corresponding to some preselected conditional items, respectively, such as "when battery potential has become low", "for recovery from overturn", "for avoiding an obstacle", "for expression of an emotion", "when ball has been detected", etc.

For example, when these action modules $70_1$ to $70_n$ are supplied with the recognition result from the input semantics converter module 59 or when a predetermined time has elapsed after they are supplied with a final recognition result, they decide action for the robot 1 to do next by referring to the parametric value of an appropriate one of the emotions held in the emotion module 73 and the parametric value of an appropriate one the desires held in the instinct module 74 as necessary as will further be described later, and output the decision result to the action switching module 71.

Figure 13:
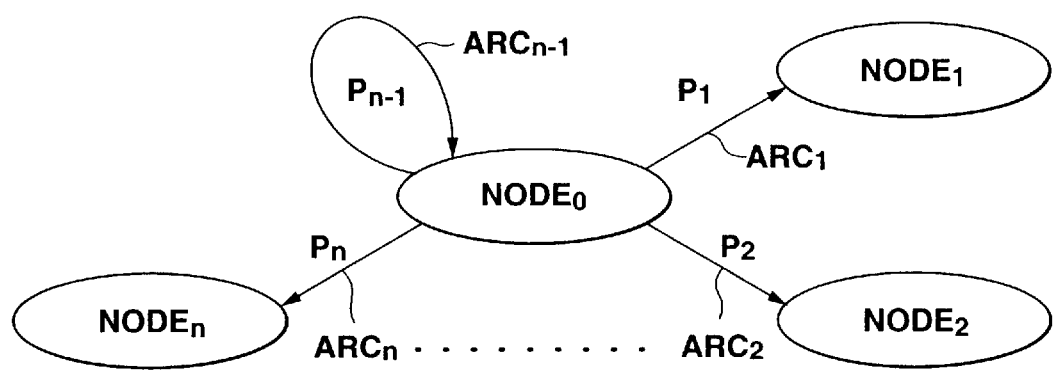
FIG. 13 explains an finite probabilistic automaton being information for determination of action of the robot apparatus.

Note that in this embodiment of the present invention, the action modules $70_1$ to $70_n$ adopt, as a means for decision of next action, an algorithm called "finite probabilistic automaton" to stochastically decide which one of nodes (state) $NODE_0$ to $NODE_n$ shown in FIG. 13 transits and to which other one of them the node transits, based on transition probabilities $P_1$ to $P_n$ set for arcs $ARC_1$ to $ARC_n$, respectively, which provide connections between the nodes $NODE_0$ to $NODE_n$.

Figure 14:
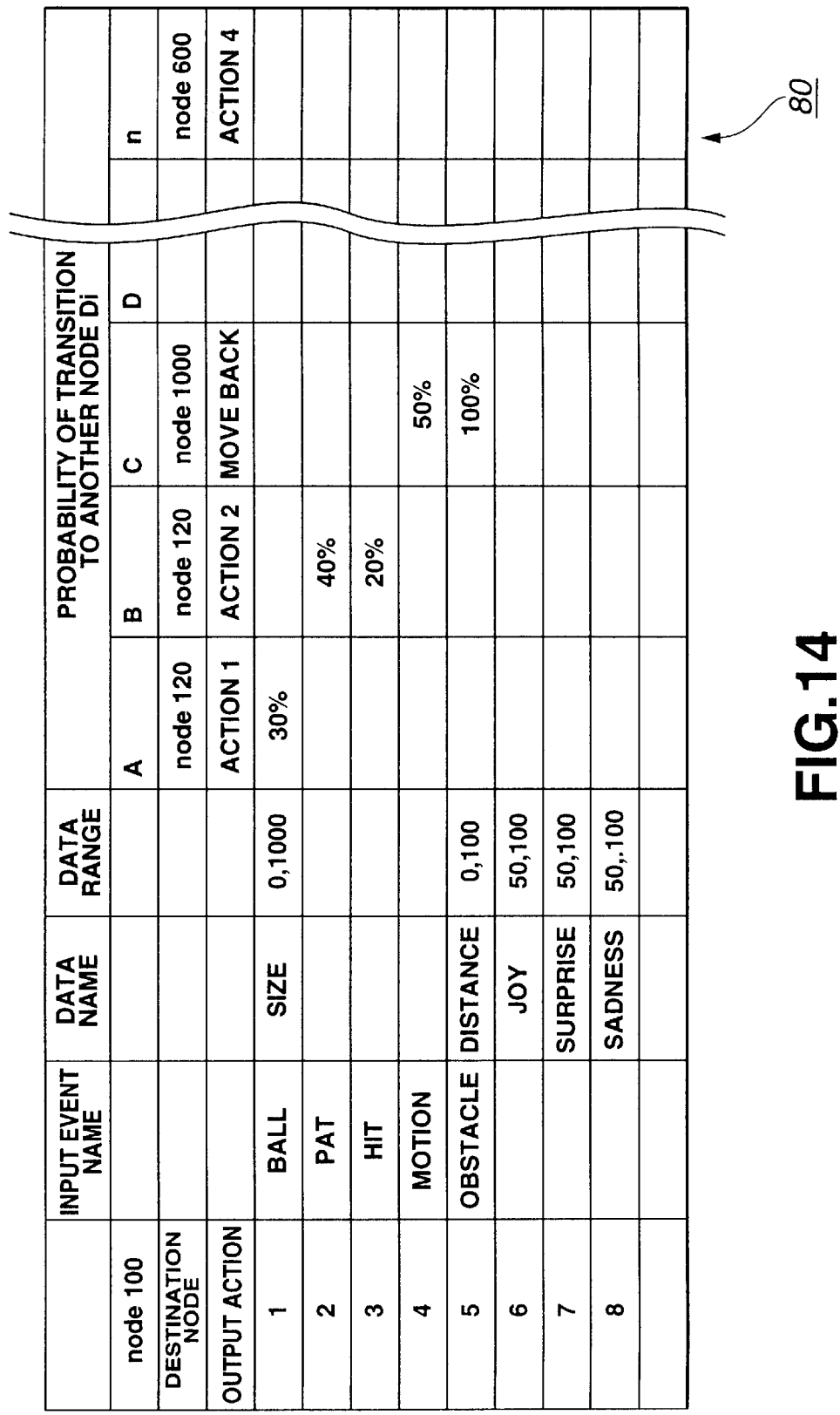
FIG. 14 shows a state transition table prepared in each node in the finite probabilistic automaton.

More specifically, each of the action models $70_1$ to $70_n$ has a state transition table 80 as shown in FIG. 14, corresponding to each of the nodes $NODE_0$ to $NODE_n$ included in the action models $70_1$ to $70_n$, respectively.

That is, in the state transition table 80, input events (recognition results) taken as conditions for transition between the nodes $NODE_0$ to $NODE_n$ are entered in lines covered by an "Input event name" column in the order of precedence, and additional conditional data to the transition conditions are entered in lines covered by "Data name" and "Data range" columns.

Therefore, as shown in the state transition table 80 in FIG. 14, it is a condition for a node $NODE_{100}$ to transit to another node that when the result of recognition that "BALL (robot has detected the ball)" is given, "SIZE (ball size)" given together with the result of recognition is "0, 1000 (0 to 1000)". Also, the node $NODE_{100}$ can transit to another node when "OBSTACLE (the robot 1 has detected an obstacle)" is given as a result of the recognition and "DISTANCE (distance between the obstacle and robot 1)" given along with the result of recognition is "0, 100 (0 to 100)".

Also, the node $NODE_{100}$ can transit to another node when any of the parametric values of those motions "JOY", "SURPRISE" and "SADNESS" held in the emotion model 73, of the emotions and desires held in the emotion model 73 and instinct model 74, respectively, to which the action models $70_1$ to $70_n$ refer, cyclically takes a value of "50, 100 (50 to 100)" even with entry of no result of recognition.

In the state transition table 80, names of the nodes to which each of the nodes $NODE_0$ to $NODE_n$ can transit are given in a "Transition destination nodes" line covered by a "Probability of transition to other node (Di)" column, probabilities of the transition to other nodes $NODE_0$ to $NODE_n$, which would be possible when all the requirements given in the "Input event name", "Data name" and "Date range" columns, respectively, are satisfied are given in corresponding places in the "Probability of transition to other node (Di)" column, and action to be outputted when the state transits to the nodes $NODE_0$ to $NODE_n$ are given in an "Output action" line covered by the "Probability of transition to other node (Di)" column. Note that the sum of the transition probabilities in the line covered by the "Probability of transition to other node Di" column is 100(%).

Therefore, the node $NODE_{100}$ in the state transition table 80 shown in FIG. 14 can transit to a node $NODE_{120}$ (node 120) with a transition probability of "30%" when "BALL (the bal has been detected)" is given as a result of the recognition and "SIZE (the size of the ball)" given along with the result of recognition is "0, 1000 (0 to 1000)". At this time, the robot 1 will make action "ACTION 1".

Each of the action models action is configured so that many of the action models $70_1$ to $70_n$ given as in the state transition table 80 link to each other. For example, when a recognition result is supplied from the input semantics converter module 59, the state transition table of corresponding nodes $NODE_0$ to $NODE_n$ is used to stochastically decide next action and the decision result is outputted to the action switching module 71.

The action switching module 71 shown in FIG. 11 selects predetermined high-priority ones of the pieces of action outputted from the action models $70_1$ to $70_n$ in the action model library 70, and sends a command for execution of the action (will be referred to as "action command" hereunder) to the output semantics converter module 68 of the middleware layer 40. Note that in this embodiment, the action outputted from the lower ones of the action models $70_1$ to $70_n$ in FIG. 12 are set higher in priority than those outputted from the higher action models.

When action is complete, the action switching module 71 informs the learning module 72, emotion module 73 and instinct module 74 of the completion of the action based on action-completion information supplied from the output semantics converter module 68.

On the other hand, the learning module 72 is supplied with the result of recognition of a teaching given by the user to the robot as action such as "hit", "patted" or the like, among recognition results supplied from the input semantics converter 59.

The learning module 71 changes the transition probability for a corresponding one of the action models $70_1$ to $70_n$ in the action model library 70. The learning module 72 reduces the expression probability of that action when the robot 1 is hit (=scolded) for example, while raising the expression probability when the robot 1 is patted (=praised) for example, both on the basis of the recognition results and an information from the action switching module 71.

On the other hand, the emotion model 73 holds a parameter indicating the intensity of each of a total of six emotions "joy", "sadness", "anger", "surprise", "disgust" and "fear". The emotion model 73 cyclically renews the parametric values of these emotions on the basis of a specific recognition result such as "hit", "patted" or the like supplied from the input semantics converter module 59, elapsed time and information from the action switching module 71.

More particularly, the emotion model 73 uses a predetermined computation equation to compute a variation of the emotion at a time from a recognition result supplied from the input semantics converter module 59, behavior of the robot 1 at that time, and an elapsed time from the preceding renewal. Then, taking the emotion variation as $\Delta E[t]$, current parametric value of the emotion as $E[t]$ and factor indicating the sensitivity to the emotion as $k_e$, the emotion module 73 determines a parametric value $E[t+1]$ of the emotion in a next cycle by computing an equation (4), and replaces the emotion parametric value $E[t+1]$ with the current parametric value $E[t]$ of the emotion, to thereby renew the parametric value of the emotion. The emotion model 73 also renews the parametric values of all the remaining emotions in the same manner.

$$E[t+1]=E[t]+k_e \times \Delta E[t] \tag{4}$$

Note that it is predetermined how much each of recognition result and information from the output semantics converter module 68 influences the variation ΔE[t] of the parametric value of each emotion. The predetermination is such that for example, the result of recognition of "hit" will have an great influence on the variation ΔE[t] of the parametric value of the "anger" emotion, while the result of recognition of "patted" will have a great influence on the variation ΔE[t] of the parametric value of the "joy" emotion.

The information from the output semantics converter module 68 is so-called feedback information on action (action-completion information). Namely, it is information on the expression result of action. The emotion model 73 will change the emotion with such information. For example, "barking" action will lower the level of "anger" emotion. Note that information from the output semantics converter module 68 is also supplied to the aforementioned learning module 72 which renews the transition probability for an appropriate one of the action models $70_1$ to $70_n$ based on the information from the output semantics converter module 68.

Note that the result of action may be fed back by an output (action having a feeling added thereto) of the action switching module 71.

On the other hand, the instinct model 74 holds parameters indicating the intensity of each of a total of four independent desires "exercise", "affection", "appetite" and "curiosity". The instinct model 74 cyclically renews the parametric values of these desires on the basis of recognition results supplied from the input semantics converter module 59, elapsed time and information from the action switching module 71.

More particularly, the instinct model 74 uses a predetermined computation equation to compute a variation of each of the desires "exercise", "affection" and "curiosity" at a time from a recognition result supplied from the output semantics converter module 68, elapsed time and information from the output semantics converter module 68. Then, taking the desire variation as ΔI[k], current parametric value of the desire as I[k] and factor indicating the sensitivity to the desire as $k_i$, the instinct module 74 determines a parametric value I[k+1] of the desire in a next cycle by computing an equation (5) cyclically, and replaces the value I[k+1] with the current parametric value I[k] of the desire, to thereby renew the parametric value of the desire. The instinct model 74 also renews the parametric values of all the remaining desires except for "appetite" in the same manner.

$$I[k+1]=I[k]+k_i \times \Delta I[k] \tag{5}$$

Note that it is predetermined how much each of recognition result and information from the output semantics converter module 68 influences the variation ΔI[k] of the parametric value of each desire. The predetermination is such that for example, information from the output semantics converter module 68 will have an great influence on the variation ΔI[k] of the parametric value of "tired" state.

Note that in this embodiment, each of the emotions and desires (instinct) has a variable parametric value range thereof limited to 0 to 100, and also each of the factors $k_e$ and $k_i$ has a value set for each of emotions and desires.

On the other hand, as shown in FIG. 10, the output semantics converter module 68 of the middleware layer 40 supplies, to an appropriate one of the signal processing modules 61 to 67 of the output system 69, an abstract action command like "move forward", "joy", "bark" or "track (a ball)" supplied from the action switching module 71 of the application layer 41 as in the above.

Based on action command supplied, the signal processing modules 61 to 67 generates a servo instruction for supply to an appropriate one of the actuators $25_1$ to $25_n$, speech data for a speech to be outputted from the speaker 24 (see FIG. 8) or drive data for supply to the LEDs as "eyes" of the robot for carrying out the action, and sequentially sends the data to an appropriate one of the actuators $25_1$ to $25_n$ and speaker 24 or LEDs via the virtual robot 33 in the robotic server object 32 and signal processing circuit 14 (see FIG. 8) in this order.

As in the above, the robot 1 is adapted to autonomously act correspondingly to its own internal state and environmental (external) state or an instruction or action from the user on the basis of the control program.

(3) Changing of the Instinct and Emotion Corresponding to the Environment

The robot 1 is also adapted to be cheerful in a bright environment for example, while being quiet in a dark environment. Namely, the robot 1 is adapted to have the emotion and instinct thereof changed correspondingly to the extent of each of three factors "noise", "temperature" and "illumination" in the environment surrounding the robot 1 (will be referred to as "environmental factors" hereunder).

More particularly, the robot 1 has external sensors to detect the surroundings, including a temperature sensor or thermosensor (not shown) to detect the ambient temperature in addition to the aforementioned CCD camera 20, distance sensor 22, touch sensor 21 and microphone 23, disposed each in place. The recognition system 60 of the middleware layer 40 includes the signal processing modules 50 to 52 for noise detection, temperature detection and brightness detection corresponding to the above sensors, respectively.

The noise detecting signal processing module 50 detects the level of ambient noise based on speech data given from the microphone 23 (see FIG. 8) via the virtual robot 33 in the robotic server object 32, and outputs the detection result to the input semantics converter module 59.

The temperature detecting signal processing module 51 detects an ambient temperature based on sensor data supplied from the thermosensor via the virtual robot 33, and outputs the detection result to the input semantics converter module 59.

The brightness detecting signal processing module 52 detects an ambient illumination based on image data supplied from the CCD camera 20 (see FIG. 8) via the virtual robot 33, and outputs the detection result to the input semantics converter module 59.

The input semantics converter module 59 recognizes the extent of each of the ambient "noise", "temperature" and "illumination" based on the outputs from the signal processing modules 50 to 52, and outputs the recognition result to the internal state model of the application module 41 (see FIG. 11).

More specifically, the input semantics converter module 59 recognizes the extent of ambient "noise" based on an output from the noise detecting signal processing module 50, and outputs a recognition result like "noisy" or "quiet" to the emotion model 73, instinct model 74, etc.

Also the input semantics converter module 59 recognizes the extent of ambient "temperature" based on an output from the temperature detecting signal processing module 51, and outputs a recognition result like "hot" or "cold" to the emotion model 73, instinct model 74, etc.

Further the input semantics converter module 59 recognizes the extent of ambient "illumination" based on an output from the brightness detecting signal processing module 52, and outputs a recognition result like "bright" or "dark" to the emotion model 73, instinct model 74, etc.

The emotion model 73 cyclically changes the parametric value of each of the emotions by computing the equation (4) based on the various recognition results supplied from the input semantics converter module 59 as in the above.

Then the emotion model 73 increases or decreases the value of the factor $k_e$ in the equation (4) for a predetermined appropriate emotion based on the recognition results as to the "noise", "temperature" and "illumination" supplied from the input semantics converter module 59.

More particularly, for example, when a recognition result "noisy" is supplied, the emotion model 73 will increase the value of the factor $k_e$ for the "anger" emotion " by a predetermined number. On the other hand, when the recognition result supplied is "quiet", the emotion model 74 will decrease the value of the factor $k_e$ for the "anger" emotion by a predetermined number. Thereby, the parametric value of the "anger" emotion will be changed under the influence of the ambient "noise".

Also, when a recognition result "hot" is supplied, the emotion model 73 will decreases the value of the factor $k_e$ for the "joy" emotion by a predetermined number. On the other hand, the recognition result supplied is "cold", the emotion model 73 will increase the value of the factor $k_e$ for the "sadness" emotion by a predetermined number. Thus, the parametric value of the "sadness" emotion will be changed under the influence of the ambient "temperature".

Further, when a recognition result "bright" is supplied, the emotion model 73 will decreases the value of the factor $k_e$ for the "joy" emotion by a predetermined number. On the other hand, the recognition result supplied is "dark", the emotion model 73 will increase the value of the factor $k_e$ for the "fear" emotion by a predetermined number. Thus, the parametric value of the "fear" emotion will be changed under the influence of the ambient "illumination".

Similarly, the instinct model 74 cyclically changes the parametric value of each of the desires by computing the equation (5) based on various recognition results supplied from the input semantics converter module 59 as in the above.

Also, the instinct model 74 increases or decreases the value of the factor $k_i$ in the equation (5) for a predetermined appropriate desire based on the recognition results as to the "noise", "temperature" and "illumination" supplied from the input semantics converter module 59.

Also, for example, when recognition results "noisy" and "bright" are supplied, the instinct model 74 will decrease the value of the factor $k_i$ for the "tired" state by a predetermined number. On the other hand, when the recognition results supplied are "quiet" and "dark", the instinct model 74 will increase the value of the factor $k_i$ for the "tired" state by a predetermined number. Further, for example, when a recognition result "hot" or "cold", the instinct model 74 will increase the value of the factor $k_i$ for the "tiredness" by a predetermined number.

Thus, when the robot 1 is in a "noisy" environment for example, the parametric value of the "anger" emotion is easy to increase while that of the "tired" state is easy to decrease, so that the robot 1 will make a generally "irritated" action. On the other hand, when the environment surrounding the robot 1 is "quiet", the parametric value of the "anger" emotion is easy to decrease while that of the "tired" state is easy to increase, so that the robot 1 will act generally "gently".

Also, when the robot 1 is in a "hot" environment, the parametric value of the "joy" emotion is easy to decrease while that of the "tired" state is easy to increase, so the robot 1 will show generally "lazy" action. On the other hand, when the robot 1 is in a "cold" environment, the parametric value of the "sadness" emotion is easy to increase while that of the "tired" state is easy to increase, so the robot 1 will act generally "with a complaint of the cold".

When the robot 1 is in the "bright" environment, the parametric value of the "joy" emotion is easy to increase while that of the "tired" state is easy to decrease, so that the robot 1 will show generally "cheerful" action. On the other hand, in a "dark" environment, the parametric value of the "joy" emotion is easy to increase while that of the "tired" state is easy to increase, so that the robot 1 will act generally "gently".

The robot 1 is constructed as in the above and can have the emotion and instinct thereof changed correspondingly to the surrounding environment and autonomously act according to the states of its emotion and instinct.

(4) Applications of the Present Invention (4-1) General Description

The essential parts of the robot 1 to which the present invention is applied will be described here below. The robot 1 is constructed to learn action in correlation with an image signal and speech signal (acoustic signal), and start up action with the image signal and speech signal correlated with the action after the learning. In the following, mainly an example that the robot 1 is made to learn action in correlation with a speech or voice will be described. However, it is of course that the robot 1 is made to learn action in correlation with an image. More particularly, according to the present invention, the robot 1 is constructed as in the following.

Figure 15:
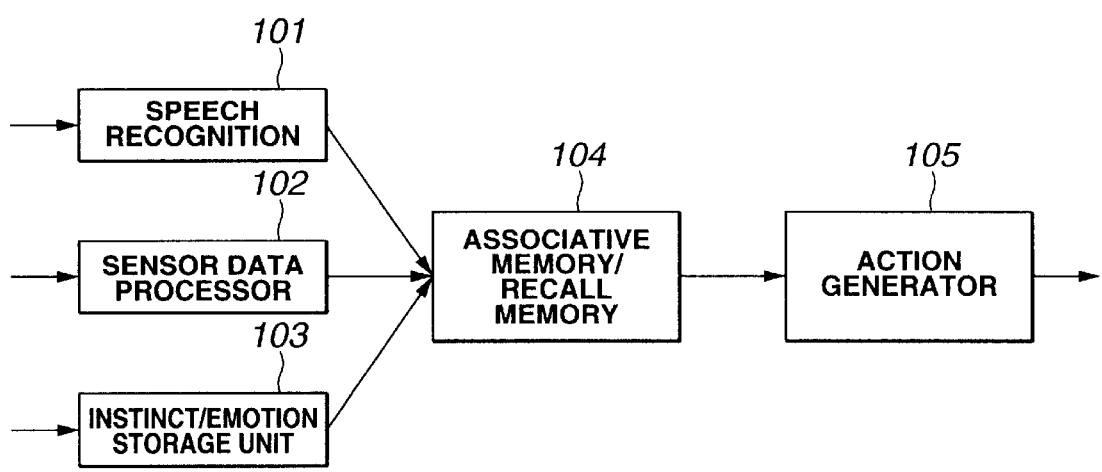
FIG. 15 is a block diagram of a part, according to the present invention, of the robot apparatus in FIG. 7.

As shown in FIG. 15, the robot 1 includes a speech recognition unit 101, sensor data processor 102, instinct/emotion storage unit 103, associative memory/recall memory 104 and an action generator 105.

The speech recognition unit 101 functions as an input information detector to detect information supplied simultaneously with, or just before or after a touch detection by a touch sensor (e.g., touch sensor 21 in FIG. 8) which detects a touch on the robot 1. The associative memory/recall memory 104 stores action made in response to the touch and input information (speech signal) detected by the speech recognition unit 101 in correlation with each other. The action generator 105 works as an action controller to provide action stored in the associative memory/recall memory 104 and which is associated with newly acquired input information (speech signal). Also, the sensor data processor 102 works to have the robot 1 make action in response to a touch detection by the touch sensor (not shown) for example. More specifically, each of these robotic components functions as will be described below.

The speech recognition unit 101 processes speech signals supplied from outside (microphone 23) to recognize them as a predetermined language. More particularly, the speech recognition unit 101 adopts the HMM to recognize an input speech as a phoneme sequences by a plurality of recognition classes based on the HMM.

Figure 1:
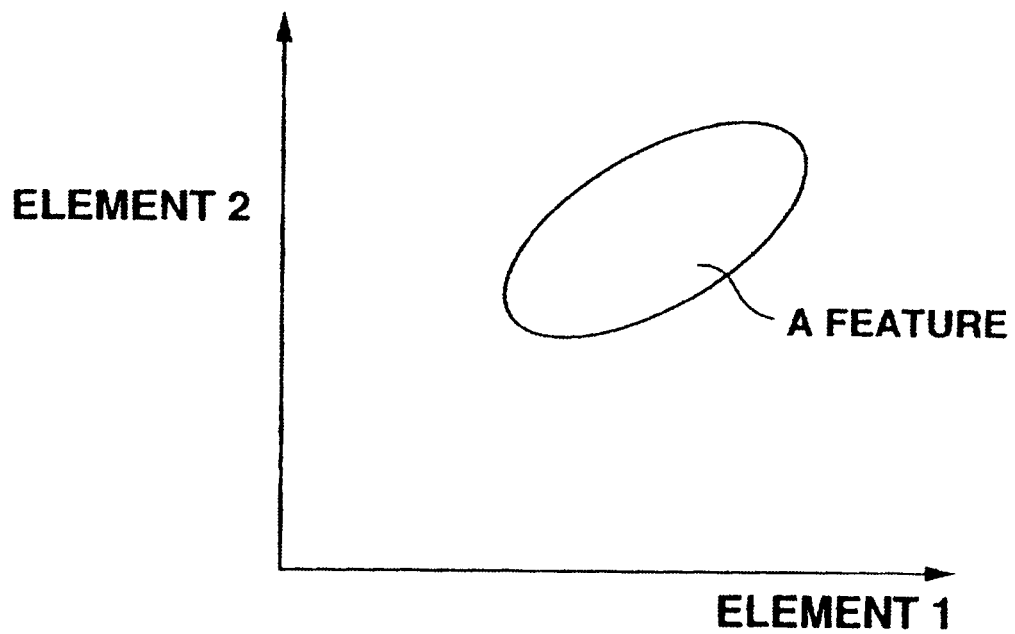
FIG. 1 show a feature space for detection of a feature of an input signal.
Figure 2:
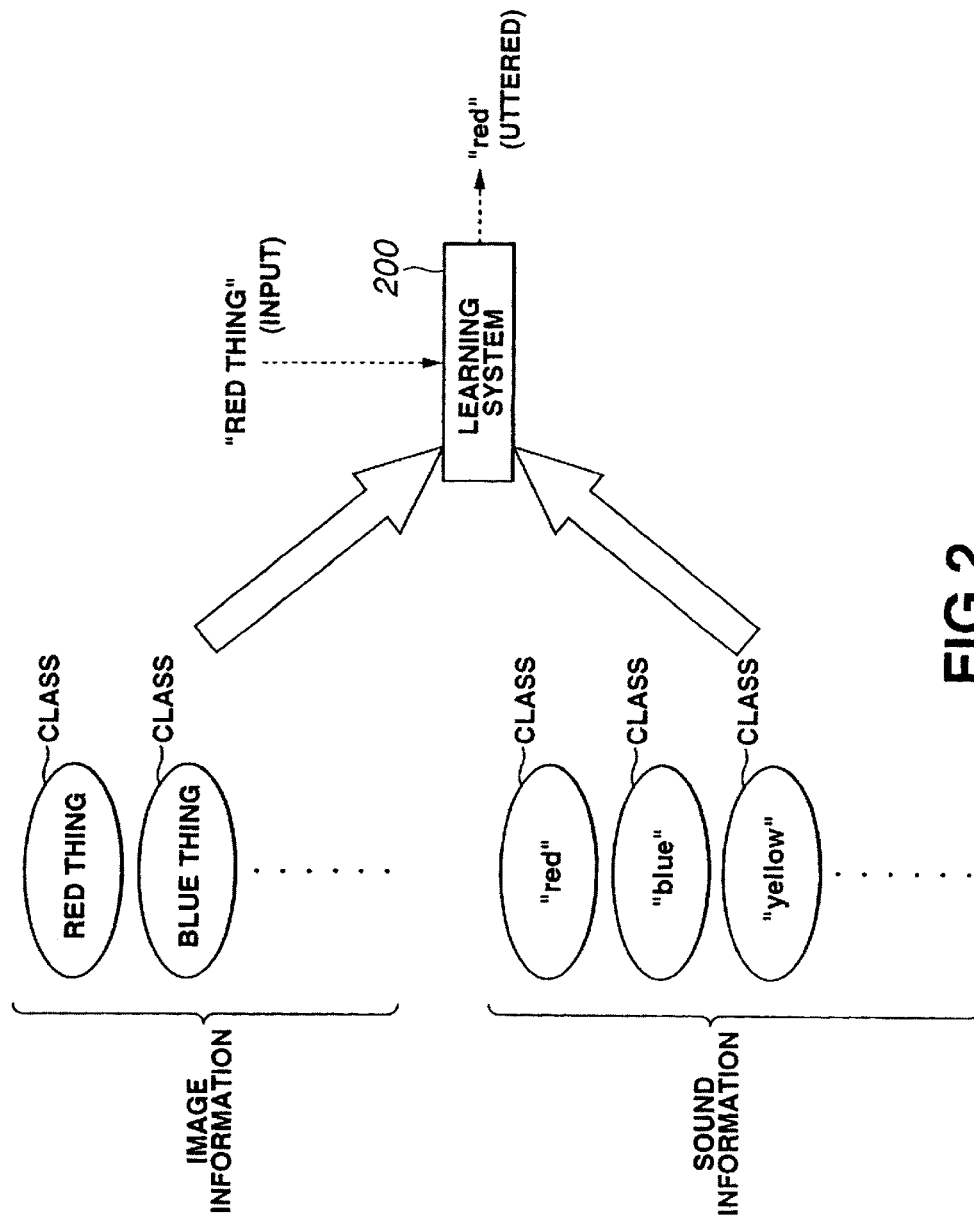
FIG. 2 is a block diagram of a learning system including recognition classes for image and sound information.
Figure 3A:
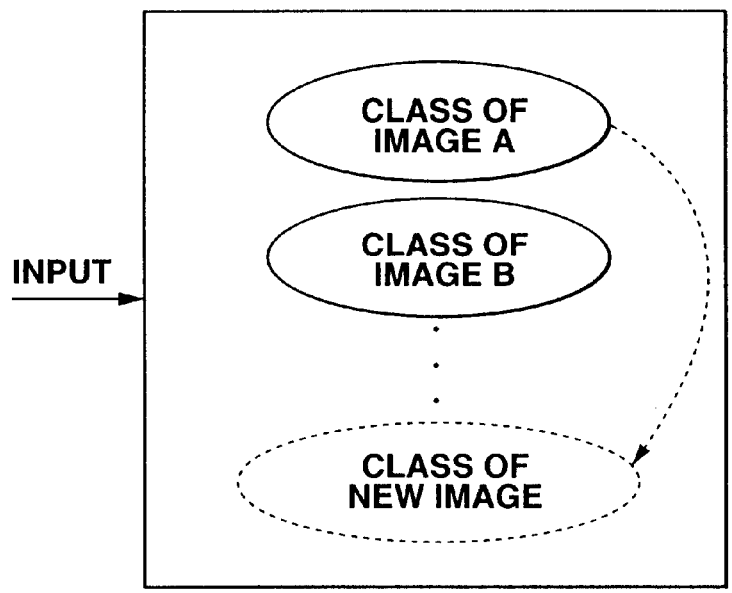
FIGS. 3A and 3B explain the generation of a new recognition class.
Figure 3B:
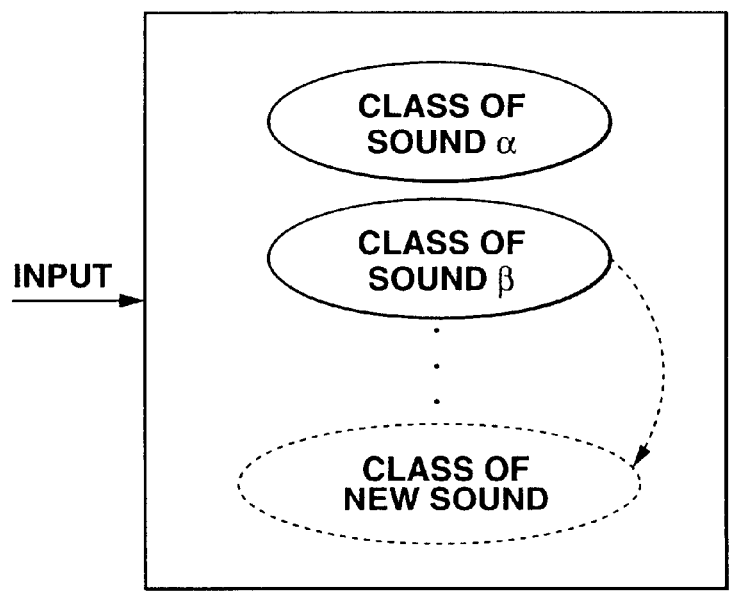
Figure 4:
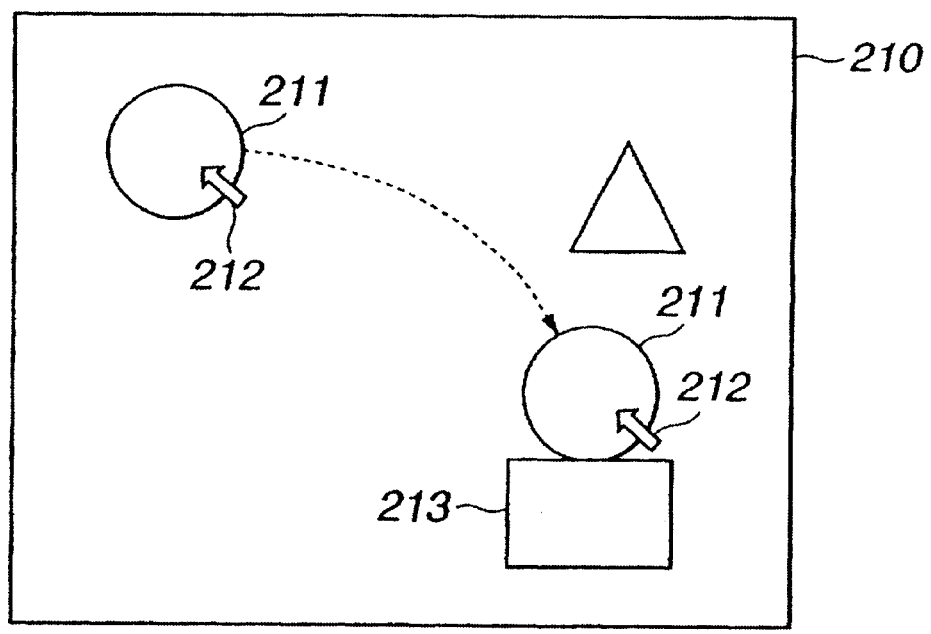
FIG. 4 explains the language acquisition with a conceptual structure-based speech input from perceptual information (as in Document 4 by Iwahashi et al).
Figure 5A:
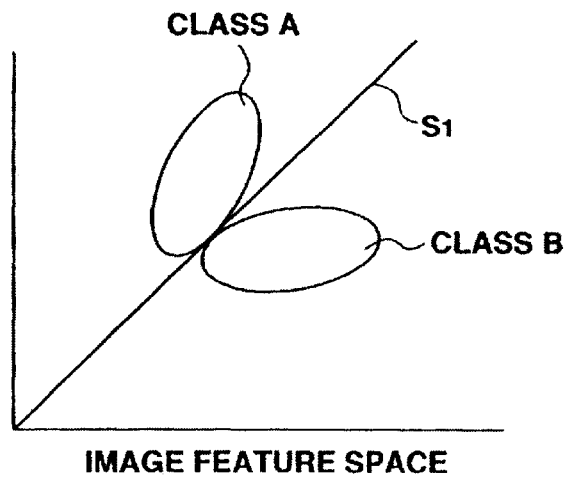
FIGS. 5A and 5B explain the relation between an image feature space and sound feature space.
Figure 5B:
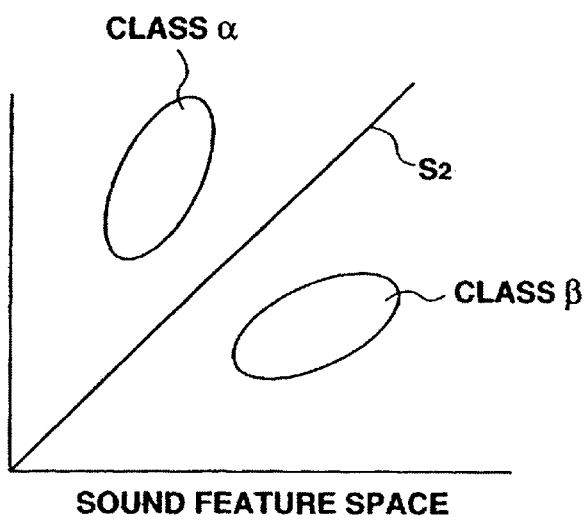
Figure 6A:
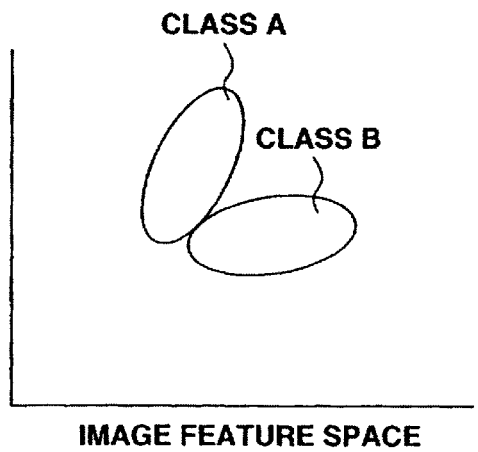
FIGS. 6A to 6C explain the relation between an image feature space, sound feature space and third feature space.
Figure 6B:
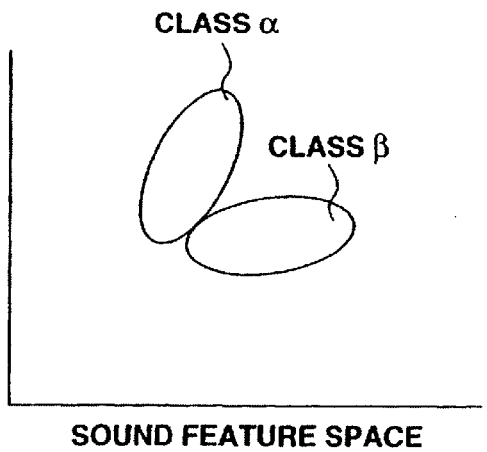

The speech recognition unit 101 is also capable of generating an increased number of classes based on the existing classes through learning. For example, when an unrecognizable speech is given for example, the speech recognition unit 101 divides the existing class to generate new classes as shown in FIG. 6B. More particularly, the speech recognition unit 101 divides an existing class having a certainty factor (belongingness evaluation) for an input speech to generate new classes. For example, a part of a class, having a small feature, is divided to provide new classes. Thus, the speech recognition unit 101 can recognize pre-registered languages as well as a new language.

The sensor data processor 102 generates a signal for a motion (action) taught to the robot based on a change of sensor data. That is, the sensor data processor 102 recognizes input action information.

The motion to be taught to the robot may be a preset one for example, and it may also be a new one set by the user. Also, any one of motions already set may be selectively generated.

Teaching of an preset motion to the robot is such that the preset motion of the robot is triggered by entry of a sensor data from the touch sensor for example. For example, the robot is preset to shift from a "standing" position to a "sitting" position when a predetermined touch sensor provided at the rear back portion of the robot is pushed. Namely, the robot is taught to actually shift to the "sitting" position when the touch sensor at the rear back portion of the robot in the "standing position" is pushed.

Note that a sensor for teaching such a motion to the robot may be provided at the end of the head or leg. By providing such sensors in arbitrary positions, it is possible to teach a variety of motions to the robot.

Also, teaching of a newly set motion to the robot can be done using a change of a control signal for a moving part (joint) for example. The moving parts include for example the actuators (servo motors) $25_1$ to $25_n$ provided at the joints of the leg units 3A to 3D, articulations between the leg units 3A to 3D and body unit 2, articulation between the heat unit 4 and body unit 2, articulation between the tail unit 5 and tail 5A, etc.

For example when a moving part of the robot 1 is forced by the user to move, a load will take place to the moving part. The load to the moving part will cause a different signal from a one which will take place during a normal motion of the moving part (with no external load), for example, a servo signal to the moving part. A change in posture of the robot 1, namely, a motion of the robot 1, can be known from such a signal. Thus, by storing the signal, an motion urged by the user can be taught as a new motion to the robot 1. Teaching of such a new motion will further be described later. Also, according to the present invention, the robot 1 is adapted to detect an external force (external load) from such a signal change and thus learn the external force as will further be described later.

Further, the sensor data processor 102 can recognize the class of action the robot 1 has to learn. For example, the robot 1 can learn input action information by recognizing the class thereof based on a feature thereof in an action feature space.

The instinct/emotion storage unit 103 stores information on emotions correlated with the aforementioned speech and action. That is, the instinct/emotion storage unit 103 changes the instinct or emotion with input sensor signal or the like from the instinct model or emotion model as in the above.

The associative memory/recall memory 104 makes a learning based on information from the aforementioned speech recognition unit 101, sensor data processor 102 and instinct/emotion storage unit 103, and thereafter it generates action information corresponding to input speech and image on the basis of the learning. The associative memory/recall memory 104 employs a conventional principle of associative memory based on which image and speech classes are correlated with each other, having previously been described concerning the equations (1) and (2), and associatively stores each information.

For example, when the sensor data processor 102 detects, from sensor data, a teaching of a motion for shifting from the "standing" position to "sitting" position and the speech recognition unit 101 recognizes an uttered language "backward" simultaneously with, or just before or after, the detection of the teaching by the sensor data processor 102, the associative memory/recall memory 104 will store (learn) the motion for shifting from the "standing" to "sitting" position and the uttered language "backward" in association with each other. This is generally the same as the teaching of "sitting" to a real dog.

Also, the associative memory/recall memory 104 can be adapted to learn an input motion by correlating the input motion and an input language with each other (triggering) only when the input motion and language are preset in pair. For example, if the uttered language "backward" is given simultaneously with, or just before or after, the teaching of the above-mentioned so-called "sitting" motion, the associative memory/recall memory 104 will learn (store) the motion in correlation (association) with the uttered language "backward". However, it will not learn the motion if the input language is any other than "backward".

Also, the associative memory/recall memory 104 can learn a motion by correlating a recognized motion or language with the instinct and emotion outputted from the instinct/emotion storage unit 103. For example, if the associative memory/recall memory 104 feels scared (fear) in learning of a motion at entry of a speech (uttered language), it can learn (store) such a speech in correlation with such a "fear" emotion.

As in the above, the associative memory/recall memory 104 learn (store) a speech, motion or emotion in correlation (association) with each other, and after the learning, it will generate action information correspondingly to an input image, speech, etc. based on the learning result.

The action generator 105 generates action based on the action information output from the above associative memory/recall memory 104. For example, when an uttered language "backward" is given to the associative memory/recall memory 104 after learning of the aforementioned teaching to "backward", the action generator 105 will cause a shift from the "standing" position to "sitting" position.

As in the above, the robot 1 will be able to learn action in association with speech information and change of sensor signal (data) to enable action (motion) as a result of the learning on the basis of an input speech.

A series of operations of the robot 1 from learning of a "sitting" motion until outputting the motion for example will be described below.

Figures 16A, 16B:
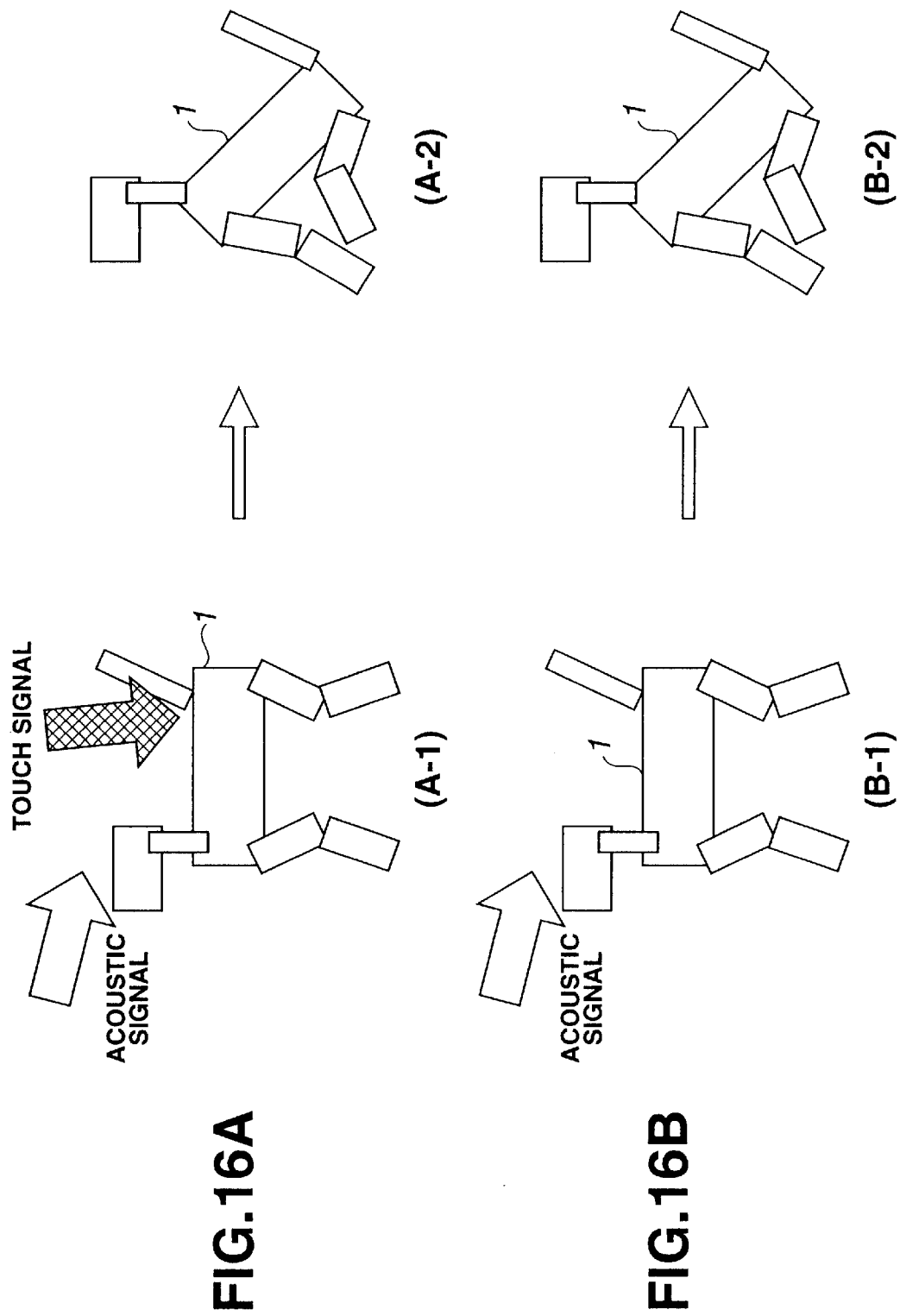
FIGS. 16A and 16B explain a teaching of a motion to the robot apparatus.

During learning, the robot 1 is given a touch simultaneously with, or just before or after, giving a speech (acoustic signal) as shown in FIG. 16A. The speech signal is for example "backward". Supplying the touch signal is equal to teaching of a motion for shifting from the "standing" position to "sitting" position to change a sensor signal from a moving part related with the motion. Note that a touch sensor or push button (e.g., teaching button for "sitting") may be provided at a predetermined location as in the above to teach the motion to the robot by operating (pushing) the touch sensor or push button. In this case, supplying a touch signal means generation of a signal by operating such a touch sensor.

With the above teaching operation, the robot 1 will be taught to make a shifting motion from (A-1) to (A-2) in FIG. 16A.

After thus taught, the robot 1 will shift to the "sitting" position as in (A-2) in FIG. 16A, which is taught during learning, as shown in (B-2) in FIG. 16B when given an uttered language (acoustic signal) taught to the robot 1 during learning, for example, "backward" as in (B-1) in FIG. 16B.

The motion to be taught to the robot is not limited to the aforementioned one. That is, simultaneously with, or just before or after, giving a speech (utterance), the robot 1 may be pushed forward on the back, have the neck raised upward or pushed down, or raised at the front legs in order to teach such motions to the robot 1. By association of this teaching of a motion with a corresponding uttered language, a motion "prone lying", "standing" or "shaking" for example can be taught to the robot 1.

Also, the robot 1 can learn as follows for example.

First, the robot 1 will learn to "kick" in learning a motion. More particularly, the user (trainer) will operate the front legs and teach the robot 1 to "kick" a thing. The motion to be learned by the robot 1 may be a preset one or a new one. On the other hand, an uttered language "red" learned through the language recognition and red color recognized based on an image are stored in association with each other.

As a result of such a learning, the robot 1 will recognize an uttered language "kick a red thing" and kick a "red" thing as generated action. For example, the red object is recognized by segmentation of an input image and identifying red portions of the image. That is, the robot 1 will recognize a thing consisting of red segments as an object to kick.

In the above embodiment, speech information is associated with action but the present invention is not limited to this association. For example, image information may be associated with the action information. In this case, the robot 1 is provided with an image recognition unit for recognizing a specific image from image signals supplied from an imaging unit such as the CCD camera 20 for example.

Also, the above embodiment has been described concerning the association of an instinct or emotion outputted from the instinct/emotion storage unit 103 with learned action and uttered language. However, the present invention is not limited to this association. For example, an instinct or emotion taking place later may be linked with preset action and uttered language.

Further, in the robot 1, an emotion caused by an output (actual action), an input which is a motivation of the emotion (e.g., uttered language or image) and the output itself (actual action) can be stored (learned). Thus, in an actual scene after the learning, the robot 1 can also recall a corresponding stored emotion from an input language or the like to make predetermined action without providing any output (action) which should intrinsically be provided correspondingly to the input language.

By storing (learning) an emotion caused when touching (action) a red thing (input), for example, a scared feeling (fear) when sensing a high temperature, the robot 1 can recall a fear just when seeing a red thing (input) later, thereby expressing the fear as action (making a predetermined action). Namely, the robot 1 can make any other appropriate action without repeating any past action such as touching a red thing.

In this case, the associative memory/recall memory 104 will function to store action result information indicative of the result of action made correspondingly to a speech signal detected by the speech recognition unit 101 and the speech signal in association with each other, and the action generator 105 works to control action based on the action result information identified by the associative memory/recall memory 104 based on a new input speech signal.

Figure 6C:
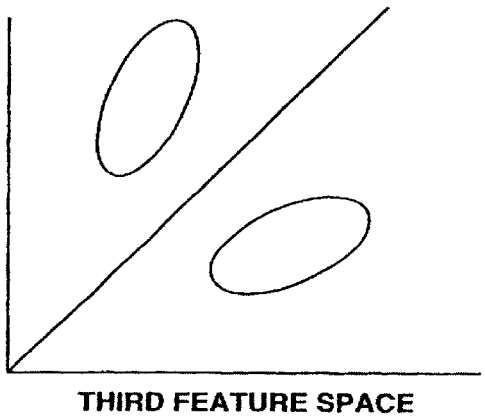

Also the robot 1 can have an influence of another space of an input, emotion and action on the feature space of an input signal to has an influence on the classification of the input signal. That is, as shown in FIGS. 6A, 6B and 6C, when classes are near to each other in the feature space of image and speech, the image and speech are classified referring to the third feature space (e.g., action feature space).

More specifically, in case, having made first action in response to a first input object (image) characterized by image signals, the robot 1 was given a reward (e.g., it is "patted") while it was punished (e.g., "hit") when it has also made the first action as a result of the classification (first and second objects are near to each other in the image feature space) in response to a second object very similar to the first object in the image feature space, the robot 1 is adapted to make any action other than the first action in response to a second and subsequent entry of the second object. Namely, the result of classification (action result in this case) in another feature space is used to has an influence on another classification or strategy of classification.

In this case, the speech recognition unit 101 has functions as an input information detector, a feature detector to detect a feature of speech signals detected by the input information detector, and an information classification unit to classify speech signals based on the feature. It should be reminded that the classification of speech signals based on a feature is equivalent to classification by HMM. Note that the function as the feature detector is performed by a feature extractor 122 which will further be described later with reference to FIG. 33, while the function as the information classification unit is performed by an HMM unit 123 shown also in FIG. 33.

Further, the speech recognition unit 101 will have a function as a classification changer to change the classification of speech signals (recognition classes) having caused action based on action result information indicative of the result (e.g., reward or punishment) of the action made by the robot 1 under the control of the action generator 105. Note that the learning by the association may be a one by association of action made by the robot 1 when praised with a stimulus (speech, image, action or the like).

All the components of the robot 1, according to the present invention have been described in the foregoing. Next, each of the components will further be described.

(4-2) Learning of Arbitrary Motion (Detail Description of the Sensor Data Processor)

As having been described in the foregoing, the robot 1 learns a motion (action) which is a preset motion or an arbitrary motion. There will be described here below how the robot 1 learns an arbitrary motion, that is, a new motion.

The joints of the robot 1 are controlled by corresponding servo motors as in the above. In the robot 1, a time series of angles is generated based on angle designations (angle designation information) from the CPU 10, and the robot 1 shows a motion as a result.

Also, the servo controller provides signals including an actual joint angle supplied from the potentiometer provided in each joint and a pulse signal supplied to each servo motor. The robot 1 is taught an arbitrary motion by the use of the pulse signal instead of a sensor signal (sensor data) from a touch sensor, used to teach the aforementioned preset motion to the robot 1.

Figure 17A:
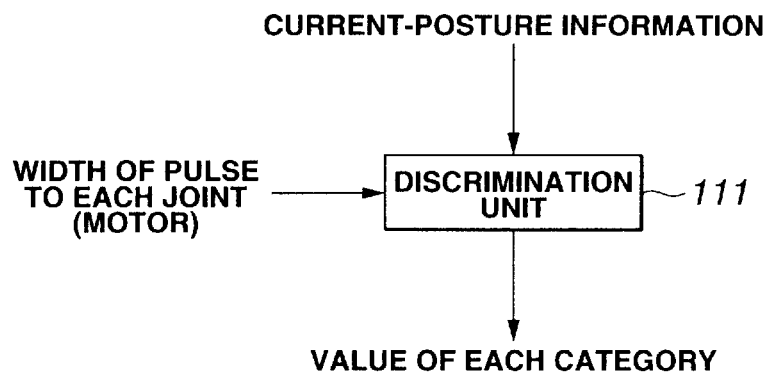
FIGS. 17A and 17B show a discrimination unit which teaches a motion to the robot apparatus.

To learn such an arbitrary motion, the robot 1 includes a discrimination unit 111 shown in FIG. 17A. The discrimination unit 111 corresponds to the sensor data processor 102 in FIG. 15 is constructed for the robot 1 to learn an arbitrary motion. The discrimination unit 111 is dedicated for the robot 1 to learn a motion based on the pulse width of a control signal supplied to each joint servo motor.

It should be reminded here that the robot 1 is adapted to shift to various postures and thus will not keep any constant posture when learning a motion. Therefore, the robot 1 has to be taught similar motions both in the "standing" and "sitting" positions. Namely, the robot 1 has to be taught a motion by the use of a pulse width controlling the motion of a moving part (joint), in association with each posture of the robot 1.

Figure 17B:
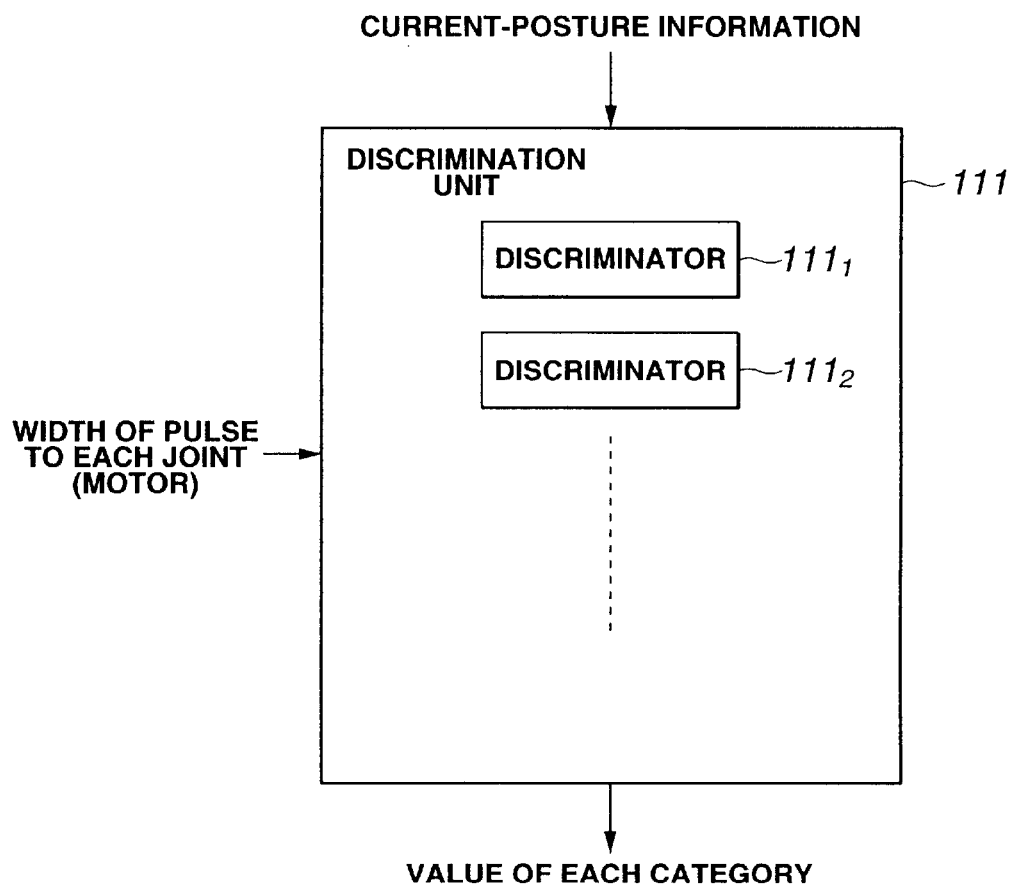

For this reason, the discrimination unit 111 includes a plurality of discriminators $111_1$, $111_2$, . . . each for one posture, as shown in FIG. 17B. For example, the first discriminator $111_1$ is provided for learning a motion in the "sitting" position, and the second discriminator $111_2$ is provided for learning a similar motion in the "standing" position.

Based on information on a current posture of the robot 1, the discrimination unit 111 selects a desired one of the plurality of discriminators $111_1$, $111_2$, . . . for learning of a motion in an arbitrary posture of the robot 1.

Note that posture information indicative of the current posture can be detected from information, for example, gravity information, provided from the potentiometers $26_1$ to $26_n$, angular velocity sensor 18 or acceleration sensor 19. Also, the current-posture information can be acquired based on a command outputted as a control signal for a moving part from the action generator 105.

Teaching (learning) is effected by comparison of a pulse width which takes place when no external force is applied to the robot 1 and a one which takes place when an external force is applied. Namely, the width of a pulse signal supplied to each joint (servo motor) which is in the normal state (with no external force applied) takes a pattern fixed within certain limits while the width of a pulse signal supplied to the joint while the robot 1 is being applied with an external force will have a different pattern from that shown by the joint in the normal state. For teaching a motion to the robot 1 by applying an external force thereto, the above relation (difference between pulse-width patterns) is used to acquire information on the motion. More particularly, motion teaching is effected as will be described below.

For example, when the robot 1 is recognized based on posture information to be in a standing position, a pulse width, which takes place when an external force is applied to the robot 1 for teaching a motion, is supplied to the first discriminator $111_1$ to which information assigned to the motion is also supplied at the same time. For example, a pulse width used for the motion teaching is of a signal used for the so-called PID control as shown in the following equation (6). More specifically, a PWM-controlled pulse width is used for this purpose.

$$P = P_g \times e_n + I_g \times \sum_{i=0}^{n} e_i \Delta t + D_g \times \frac{e_n - e_{n-1}}{\Delta T} \quad (6)$$

where $e_i$ is an error of a time i (difference between target angle and current angle in potentiometer (actual angle), and $P_g$, $I_g$ and $D_g$ are constants. The pulse width used for the motion learning is a P value acquired by computing the equation (6).

For example, vectors are used as information on a pulse width which takes place when an external force is applied to the robot 1 for the purpose of motion teaching and a to-be-taught motion, respectively. A five-dimensional vector $[V_0, V_1, V_2, V_3, V_4]$ is used as information assigned to the to-be taught motion. With the five elements $V_0$, $V_1$, $V_2$, $V_3$ and $V_4$ of the vector, it is possible to recognize five types of stimuli. The teaching will be detailed in the following.

Figure 18:
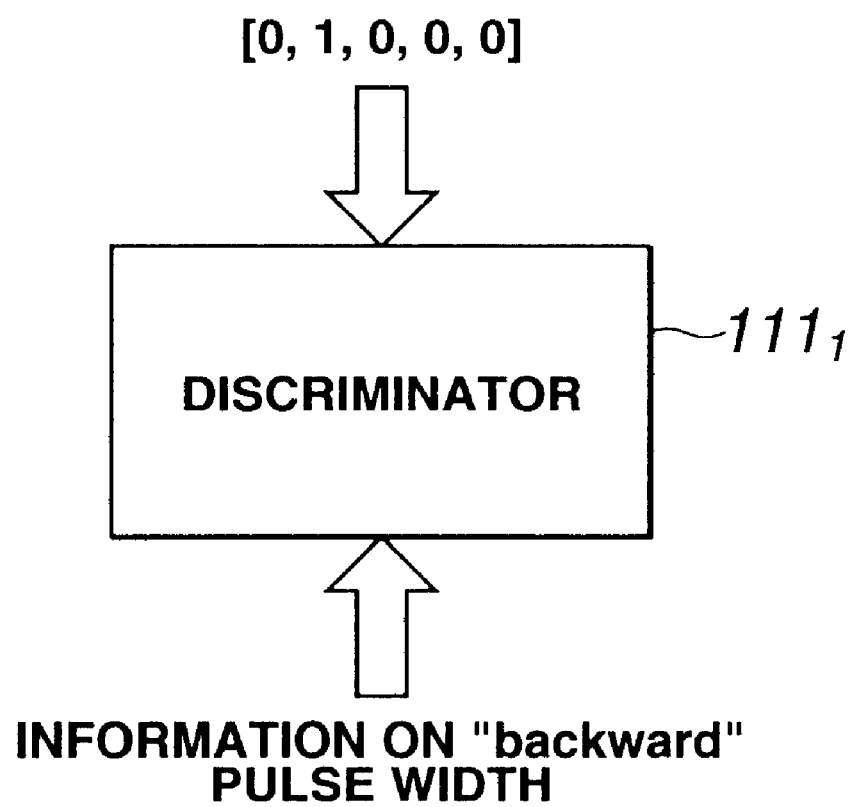
FIG. 18 is a block diagram of discriminators for learning a motion.

When the robot 1 is pushed backward on the back, there are provided a vector $P_1$ acquired from a pulse width resulted at that time and intended-motion information $O_1=$ [0, 1, 0, 0, 0]. As shown in FIG. 18 for example, the discriminator $111_1$ is supplied with the pulse-width vector (backward) $P_1$ and [0, 1, 0, 0, 0].

Each of the vector elements $V_0$, $V_1$, $V_2$, $V_3$ and $V_4$ is learned as a real number (with floating point) between 0 and 1. The larger the (learned) stimulus part, the more approximate the vector element is to 1. For example, a vector is acquired as real numbers like[0.1, 0.9, 0.2, 0.1, 0.3] as a result of the motion learning with information $O_1$=[0, 1, 0, 0, 0].

Also, when the robot 1 is pushed forward on the back, there are provided a vector $P_2$ acquired from a pulse width resulted at that time and intended-motion information $O_2=$ [0, 0, 1, 0, 0]. When the robot 1 has the neck pushed down, there are provided a vector $P_3$ acquired from a pulse width resulted at that time and intended-motion information $O_3=$ [0, 0, 0, 1, 0]. When the robot 1 the neck pushed up, there are provided a vector $P_4$ acquired from a pulse width resulted at that time and intended-motion information $O_4=$ [0, 0, 0, 0, 1]. Also, for example, there are provided a vector $P_0$ acquired from a pulse width which takes place when no external force is applied and intended-motion information $O_0$=[1, 0, 0, 0, 0]). The vector $P_0$ and information $O_0$ are compared with the above vectors and information to learn the intended motions.

Examples of the pulse width are shown in FIGS. 19 to 25 in which the horizontal axis shows positions of the joint while the vertical axis shows values taken by the so-called PWM pulse.

Figure 19:
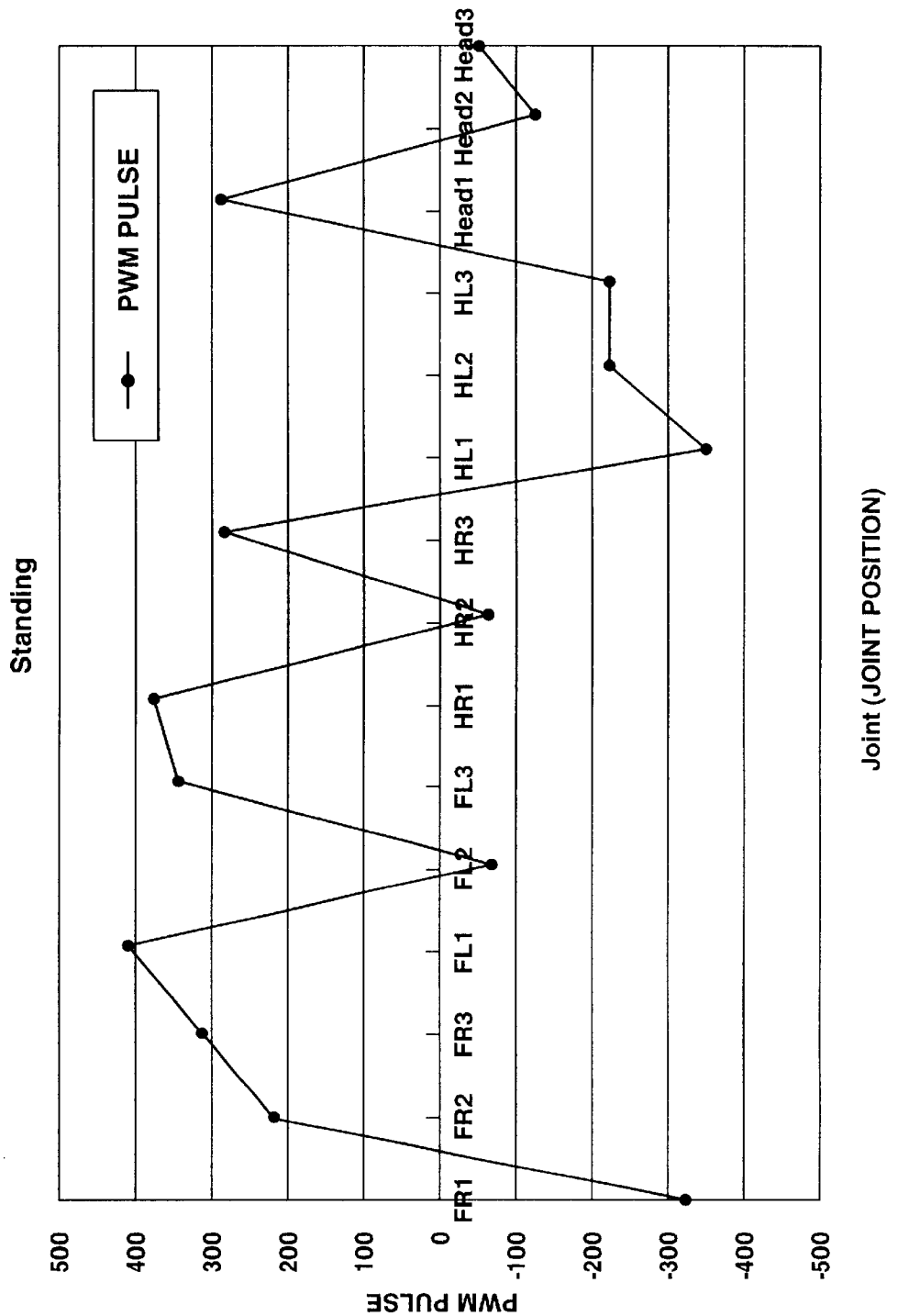
FIG. 19 is a characteristic curve of pulse widths used in the motion learning, showing pulse widths which are when the robot apparatus is in standing position.

FIG. 19 shows the pulse width (value of pulse signal) when the robot 1 is in the standing position. In Figures, "FR1" indicates a position of the first joint (shoulder joint) of the front right leg, "FR2" indicates a position of the second joint (knee joint) of the same leg, and "FR3" indicates a position of the third joint (ankle joint) of the same leg. "FL1" indicates a position of the first joint (shoulder joint) of the front left leg, "FL2" indicates a position of the second joint (knee joint) of the same leg, and "FL3" indicates a position of the third joint (ankle joint) of the same leg. "HR1" indicates a position of the first joint (shoulder joint) of the rear right leg, "HR2" indicates a position of the second joint (knee joint) of the same leg, and "HR3" indicates a position of the third joint (ankle joint) of the same left. "HL1" indicates a position of the first joint (shoulder joint) of the rear left leg, "HL2" indicates a position of the second joint (knee joint) of the same leg, and "HL3" indicates a position of the third joint (ankle joint) of the same leg. "Head1", "Head2" and "Head3" indicate positions of the neck joints, respectively. The above is also true for FIGS. 20 to 25. Thus, a total of 15 pulse widths can be acquired when the robot 1 is in a state (posture or motion). That is, a vector P used for the aforementioned learning can be obtained as a one consisting of 15-dimensional elements.

Figure 20:
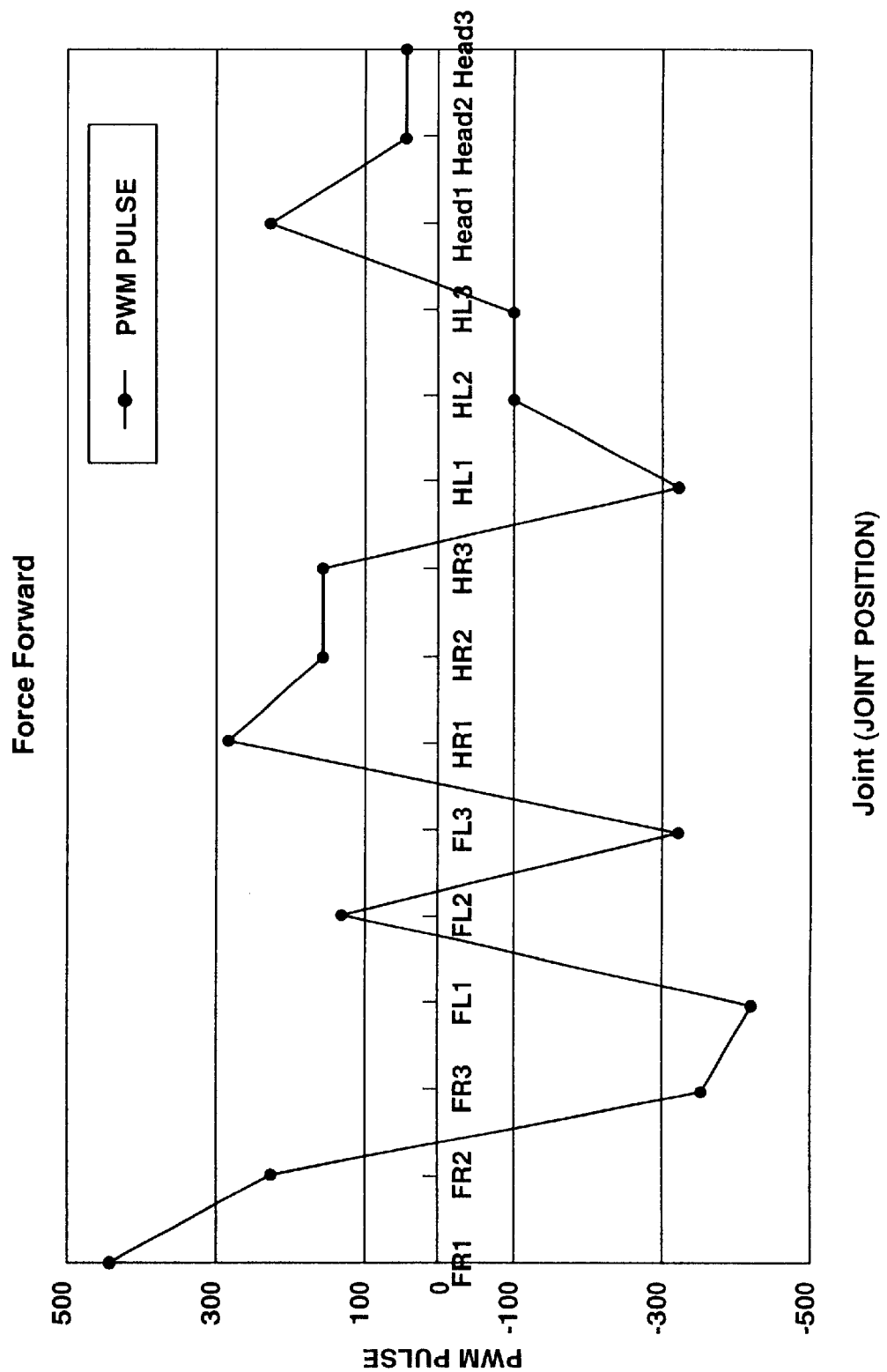
FIG. 20 is a characteristic curve of pulse widths used in the motion learning, showing pulse widths which are when the robot apparatus in standing position is pushed forward at the back thereof.
Figure 21:
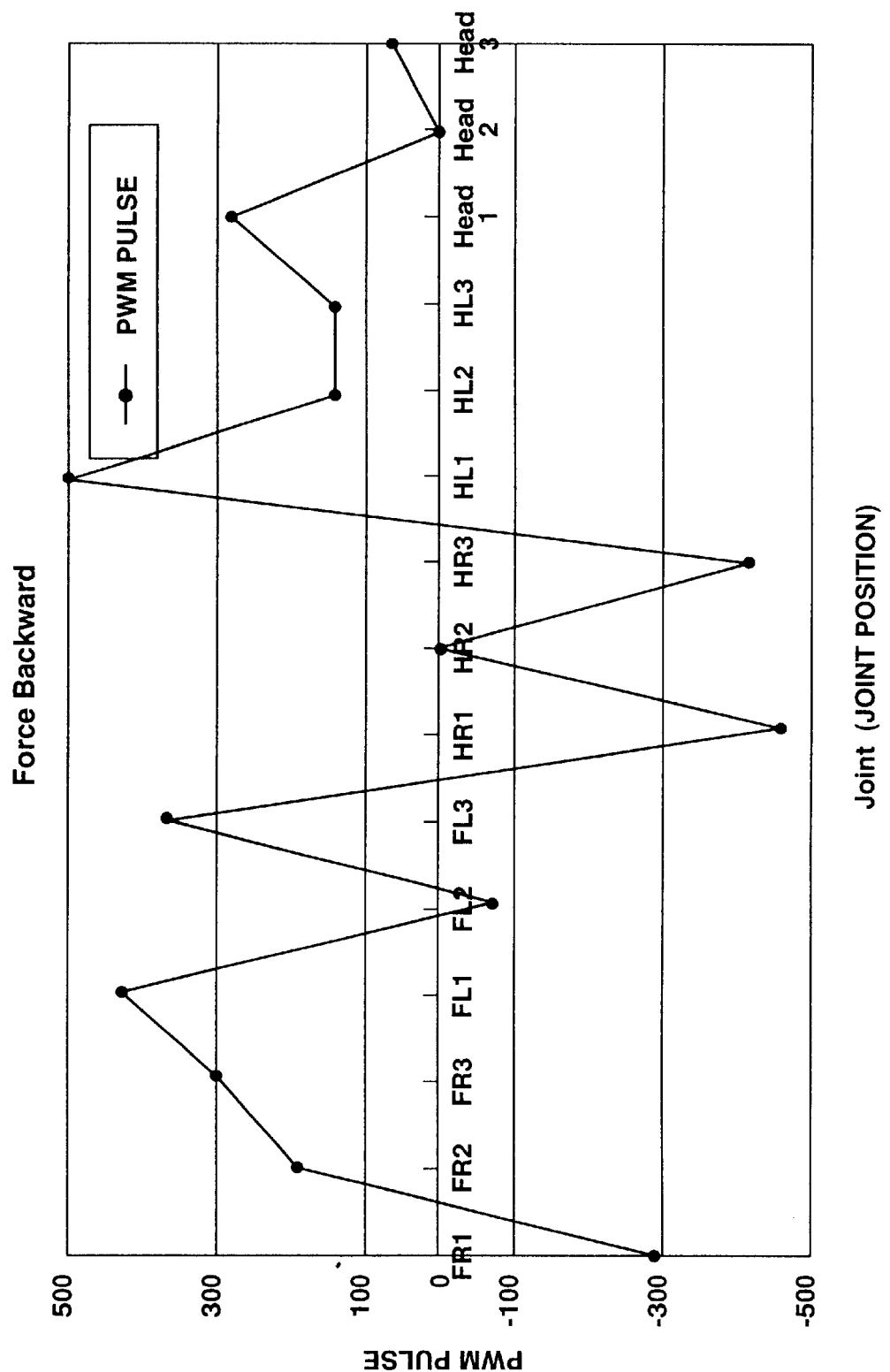
FIG. 21 is a characteristic curve of pulse widths used in the motion learning, showing pulse widths which are when the robot apparatus in standing position is pushed backward at the back thereof.
Figure 22:
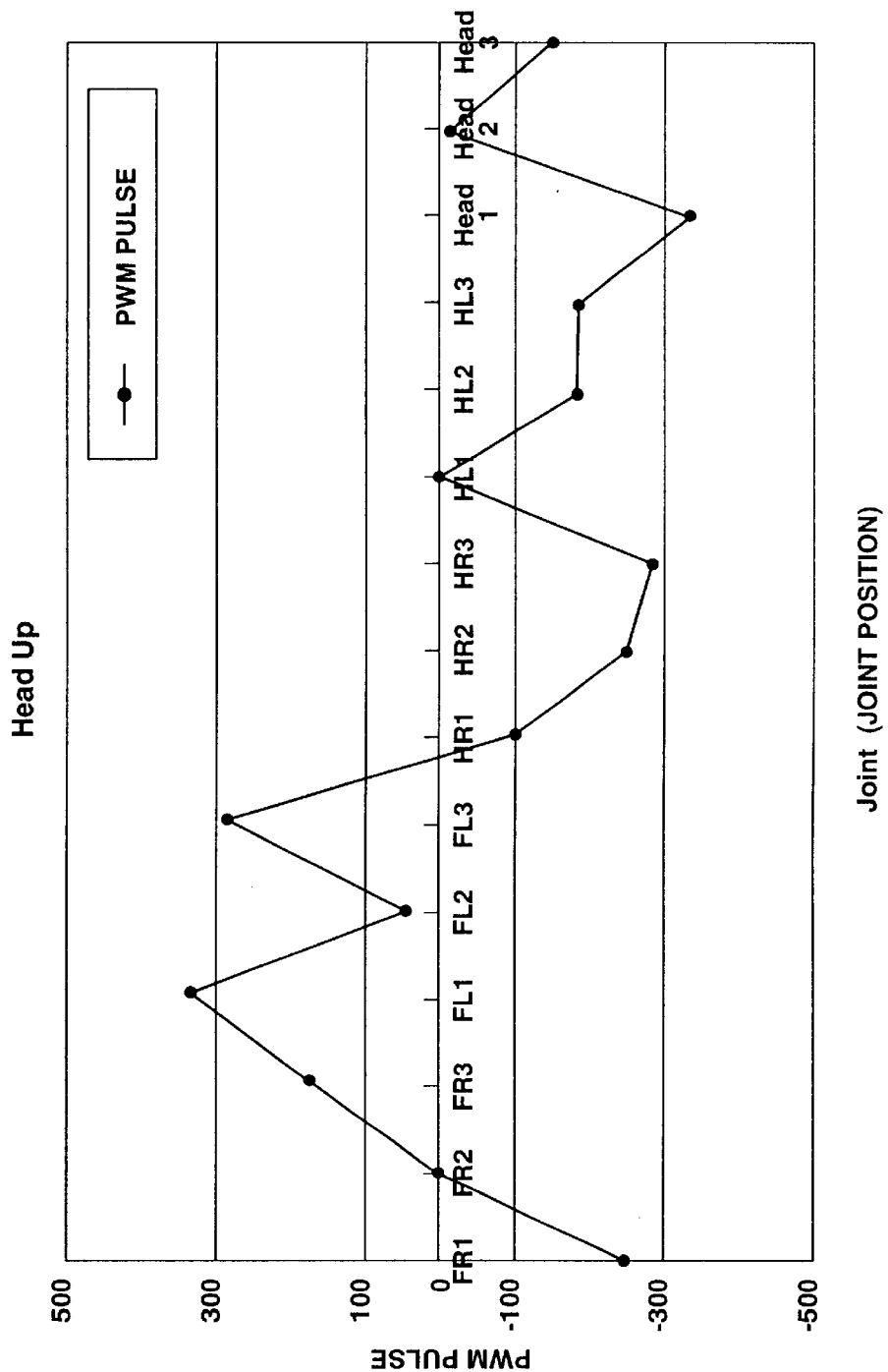
FIG. 22 is a characteristic curve of pulse widths used in the motion learning, showing pulse widths which are when the robot apparatus in standing position is pushed upward at the neck thereof.
Figure 23:
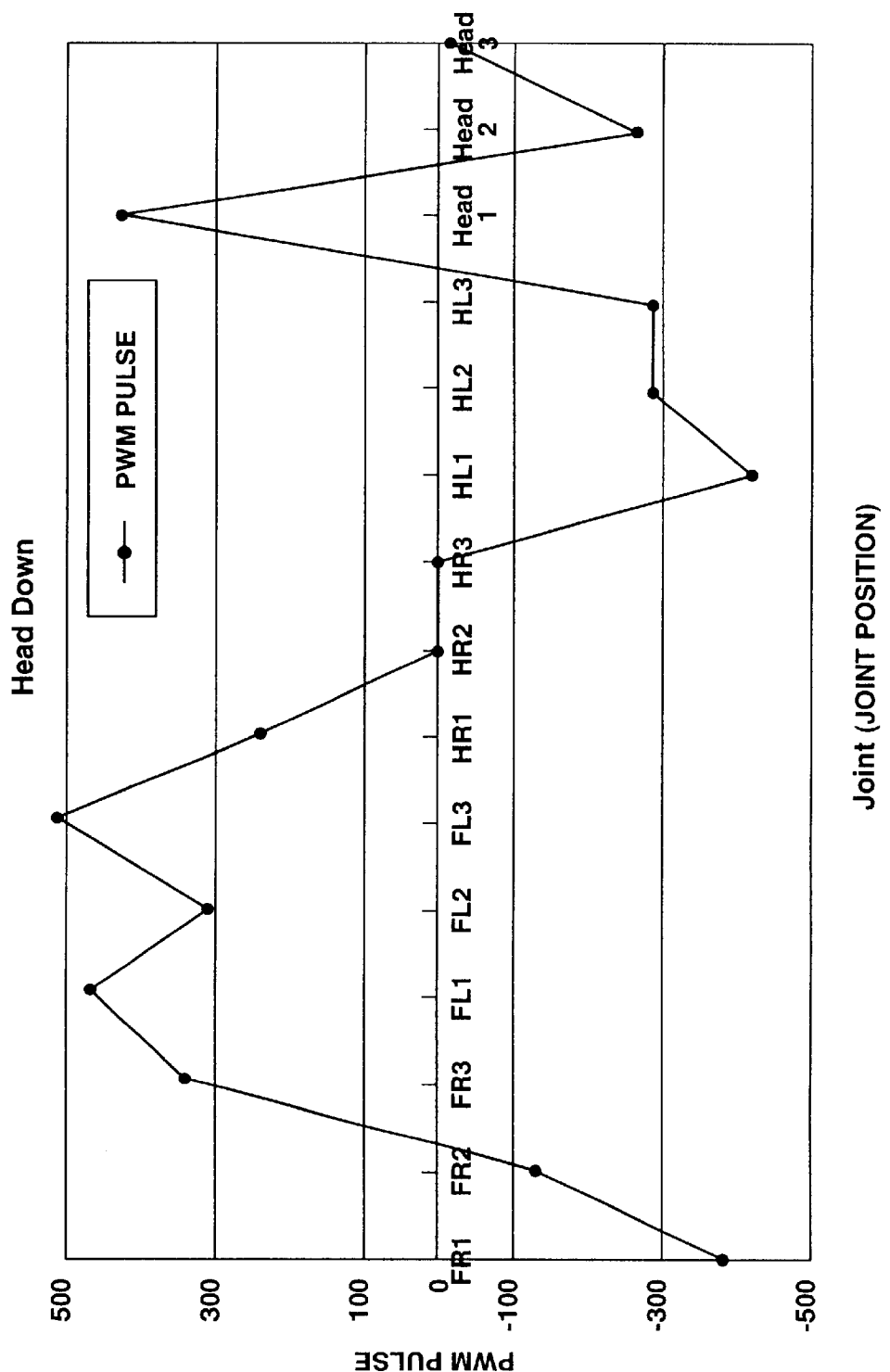
FIG. 23 is a characteristic curve of pulse widths used in the motion learning, showing pulse widths which are when the robot apparatus in standing position is pushed downward at the neck thereof.
Figure 24:
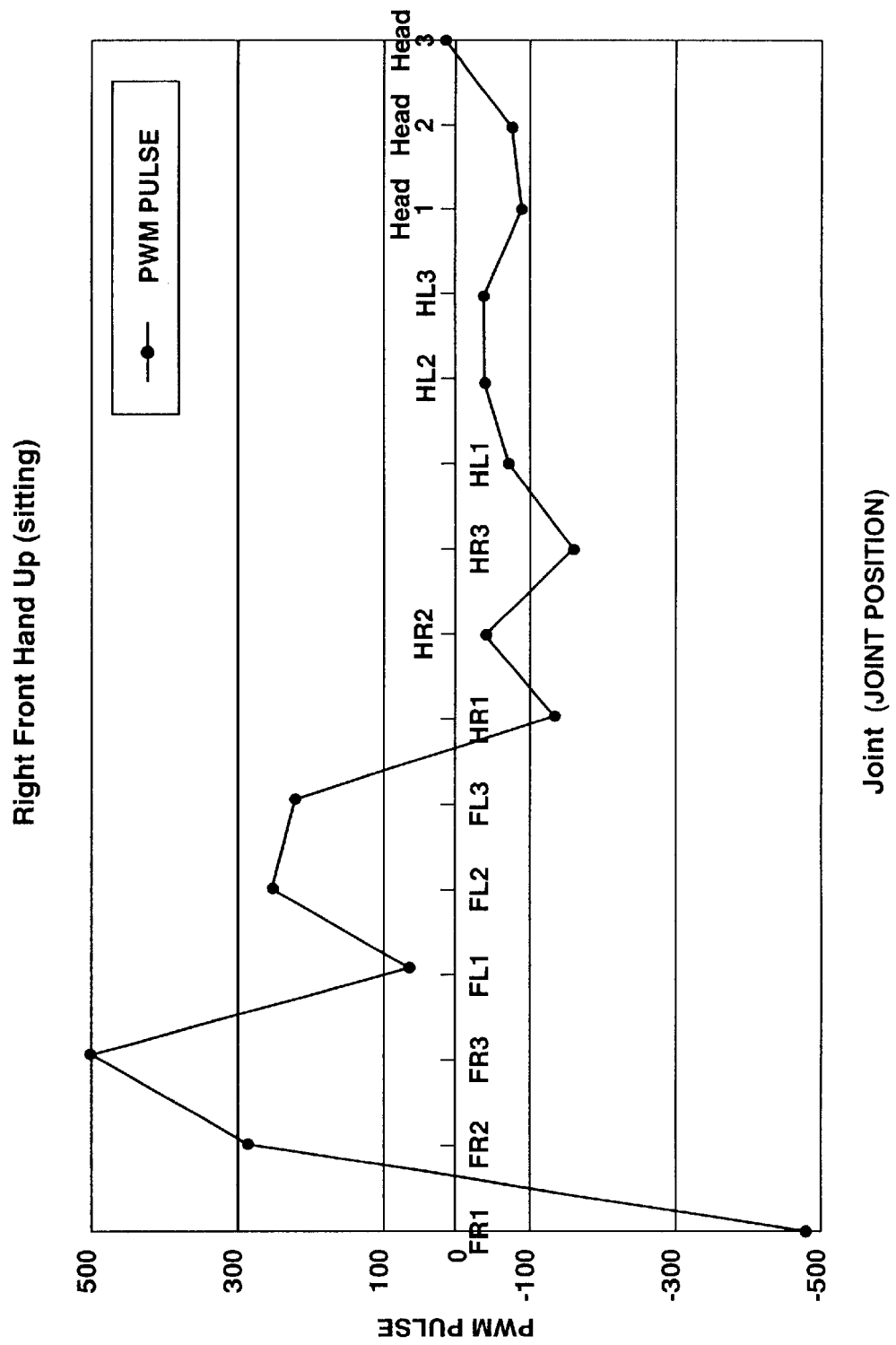
FIG. 24 is a characteristic curve of pulse widths used in the motion learning, showing pulse widths which are when the robot apparatus in sitting position is pushed upward at the neck thereof.
Figure 25:
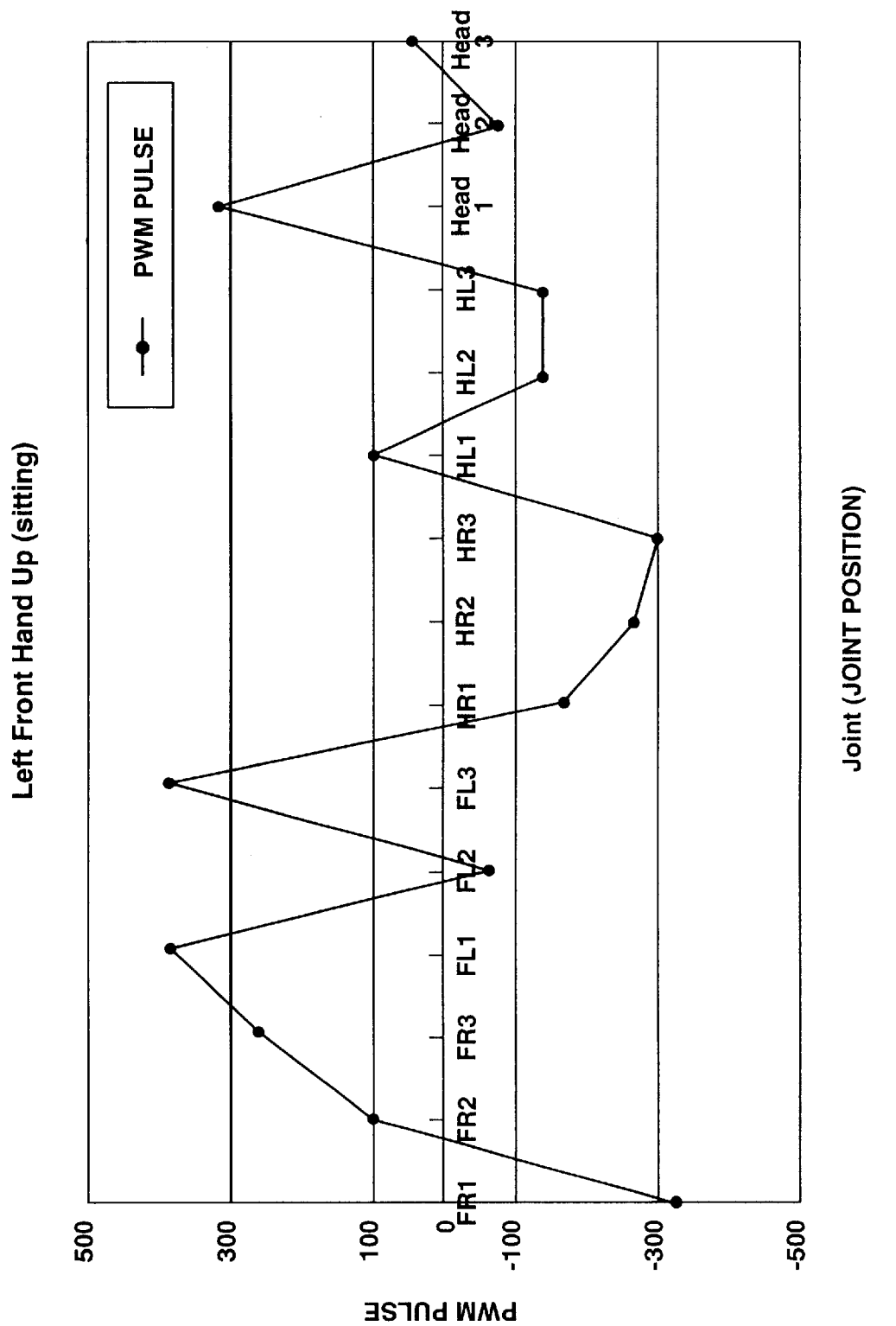
FIG. 25 is a characteristic curve of pulse widths used in the motion learning, showing pulse widths which are when the robot apparatus in sitting position is pushed downward at the neck thereof.

When the robot 1 in the standing position is pushed forward on the back, a pulse having a width as shown in FIG. 20 is produced. When the robot 1 in the standing position is pushed backward on the back, the width of a thus-produced pulse will be as shown in FIG. 21. When the robot 1 in the standing position is pushed up on the head, a pulse having a width as shown in FIG. 22 is produced. When the robot 1 in the standing position is pushed down on the head, there will be produced a pulse having a width shown in FIG. 23. When the robot 1 in the sitting position is held at the right leg, a pulse having a width as shown in FIG. 24 will be produced. When the robot 1 in the sitting position is held at the left leg, there is produced a pulse having a width as shown in FIG. 25. Based on these pulse widths, the discrimination unit 111 detects the corresponding postures of the robot 1 for learning a motion.

Figure 26:
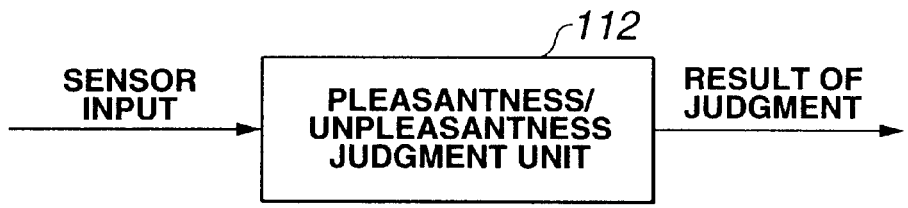
FIG. 26 is a block diagram of a pleasantness/unpleasantness judgment unit in the robot device.

Also, the robot 1 includes a pleasantness/unpleasantness judgment unit 112 as shown in FIG. 26 to enable such a motion learning as a real animal will do.

Receiving an output from the sensor data processor 102, the pleasantness/unpleasantness judgment unit 112 judges the data to be either an emotion value defining the pleasantness or a one defining the unpleasantness, and outputs corresponding action information. For example, when an emotion defining the unpleasantness in the emotion model 73 has a large value, the pleasantness/unpleasantness judgment unit 112 outputs action information which will cause action to avoid the unpleasantness. When the robot 1 is pushed backward on the back, the pleasantness/unpleasantness judgment unit 112 will judge the output from the sensor data processor 102 to be an emotion value defining the unpleasantness and output action information for shifting to the "sitting" position. Also, when the robot 1 is pushed forward on the back or down on the neck, the pleasantness/unpleasantness judgment unit 112 will judge the data from the sensor data processor 102 to be an emotion value defining the unpleasantness and output action information for shifting to the "prone" position. When the robot 1 in the prone position has the neck raised upward, the pleasantness/unpleasantness judgment unit 112 will judge the data from the sensor data processor 102 to be an emotion value defining the unpleasantness and output action information for shifting to the "sitting" position. When the robot 1 in the sitting position has the neck raised upward, the pleasantness/unpleasantness judgment unit 1 12 will judge the data from the sensor data processor 102 to be an emotion value defining the unpleasantness and output action information for shifting to the "standing" position. That is to say, when the robot 1 is applied with so a large external force as to feel unpleasant, the robot 1 will make the above motions. The action generator 105 generates action based on the above action information.

As in teaching of a posture to a real dog or the like, the robot 1 applied with action or external force will learn to shift from a current position where it feels unpleasant with such a handling to any other position.

Figure 27:
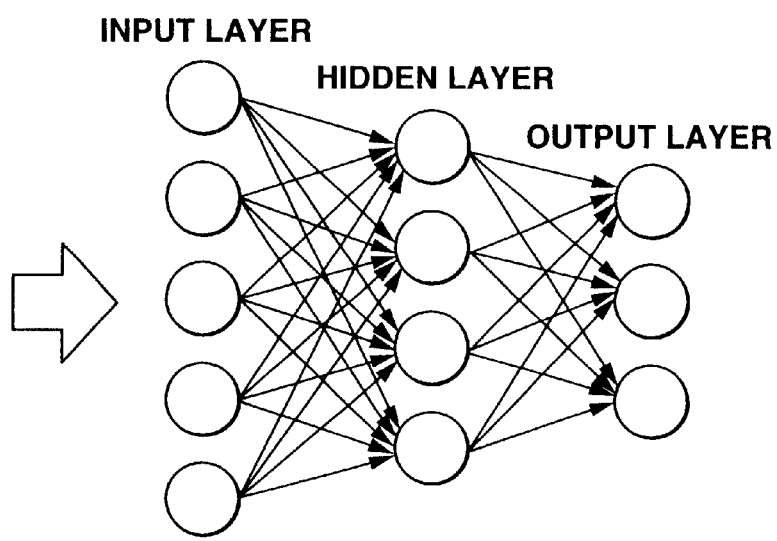
FIG. 27 explains a neural network.

Note that a motion is taught to the robot 1 by repeating the application of an external force or action a plurality of times. Also, the teaching or teaching is repeated for other postures (other discriminators). Each of the discriminators is constructed for a learning with a hierarchical neural network for example. As shown in FIG. 27, a three-layer neural network, for example, is composed of an input layer, hidden layer and an output layer. In this case, the procedure for learning or teaching is as will be outlined below.

In the input layer, sensor signal or the like formed correspondingly to the input layer is supplied to each neuron. In the hidden layer, feature of data transmitted via each neuron of the input layer is extracted. More particularly, each neuron in the hidden layer remarks some feature of input data and extracts it for evaluation. In the output layer, features from the neurons of the hidden layer are combined together to make a final decision.

In the above three-layer neural network, there is established a back-propagation-based learning which can be adopted to construct a discriminator for example. Thus, by pushing backward the robot 1 on the back, $O_1=[0, 1, 0, 0, 0]$ is supplied to the discriminator and the latter will output a value (real number) approximate to [0, 1, 0, 0, 0].

As in the above, the robot 1 can learn an arbitrary motion via the discrimination unit 111. Thus, through learning of image and speech signals in association with each other, the robot 1 can make, in response to a predetermined utterance (speech signal) given thereto, a motion it has learned correspondingly to the predetermined utterance.

(4-3) Learning of an External Force Applied to the Robot 1

In the foregoing, the learning of an arbitrary motion has been described. In the learning of arbitrary motion, the robot 1 learns a motion (posture) to which the robot 1 is urged by an external force applied thereto and makes the motion in response to a given predetermined utterance (speech signal). Learning of types of such an external force will be described here below. After having learned the type of an applied external force, the robot 1 can make a predetermined motion when the external force the robot 1 has learned is applied. More particularly, when the robot 1 having learned an external force applied to the waist for shifting to a sitting position is applied to the waist thereof with an external force equivalent to that external force, it will recognize the external force input and make a sitting motion for example as a predetermined motion. The learning of an external force will further be described here below.

Figure 28:
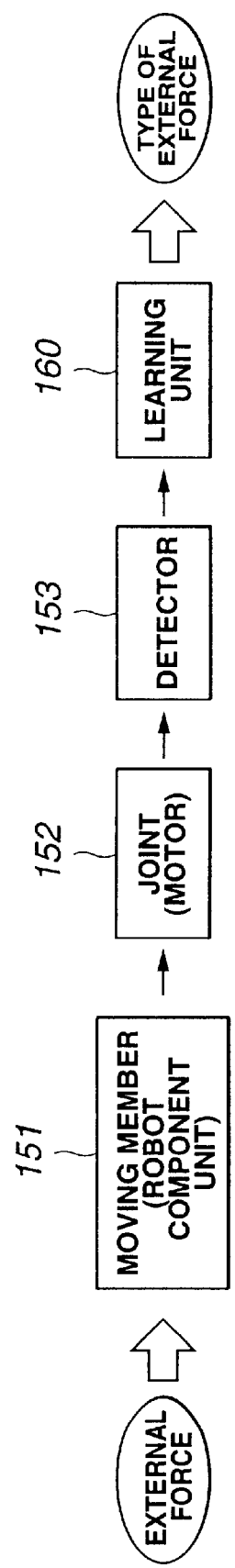
FIG. 28 is a block diagram of a configuration of the robot apparatus according to the present invention, destined for learning an external force.

For learning an external force, the robot 1 includes a moving member 151, joint unit 152 to move the moving member, detector 153 to detect the state of the joint unit 152 having an external force applied thereto via the moving part 151, and a learning unit 160 to learn the state of the joint unit 152, detected by the detector 153, and the external force in association with each other, as shown in FIG. 28. After having learned the state of the joint unit 152 and external force, the robot 1 can identify, when applied with an external force, the type of the external force based on the state of the joint unit 152. The moving member 151 includes portions the leg units 3A to 3D, head unit 4 and tail unit 5, joined to the body unit 2 and driven by the actuators $25_1$ to $25_n$ as shown in FIGS. 6 and 8. The joint unit 152 includes such actuators, and more particularly, the motors forming the actuators.

Owing to the above construction, the robot 1 can learn an external force by the use of a PWM pulse supplied to the motor (actuator). As in the above, in the robot 1, portions of the leg units 3A to 3D, head unit 4 and tail unit 5, joined each with adjoint to the body unit 2 are the moving members. Each of the leg units 3A to 3D is composed of a plurality of moving members joined with a plurality of joints (shoulder joint, knee joint and ankle joint) to each other, and the leg units 3A to 3D are joined with joints to the front right and left and rear right and left, respectively, of the body unit 2, and the head unit 4 and tail unit 5 are joined with joints to the front and rear ends, respectively, of the body unit 2. The joints enabling the moving members to move are formed from the actuators $25_1$ to $25_n$. The PWM pulse signal is supplied to the motors (actuators $25_1$ to $25_n$ joined).

The width of the PWM pulse signal depends upon the state of the joint (motor) 152 to which an external force is applied via the moving part 151 (each unit as in the above). Namely, it is computed as an error or difference between a target angle and actual one of each joint (motor). Thus, when an external force is applied to the robot 1, the error will be larger and the pulse width be larger. That is to say, as the robot 1 is applied with a larger external force, the width of the PWM pulse signal will be larger. The robot 1 thus learns an external force by the use of such a PWM pulse signal. The detector 153 detects the width of PWM pulse signal as a state of the joint unit 152 on which an external force acts via the moving member 151. Note that since the width of the PWM pulse signal is computed as an error or difference between a target angle and actual one of each joint (motor) as in the above, the state of the joint unit 152, detected by the detector 153, may be said to be an error or difference between a target angle and actual one of each joint (motor). Also note that the detector 153 may be implemented as a function of the signal processing circuit 14 shown in FIG. 8 and other or by a software or object program.

In this embodiment, a PWM pulse signal supplied to the motors (joint) in the leg units 3A to 3D and one supplied to the motors (joint) in the body unit 2 and head unit 4 are used as a PWM pulse signal used in learning an external force as will further be describe later. FIGS. 19 to 25 show the changes of such PWM pulse signals supplied to the joints (motor) for use to learn external forces applied to the robot. As will be seen through comparison the pulse width pattern, shown in FIG. 20, which takes place when the robot 1 is pushed forward on the back and the pulse width pattern, shown in FIG. 21, which takes place when the robot 1 is pushed backward on the back, the width of the PWM pulse is generally symmetrical with respect to "0" (x-axis).

In the external-force learning, the patterns of PWM pulse width (more specifically, vectors), taking place when various external forces are applied to the robot 1, are used as learning data in the learning unit 160 in which the neural network is used for the external-force learning. The learning unit 160 is implemented by a software or an object program for example.

Figure 29:
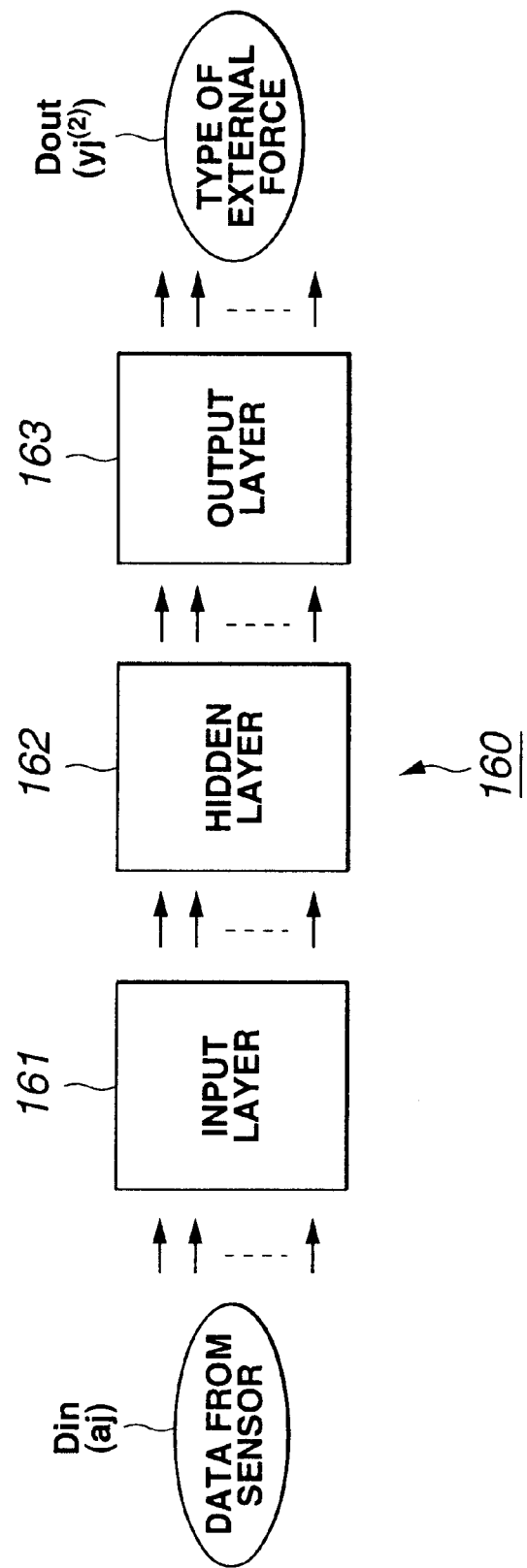
FIG. 29 shows a three-layer back-propagation neural network.
Figure 30:
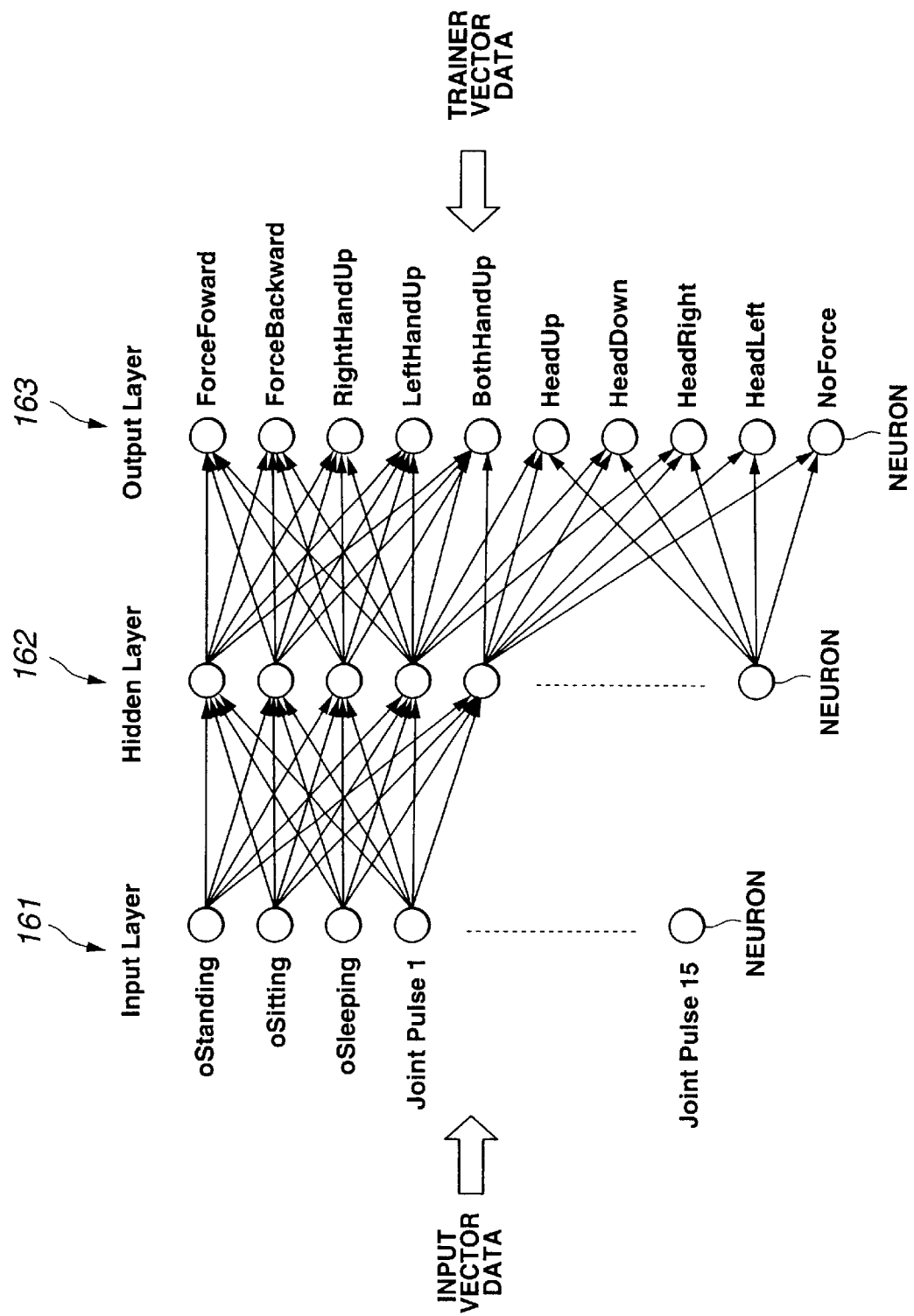
FIG. 30 shows a system of neurons in each layer in the three-layer back-propagation neural network.

As the neural network, a back-propagation neural network of a layer-connection type network is used for the external-force learning. The back-propagation neural network is highly adaptive to the pattern recognition, and this embodiment uses a three-layer back-propagation neural network consisting of an input layer 161, hidden layer (middle layer) 162 and an output layer 163 as shown in FIGS. 29 and 30.

In the three-layer back-propagation neural network, when information (pulse width) $D_{in}$ is supplied from a touch sensor to the input layer 161 after learning an external force, the output layer 163 will output information $D_{out}$ on the type of the external force learned, corresponding to the information $D_{in}$ supplied from the touch sensor.

The input layer 161, hidden layer 162 and output layer 163 in the three-layer back-propagation neural network are constructed as will be described below.

The input layer 161 has a plurality of neurons (18 neurons in this embodiment). That is, the input layer 161 is supplied with 18 data for the external-force learning. The robot 1 has three types of current postures "standing", "sitting" and "sleeping" for example. The widths of PWM pulse signal supplied to each joint (motor in the join) are in 15 types (12 types (=3 types×4) for supply to the four leg units and 3 types for supply to the head unit). Therefore, a total of 18 types of PWM pulse widths are supplied as data to the input layer 161.

The current postures are used for the external-force learning for the state of a joint depends upon the posture of the robot 1, namely, since the pulse width depends upon the posture of the robot 1.

The input layer 161 is supplied with a pattern being a vector composed of various pulse widths as information $D_{in}$, from the touch sensor. Note that in this embodiment, since the input pulse width takes a value within the range of [−512, 512], it is normalized by the following equation (7):

$$\text{Imput}=(P+|P_{min}|)/(P_{max}+|P_{min}|) \qquad (7)$$

where P is a measured pulse width, $P_{max}$ is a maximum pulse width (512) and $P_{min}$ is a minimum pulse width (−512). Since the input data about the posture takes a value [0, 1] (either 0 or 1), the pulse width has not to be normalized.

The hidden layer 162 has a plurality of neurons (17 neurons in this embodiment). The number of the neurons is determined by the so-called rule of thumb. That is, the number of neurons in the input layer 161 and that in the output layer 163 are averaged and the result is smoothed to determine the number of neurons. The number of neurons "numOfHidden" in the hidden layer 162, determined by the rule of thumb, is given by the following equation (8):

$$\text{numOfHidden}=(\text{numOfInput}+\text{numOfOutput})/2+2=14+\alpha \qquad (8)$$

where "numOfInput" is the number of neurons in the input layer 161, "numOfOutput: is the number of neurons in the output layer 153 and α is a value which is increased or decreased by the smoothing. Placing "18" as the number of neurons "numOfInput" in the input layer 161 and "10" as the number of neurons "numOfOutput" in the output layer 153 in the equation (8) will provide a number "17" of neurons "numOfHidden" in the hidden layer 162.

The output layer 163 has a plurality of neurons (10 neurons in this embodiment). With the 10 neurons in the output layer 163, the robot 1 can recognize 10 types of external force by learning. Namely, the robot 1 can recognize 10 types of external force including, for example, "ForceForward" (external force by which the robot 1 is pushed forward on the back, as in FIG. 20), "ForceBackward" (external force by which the robot 1 is pushed backward on the back, as in FIG. 21), "RightHandUp" (external force by which the right hand is raised, as in FIG. 24), "LeftHandUp" (external force by which th left hand is raised, as in FIG. 25), "BothHandUp" (external force by which both the hands are raised, not shown), "HeadUp" (external force by which the head is raised, as in FIG. 22), "HeadDown" (external force by which the head is pushed down, as in FIG. 23), "HeadRight" (external force by which the head is pushed to right, not shown), "HeadLeft" (external force by which the head is pushed to left, not shown) and "Noforce" (no external force applied, as shown in FIG. 9).

Figure 31:
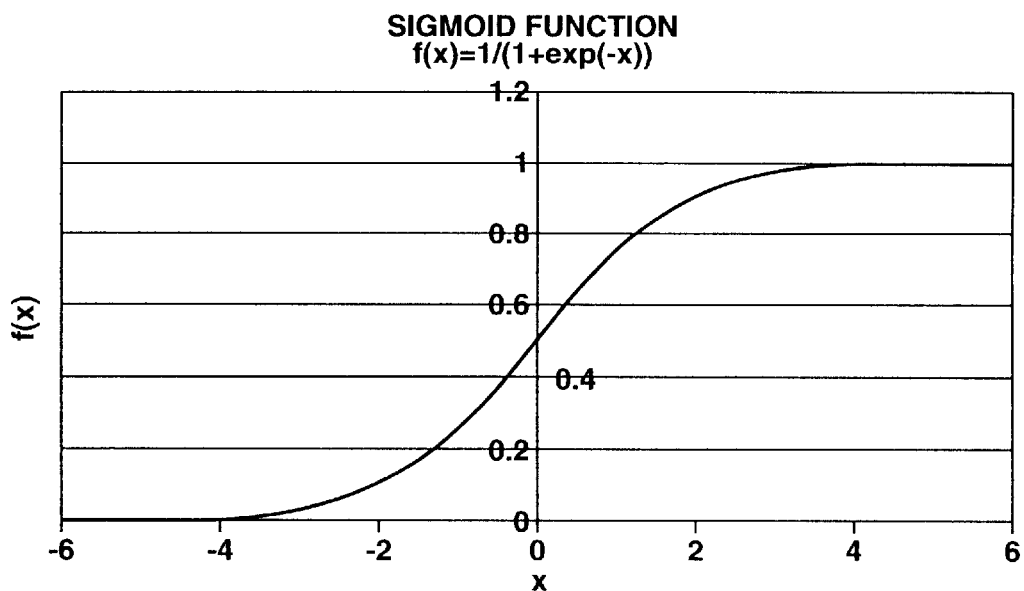
FIG. 31 is a characteristic curve of sigmoid function.

The input layer 161, hidden layer 162 and output layer 163 are constructed as in the above. Various input/output functions may be used in the hidden layer 162 and output layer 163 but in this embodiment, the so-called sigmoid function is used. Different from the so-called threshold function, the sigmoid function has a characteristic that it provides an output which changes smoothly with respect to an input sum as shown in FIG. 31.

The three-layer back-propagation neural network is used to learn various external forces as in the following.

The external-force learning is done by supplying the network (learning unit 160) with a pair of input vector data and teaching signal vector data as shown in FIG. 30. Trainer vector data is supplied so that a certain neuron outputs "1" while other neurons output "0". Namely, "1" is supplied for an external force of a type to be recognized while "0" is supplied for all external forces of other types.

The middle or hidden layer 162 provides an output $y_j(1)$ as a result of the input sum by computing the sigmoid function "sigmoid ( )" given by the following equation (9), the output layer 163 provides an output $y_j(2)$ as a result of the input sum by computing the sigmoid function "sigmoid ( )" given by the following equation (10). The following equation (11) is used to renew the weight, that is, to learn the weight. The sigmoid function "sigmoid ( )" is a function given by the following equation (12).

$$y_j^{(1)} = sigmoid\left(\sum_{i=0}^{numOfInput} W_{ij} a_i\right) \quad (9)$$

$$y_j^{(2)} = sigmoid\left(\sum_{i=0}^{numOfHidden} W_{ij}^{(2)} y_i^{(1)}\right) \quad (10)$$

$$W_{ij}^{(m+1)}(t) = W_{ij}^{(m+1)}(t-1) - \epsilon y_i^{(m)}(t) z_i^{(m+1)} + \beta W_{ij}^{(m+1)}(t-1) (m=0, 1) \quad (11)$$

$$sigmoid(x) = 1/(1+\exp(-x)) \quad (12)$$

where $a_i$ is the width of each input pulse signal, $z_i$ is an error back-propagation output, $\epsilon$ is a learning function, and $\gamma$ is a moment coefficient. The learning function ($\epsilon$) and moment coefficient ($\beta$) are factors greatly affecting the learning speed. For example, in the robot 1 constructed as in this embodiment, the learning speed can be made optimum with $\epsilon=0.2$ and $\beta=0.4$.

Entry of input vector data and that of trainer vector data are repeated a plurality of times until the difference or error between the input vector data and trainer vector data supplied to the neural network is less than a threshold. Then, the learning is ended. For example, the learning is ended when a mean error as given by the following equation (13) is less than a threshold:

$$error = (\Sigma |te-a|^2)/numOfOutput \quad (13)$$

where a is input vector data and te is trainer vector data.

For example, the robot 1 is made to learn the same data repeatedly 10 times in an on-line learning (consecutive learning). Also, the robot 1 is made to learn data of the same pattern continuously about 20 times. Thereby, the robot 1 will have learned a total of about 800 samples.

Figure 32:
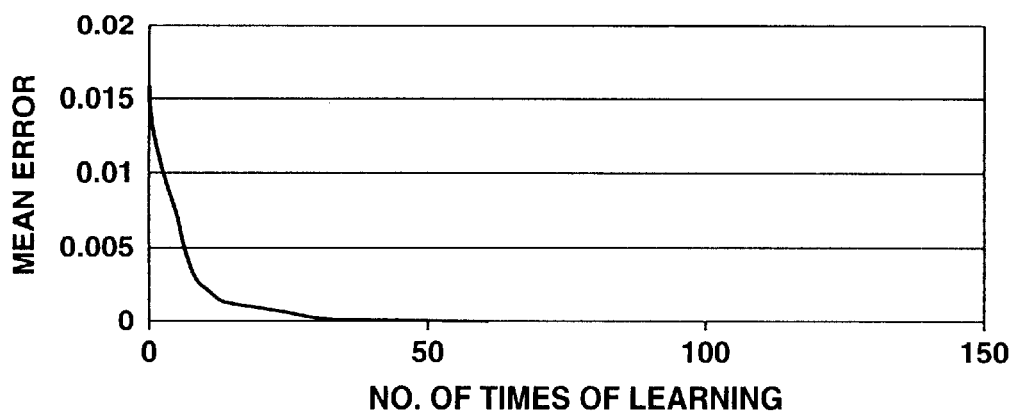
FIG. 32 is a characteristic curve of the relation between number of times of learning and mean error.

FIG. 32 shows an example of the relation between a number of times of learning and a mean error. As seen from FIG. 32, the mean error when learning has been made about 50 times is minimum, which means that the learning has been ended with 50 times of try. Note that an initial value of weighting factor is normally given at random, it depends upon the initial value how many times a learning should be repeated. That is, depending upon the initial value, the learning will be ended with about 50 times of try in one case as in the above, but with about 150 times of try in the other case.

The three-layer back-propagation neural network is used to learn an external force as in the above. Thus, the robot 1 can receive a plurality of types of input external forces (an external force supplied a plurality of times) and learn the plurality of input external forces in association with a state of the joint unit 152 (e.g., PWM pulse width) to categorize (classify) the external force. Note that it is confirmed by the so-called versatility test by the robot 1 whether an external force could have successfully been categorized or not, for example.

More particularly, for example, when the robot 1 is applied at the waist thereof with an external force, it recognizes, through the above-mentioned learning, that the external force applied to the waist is included in the plurality of types of external forces it has ever learned, more specifically, that the pulse width (pattern) caused by the external force applied to the waist corresponds to any of PWM pulse widths (pattern) supplied to each joint unit 152, to thereby sit as a corresponding sitting motion. Thus, the freedom of an instruction by touching (external force) by the user can be enlarged for the robot 1 to make many types of motions.

Note that in the above, the learning using the three-layer back-propagation neural network has been described but the learning unit can of course use any other method of learning. For example, the learning unit can use SVM (support vector machine) to categorize an external force applied to the robot 1. The SVM is a method for linearly classifying external forces as in the "Perceptron". More specifically, the SVM is to map data once in a nonlinear space and determine a hyperplane separate in the space, and thus can solve an actually nonlinear problem.

Normally, in a pattern recognition, when a test sample $x=(x_1, x_2, X_3, \ldots x_n)$, a recognition function $f(x)$ given by the equation (14) can be determined:

$$f(x) = \sum_{j=1}^{n} v_j x_j + b \quad (14)$$

On the assumption that the supervise label is $y=(y_1, y_2, y_3, \ldots, y_n)$, a problem to minimize $\|V\|^2$ should be solved under the constraints as given by the following expression (15):

$$\text{Constraints: } y_j(V^T x^j + b) \geq 1 \quad (15)$$

Such a constraint problem can be solved with the Lagrange's method of undetermined multipliers. By introducing a Lagrange's multiplier, the problem can be expressed as given by the following equation (16):

$$L(w, b, \alpha) = \frac{1}{2}\|v\|^2 - \sum_{i=1}^{l} a_i(y_i((x_i^T v + b) - 1)) \quad (16)$$

By partial differentiation of b and v as in the following equation (17), a quadratic programming problem as given by the following equation (18) can be solved. The constraints is given by the following expression (19).

$$\partial L/\partial b = \partial L/\partial V = 0 \quad (17)$$

$$\max \Sigma a_i - \frac{1}{2} \alpha_i \alpha_j y_i y_j x_i^T x_j \quad (18)$$

$$\text{Constraints: } \alpha_i \geq 0, \Sigma \alpha_i y_i = 0 \quad (19)$$

When the number of dimensions in the feature space is smaller than the number of discipline samples, a slack variable $\xi \geq 0$ is introduced to change the constraints to that given by the following expression (20):

$$\text{Constraints: } y_i(V^T x_i + b) \geq 1 - \xi_i \quad (20)$$

For the optimization, an objective function given by the expression (21) is optimized:

$$\frac{1}{2}\|V\|^2 + C\Sigma \xi_i \quad (21)$$

where C is a coefficient to designate an extent to which the constraints are eased. A value for C has to be determined experimentally. The problem concerning the Lagrange's multiplier α is changed to the following expression (22). The constraints is given by the following expression (23).

$$\max \Sigma a_i - \tfrac{1}{2}\alpha_i \alpha_j y_i y_j x_i^T x_j \quad (22)$$

$$\text{Constraints: } 0 \leq \alpha_i \leq C, \ \Sigma \alpha_i y_i = 0 \quad (23)$$

With the above operations, however, no nonlinear problem can be solved. So, a kernel function K(x, x') being a nonlinear map function is introduced, data is mapped once in a high-dimensional space and linearly separated in the space. Thereby, the data can be handled as having been nonlinearly separated in the original dimension. Using a map Φ, a kernel function can be given by the following equation (24), and a discrimination function is given by the following equation (25).

$$K(x, x') = \Phi(x)^T \Phi(x') \quad (24)$$

$$f(\Phi(x)) = V^T \Phi((x) + b = \Sigma \alpha_i y_i K(x, x_i) + b \quad (25)$$

An external function is learned by computing a function given by the following expression (26), and the constraints is given by the following equation (27):

$$\max \Sigma a_i - \tfrac{1}{2}\Sigma \alpha_i \alpha_j y_i y_j K(x_i, x_j) \quad (26)$$

$$\text{Constraints: } 0 \leq \alpha_i \leq C, \ \Sigma \alpha_i y_i = 0 \quad (27)$$

The kernel function can be a Gaussian kernel function given by the following equation (28):

$$K(x, x') = \exp\left(-\frac{|x-x'|^2}{\sigma^2}\right) \quad (28)$$

Action can be categorized by the SVM based on the aforementioned principle.

In the foregoing, the learning of an external force by the robot 1 based a state of a joint unit has been described. However, the learning can be done only by detecting an external force acting on the robot 1 based on a state of the joint. To this end, the robot 1 includes a detector to detect the state of a joint which moves the moving member and a detector to detect an external force acting on the moving member on the basis of the joint state detected by the joint state detector. These detectors may be the detector 153 shown in FIG. 28.

The robot 1 constructed as in the above can detect, based on the state of adjoint, that an external force has been applied thereto. The joint state detector and external force detector may be implemented by a software or an object program for example. Therefore, the robot 1 can detect an external force applied thereto without such dedicated detectors (hardware). Also, it can be said that the robot 1 can learn an external force without any such special elements.

Note that the above-mentioned external force detecting system in the robot 1 is a so-called external force detector. The external force detecting system may of course be applied to other than the robot 1.

In this embodiment, the PWM pulse signals supplied to the motors forming the joints of the leg units 3A to 3D and those supplied to the motor forming the joints of the body unit 2 and head unit 4 are used for learning external forces. However, the present invention is not limited to these PWM pulse signals but a PWM pulse signal supplied to a motor forming any other joint may be used.

Also in the above, use of the PWM pulse signal for learning an external force has been described. However, the present invention is not limited to any PWM pulse signal, but a signal which varies depending upon an external force may be used for learning the external force.

(4-4) Recognition of Speech Signal (Detail Description of the Speech Recognition Unit)

Figure 33:
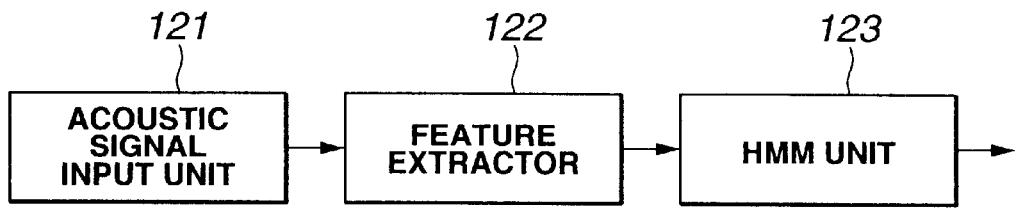
FIG. 33 is a detailed block diagram of the speech recognition unit in the robot apparatus.

Next, the recognition of speech signals will be described in detail. To recognize speech signals, the robot 1 includes a speech (acoustic) signal input unit 121, feature extractor 122 and an HMM unit 123 as shown in FIG. 33. The feature extractor 122 and HMM unit 123 are included in the speech recognition unit 101 shown in FIG. 15.

The acoustic signal input unit 121 is supplied with sounds from around the robot 1. Namely, it is the aforementioned microphone 23 for example. An acoustic signal (speech signal) from the acoustic signal input unit 121 is outputted to the feature extractor 122.

The feature extractor 122 detects a feature of the acoustic speech and outputs it to the downstream HMM unit 123, The HMM unit 123 adopts a hidden Markov model which classifies the input acoustic signal based on the detected feature. For example, it identifies the acoustic signal on the basis of a plurality of classes. Then, the HMM unit 123 outputs the result of a recognition made based on each of the classes as a probability of correspondence of each of the classes to a word, for example, as a vector value.

Owing to the above components, the robot 1 identifies an input speech from the microphone 23 or the like as a phoneme sequences.

Figure 34:
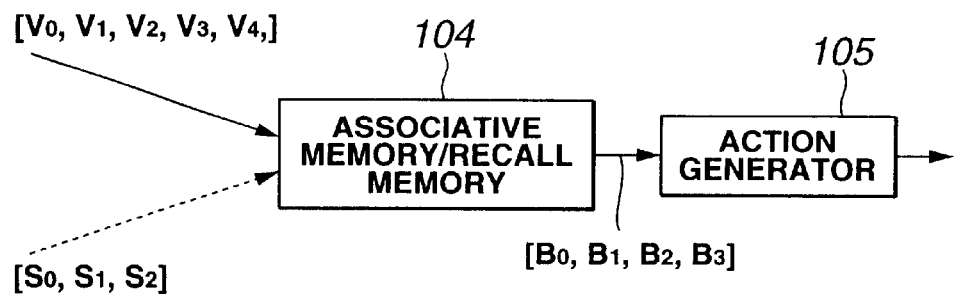
FIG. 34 is a block diagram of an associative memory/recall memory and action generator in the robot apparatus.

Then, information $[S_0, S_1, S_2]$ of a language recognized by the HMM unit in the speech recognition unit 101 is supplied along with information $[V_0, V_1, V_2, V_3, V_4]$ on a motion, having been acquired by the sensor data processor 102, to the associative memory/recall memory 104 as shown in FIG. 34.

In learning, the associative memory/recall memory 104 stores the above information in association with each other. After the learning, the associative memory/recall memory 104 will output action information based on the input information, for example, action information $[B_0, B_1, B_2, B_3]$ in the form of a vector value for example.

Figure 35:
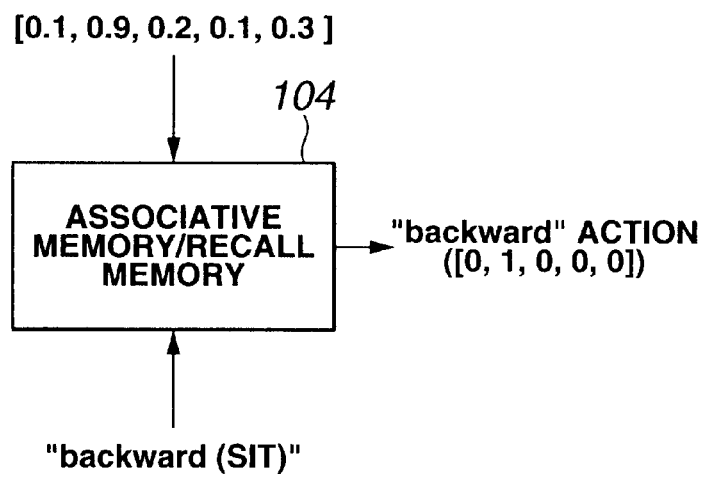
FIG. 35 is a block diagram of the associative memory/recall memory used in the robot apparatus.

As shown in FIG. 35, for example, in case a language "backward" as a result of the speech recognition and vector [0.1, 0.9, 0.2, 0.1, 0.3] as a result of the action acquisition have been supplied to the associative memory/recall memory 104 for the purpose of learning, if an uttered language "backward" is supplied to the associative memory/recall memory 104 after the learning, the associative memory/recall memory 104 will output action information [0, 1, 0, 0, 0] for a "backward" motion.

In the foregoing, the learning by the associative recalling by the robot 1 has been described. Next, a learning by a shared attention facilitating to identify a target object will be described.

(5) Shared Attention

The robot 1 to learn a speech or image is designed to identify a specific speech or image based on a background noise and taken as a target object. The shared attention facilitates to identify such a target object. For example, the shared attention is made possible by generating stimuli by which a trainee (robot 1) can specify a target object, such as shaking or swinging the target object (visual stimulus) or uttering (acoustic stimulus).

Figure 36:
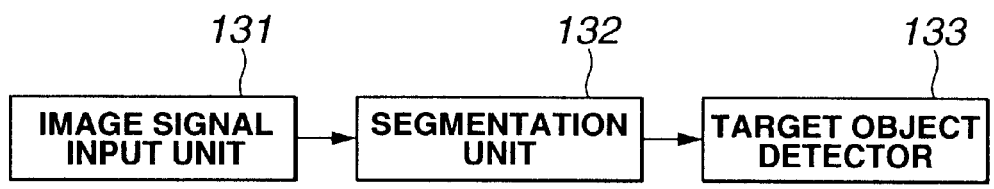
FIG. 36 is a detailed block diagram of a sensor data processor in the robot apparatus.

For the shared attention, the robot 1 includes an image signal input unit 131, segmentation unit 132 and a target object detector 133 as shown in FIG. 36. The segmentation unit 132 and target object detector 133 function to identify a target object. The aforementioned action generator 105 provides action based on the target object information thus identified and stored in the associative memory/recall memory 104 and information on a new object.

The image signal input unit 131 images the surroundings of the robot 1. More specifically, it is the CCD camera 20 as shown in FIG. 8. An image signal from the image signal input unit 131 is supplied to the segmentation unit 132.

The segmentation unit 132 make a segmentation of an image signal, for example, a segmentation according to colors. The "segmentation" is to identify an area in an image and examine features of the area or map the features in a feature space. The segmentation permits to differentiate between a target object and a background in a pick-up image. An image signal thus segmented by the segmentation unit 132 is supplied to a downstream target object detector 133.

The target object detector 133 detects (identifies) a remarkable portion (target object) from the image information segmented as in the above. The detector 133 detects, for example, a moving portion, that is, a portion varying with the time elapse, as a target object from the segmented image information when the portion fulfills a certain requirement. A target object is detected as will further be described below.

First, a remarkability level is set for a moving portion (time-varying portion) as a specific area in a segmented image. The "remarkability level" is an index for identification of a target object. When a target object is identified based on a motion, the remarkability level will vary with the motion.

The specific area is traced to judge, according to its remarkability level, whether it is a target object or not. When the remarkability level meets a certain requirement, the robot 1 is made to identify the specific area as a target object, namely, the robot 1 is caused to "remark" it.

For identification of a target object according to its motion, the trainer of a real dog or the like, when having the dog remark the target object, will shake or swing the target object to attract attention of the dog. For example, when teaching a trainee a "glass", the trainer will shake it while uttering "glass" to the trainee.

The target object detector 133 traces a specific area, and when its remarkability level is as predetermined, namely, when the motion varies a predetermined amount, the target object detector 133 will identify the specific area as a target object to have the robot 1 pay attention to the specific area. More particularly, when the remarkability level is equal to or exceeds a threshold, the robot 1 will pay attention to the specific area.

As in the above, the target object detector 133 sets a remarkability level for a specific area by means of the segmentation unit 132 to detect (identify) a target object.

The image signal input unit 131 includes the segmentation unit 132 and target object detector 133 to enable the robot 1 to make a shared attention.

Thus, the robot 1 can appropriately identify a target object to appropriately learn it in association with image information or action as in the above.

In the above embodiment, a target object is identified based on a motion of an object in the shared attention by the robot 1. However, the present invention is not limited to this manner of identification. For example, a target object can be identified based on a speech. In this case, when a speech takes place, the robot 1 will direct itself towards the origin of the speech and identify the speech as a target object. For example, a remarkability level is set for a speech, namely, a direction towards the speech and volume of the speech, and the speech is identified as a target object when the direction and volume meet certain requirements.

Also, the attention to a target object may attenuate with time lapse. Alternatively, it may be set to attenuate when the association with a target object becomes stable. Thereby, it is possible to pay attention to a new stimulus (image input and speech input) and trigger (start) a learning.

Otherwise, a large value may be so set as a threshold when an object is remarked as to attenuate under a certain condition, for example, with time elapse. Also, a remarkability level may be set for two or more objects at the same time. The remarkability level is set at to a motion of an object or a speech. For example, a remarkability level of a motion may be set for one object while a remarkability level of a speech may be set for the other object.

Thus, while a remarked object (specific area) is being examined (for example, features such as color, shape, etc. Are being examined), a remarkability level can be set for any other object by another stimulus (e.g., speech or image). It should be reminded here that since an object currently being remarked has a higher remarkability level as mentioned above, an objected previously selected can continuously be examined for a while even when a remarkability level is set for another object is set by such another stimulus.

When the remarkability of an object being currently remarked has attenuated, attention of the robot 1 may be turned to an object having another stimulus, namely, an object whose remarkability has increased.

Also, the shared attention can be effected with a motion of a target object as a stimulus as well as with the user's or trainer's finger as a stimulus. That is to say, an object pointed by the finger can be identified as a target object.

The aforementioned shared attention is as experienced in an ordinary interaction between persons. In this case, a skin-color area, for example, detected through the segmentation is taken as a specific area and attention is paid to the area, as will be described below with reference to FIG. 37.

Figure 37A:
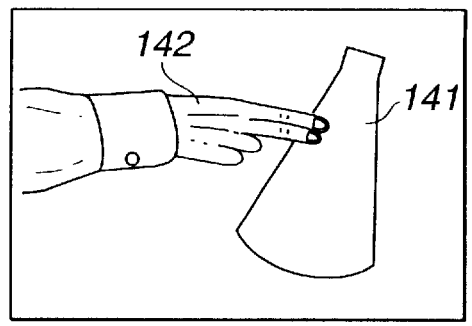
FIGS. 37A to 37E explains a shared learning for recognition of a target object by pointing the finger.

As shown in FIG. 37A, it is assumed that there has been picked up an image in which a person points to a cone 141 with the hand 142 in an environment. Note that in the processing which will be described below, an object may be subjected to an image processing, for example, by supplying it to a low pass filter, in view of the speed of computation etc.

Figure 37B:
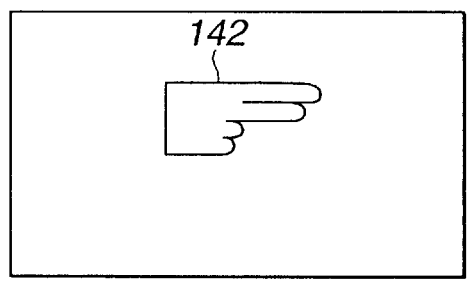

A skin-color portion is extracted from the image. In this case, a color feature space is used to detect a feature f the skin-color portion and extract the skin-color portion from the image. Thus, the hand 142 is extracted as shown in FIG. 37B.

Figure 37C:
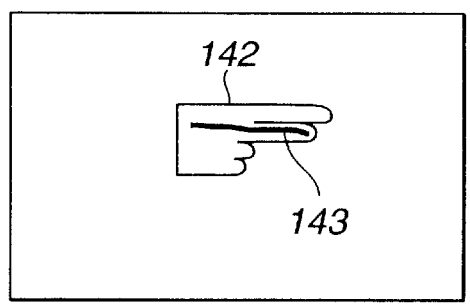

Then, the longitudinal direction of the hand 142 is determined as shown in FIG. 37C because the shape of the hand pointing to an object is generally rectangular. For example, the longitudinal direction is determined as indicated with a line 143 in FIG. 37C.

Figure 37D:
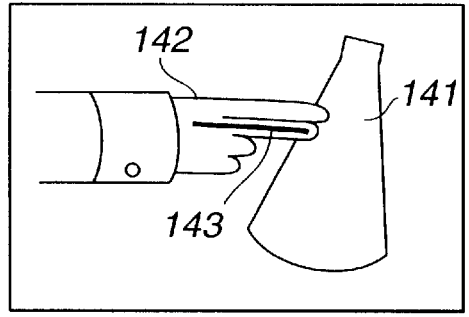
Figure 37E:
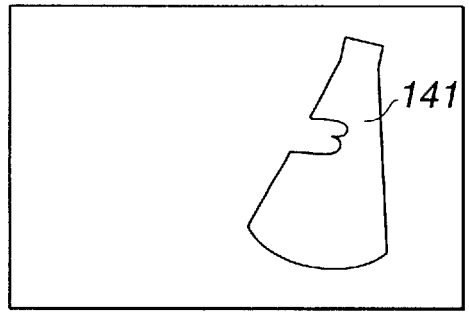

Further, the longitudinal direction thus determined is set in the original image as shown in FIG. 37D to identify the object as shown in FIG. 37E. That is, a cone 141 pointed by the finger is identified. For example, an image of the ends of fingers is taken out as a sample, the color of the image is identified in the color feature space, to thereby identify an area having the color. Thereby it is possible to identify the cone 141 having the same color, for example, yellow.

Also, the shared attention is not limited to the aforementioned one, but it may be such that attention is paid to an object to which the sightline of the trainer or user is directed, for example.

Also, there may be provided a means for checking whether the robot 1 is making a shared attention. That is, when a target object is identified by the shared attention, the robot 1 makes predetermined action. For example, when the robot 1 has identified (traced) an object shaken for teaching to the robot 1, it is caused to make action such as shaking or nodding the head, thereby informing the user or trainer that the robot 1 has identified the object. Thus, the trainer or user can confirm whether the robot 1 has successfully traced or identified the object the trainer has shown to the robot 1 for teaching.

As in the above, the robot 1 can evaluate its own action through such an interaction with the user or trainer and learn the most appropriate action for itself.

Also, the robot 1 can store action in association with any other stimulus such as a speech to a sensor to make the action only in response to the speech.

Figure 38:
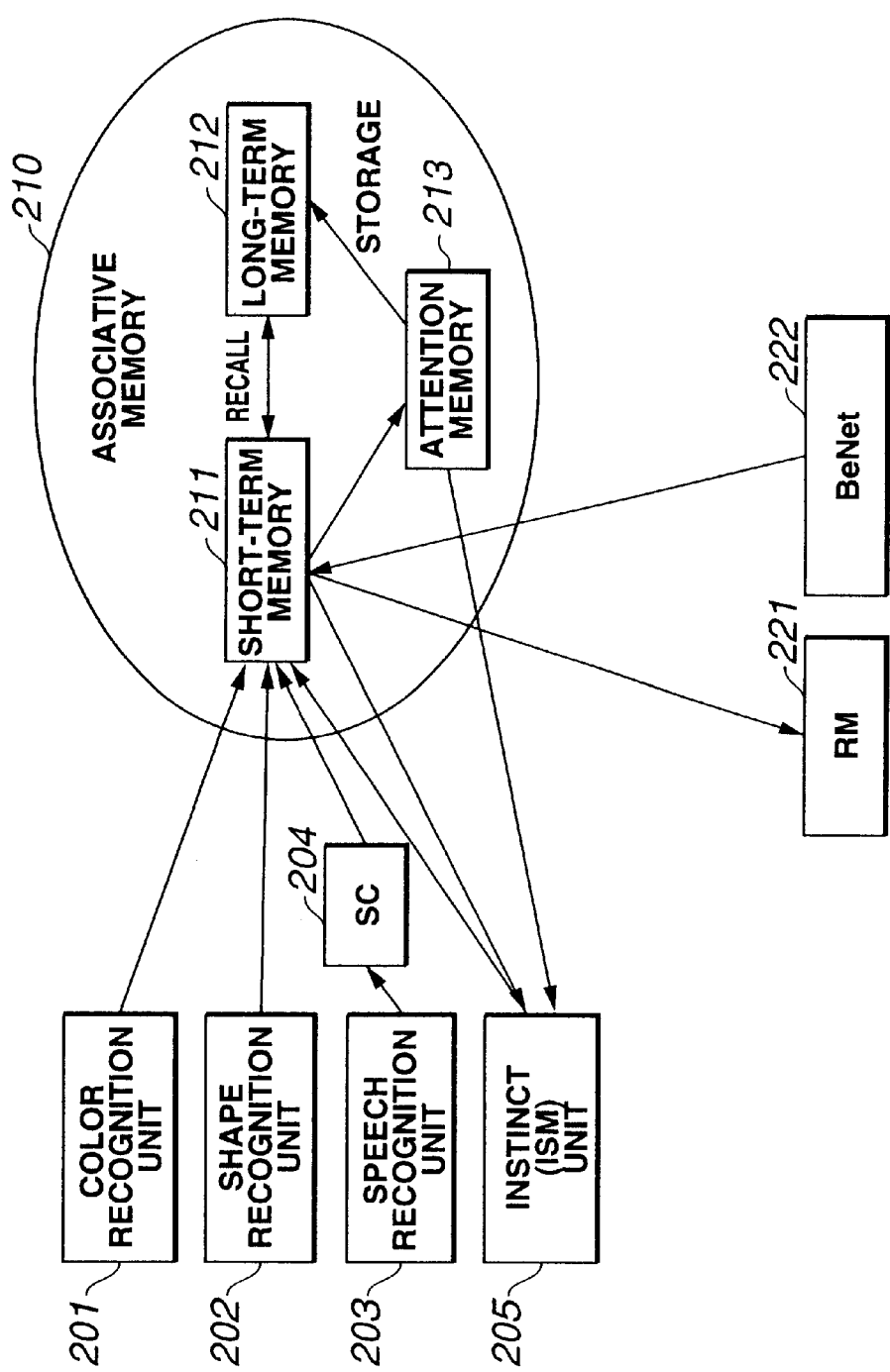
FIG. 38 is a schematic block diagram of the associative memory system.

Next, the associative memory system will be described in detail with reference to FIG. 38. The associative memory system shown in FIG. 38 is designed to store and recall four perception channel input patterns (color, shape, speech and instinct). As will be seen from FIG. 38, some patterns or prototypes are prepared in advance for entry to each of channels including a color recognition unit 201, shape recognition unit 202, and a speech recognition unit 203, and for example a binary ID (identification information) is appended to each of the prototypes. Each of the recognition units 201 to 203 recognizes to which one of the prototypes an input pattern corresponds, and outputs IDs of the input patterns, namely, a color prototype ID, shape prototype and speech prototype, to a short-term memory 211 of an associative memory 210. A speech prototype ID from the speech recognition unit 203 is passed through a semantics converter (SC) 204 to the short-term memory 211 to which a phoneme sequence is also sent to the short-term memory 211 at the same time. The semantics converter (SC) 204 makes a semantical and grammatical tagging. Concerning the instinct, an internal states model (ISM) unit 205 provides a variation (delta value) of an instinct (e.g., curiosity) as an analog value to the short-term memory 211 of the associative memory 210.

The associative memory 210 includes the short-term memory 211, long-term memory 212 and an attention memory 213. Further, in the associative memory system, there are provided a release mechanism (RM) 221 and behavior network (BeNet) 222 associated with the short-term memory 211. The RM (release mechanism) 221 and BeNet (behavior network) 222 are also called "action generator".

In the associative memory system shown in FIG. 38, the color recognition unit 201 appends a color prototype ID to each object segmented by a color segmentation module and supplies the data to the associative memory 210. The speech recognition unit 203 outputs a prototype ID of a word uttered by the user or trainer and sends it along with a phoneme sequence of the utterance to the associative memory 210. Thus, the storage and association enables to the robot 1 to utter the word. Input information from each channel is stored in the short-term memory 211 in the associative memory 210 and held for a predetermined time, for example, for a time equivalent to a hundred objects.

The associative memory 210 recalls whether an input pattern has been stored therein in the past. If the associative memory 210 can recall it, it will send the input pattern as it is to the RM 221 and BeNet 222. When the associative memory 221 can recall it, it will append a recalling direction to the input pattern and send the data to the RM 221 and BeNet 222.

The BeNet 222 checks a flag (shared attention flag) from a color segmentation module in the color recognition unit 201, converts, to a latch command, whether or not there exists a shared attention made by finger-pointing by the user as in the above, and sends the latch command to the associative memory 210. Supplied with the latch command from the BeNet 222, the associative memory 210 makes a frame-number based search for an object matching the frame number, and stores the object into the attention memory 213. If the delta value of the instinct is sufficiently large, it is stored from the attentional memory 213 to the long-term memory 212. The delta value of the instinct can take an analog value such as 0 to 100. By storing a delta value of 80, a value "80" can be recalled.

Figure 39:
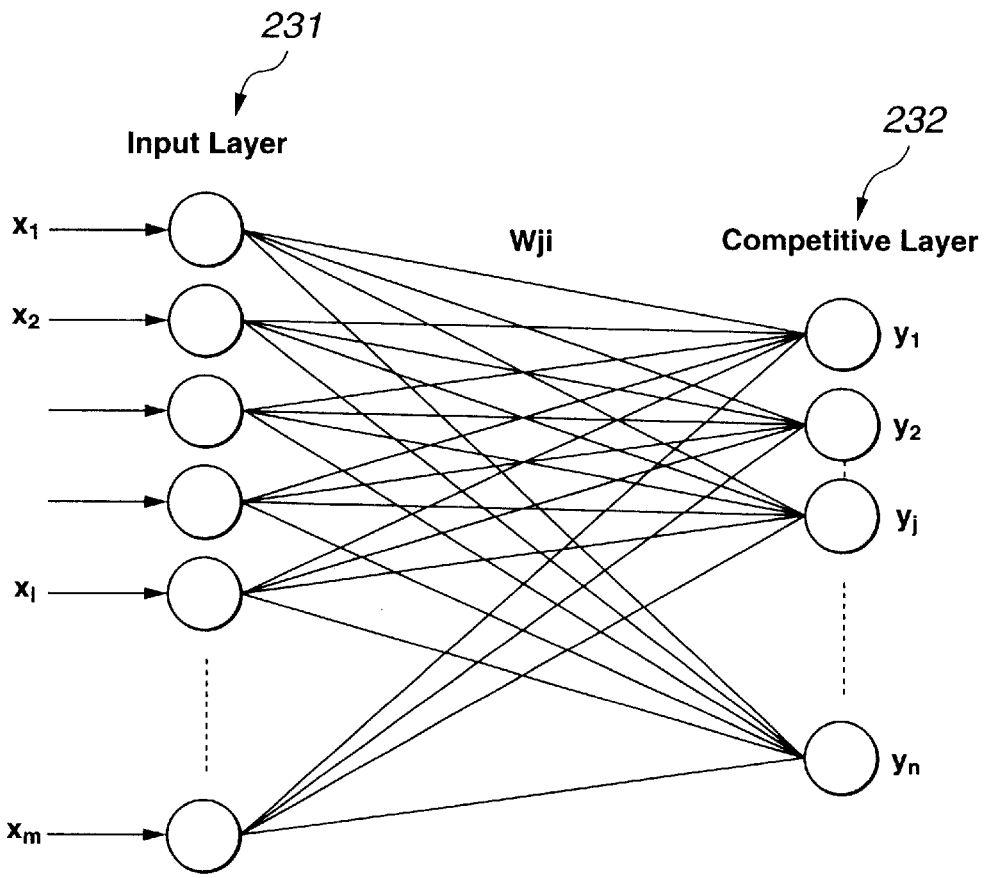
FIG. 39 shows an example of a competitive learning neural network of a two-layer hierarchical type used in the associative memory system in FIG. 38.

Next, the associative memory will be described in detail with reference to FIG. 39 showing an example of a two-layer hierarchical neural network. The example shown in FIG. 39 is a competitive learning network including an input layer 231 as the first layer and a competitive layer 232 as the second layer and in which the weight of association between the i-th unit (neuron) of the input layer 231 and the j-th unit of the competitive layer 232 is $W_{ji}$. This competitive learning network works in two modes: memory and recall. In the memory mode, an input pattern is competitively stored, and in the recall mode, a pattern stored in the past is recalled from a partial input pattern. There are provided at the input side a number m of neurons correspondingly to inputs $x_1$, $x_2, \ldots, x_m$ of the color, shape, speech and instinct. For example, when 20 neurons are provided for each of color prototype ID, shape prototype ID and speech prototype ID and 6 neurons are provided for the instinct type, the neurons count a total of 66 (20+20+20+6). Each of the neurons in the competitive layer 232 depicts one symbol, and the number of neurons in the competitive layer 232 is equal to a number of neurons or patterns which can be stored. In the competitive learning network, the prototype IDs and instinct type can be combined in 48,000 patterns (=20×20×20×6). For example some 300 neurons should practically be provided in the competitive learning network.

Next, the memory mode will be explained. It is assumed here that the weight $W_{ji}$ of association between the input layer 231 and competitive layer 232 takes a value between 0 and 1. An initial association weight is determined at random. The storage (memory) is done by selecting a one of the neurons, having won the competition in the competitive layer, and increasing the force of association between the selected neuron and input neuron (association weight $W_{ji}$). When a prototype ID corresponding to a neuron $x_1$ for example (first color prototype ID) is recognized for an input pattern vector $[x_1, x_2, \ldots, x_n]$, the neuron $x_1$ is triggered, and then neurons similarly recognized for the shape and speech will be triggered sequentially. The triggered neuron takes a value "+1" while the neuron not triggered takes a value "−1".

A value of the output (competitive) neuron $y_j$ is determined for the neuron $x_1$ at the input side by computing the following equation (29):

$$y_j = \sum_{i=0}^{numOfInput} W_{ji} x_i \qquad (29)$$

Also, a neuron which will win the competition is determined from the following:

$\max\{y_i\}$

The association between the winner neuron and input neuron is renewed under the following Kohonen update rule:

$\Delta W_{ji} = \alpha(x_1 - W_{ji})$ where α: Coefficient of learning $$W_{ji}(\text{new}) = \Delta W_{ji} + W_{ji}(\text{old})$$

The result is normalized by L2Norm to provide the following equation (30):

$$W_{ji}(new) = \frac{W_{ji}(new)}{\sqrt{\sum_{i=0}^{numOfIput} W_{ji}^2}} \quad (30)$$

The association weight indicates a so-called intensity of learning, and it is a "memory".

In this competitive learning network, the learning coefficient is a α=0.5. A pattern once stored can be recalled nearly without fail when a similar pattern is subsequently presented to the network.

Note that the associative memory should be such that in the process of a consecutive learning, the memory of a pattern stored frequently will be stronger while the memory of a one not stored so frequently will be weak. Such an associative memory is applicable in this embodiment. That is, the memory can be thus adjusted by tuning the learning coefficient and associative memory. For example, when a small coefficient of learning is set for a pattern, an epoch for a correspondingly stronger memory is required. Also, it is possible to lower the learning coefficient correspondingly to an epoch, for example, to lower a coefficient of learning initially set large for a pattern as the epoch is larger. Thus, the memory of a pattern presented not so frequently is not renewed many times, with the result that the memory will become vague, a pattern other than a stored one will be recalled or a recalling threshold cannot be reached for recalling. However, since it is possible to acquire a new symbol or pattern accordingly, a flexible associative memory system can be implemented even if its capacity is limited.

Next, the recall mode will be explained.

It is assumed here that a certain input pattern vector [$x_1$, $x_2$, ... $x_n$,] is presented to the associative memory system. The input vector may be either a prototype ID or a likelihood or probability of the prototype ID. The value of output (competitive) neuron $y_j$ is determined by computing the aforementioned equation (29) concerning the neuron $x_1$ at the input side. Depending upon the likelihood of each channel, the triggering value of the competitive neuron also depicts a likelihood. It is important that likelihood inputs from a plurality of channels can be connected together to determine a general likelihood. In this embodiment, only one pattern is recalled and a winner neuron is determined by computing the following:

$$\max\{y_j\}$$

The number for a neuron thus determined corresponds to a number for a symbol, and an input pattern is recalled by computation of an inverse matrix. That is:

$$Y = W \cdot X$$

$$X = W^{-1} \cdot Y = W^T \cdot Y$$

Next, the number of input pattern presentations and coupling coefficient will be described.

In this embodiment, the coefficient of learning is set high and turned to store a presented pattern at a stroke. The relation between the number of attempts of learning and coupling coefficient at this time is examined. The coefficient of coupling between an input pattern and a symbolic neuron in the competitive layer can also be determined by computing the equation (29).

Figure 40:
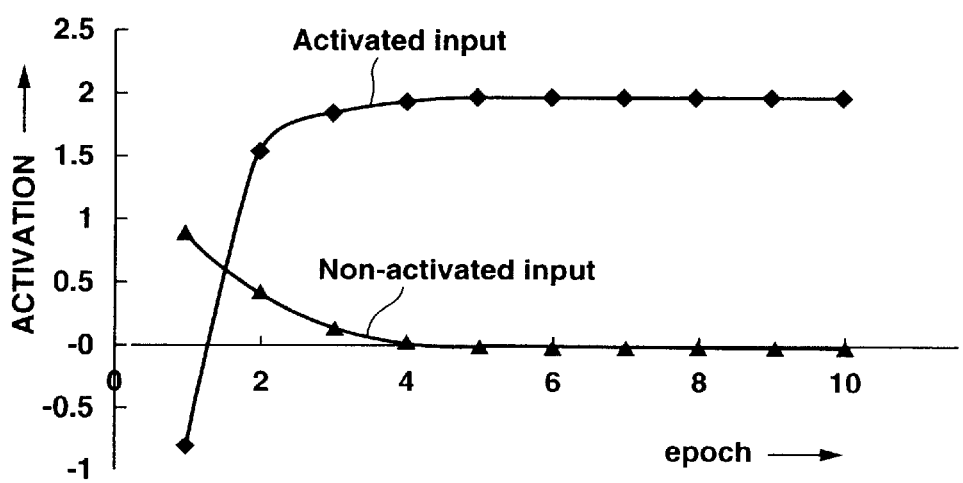
FIG. 40 shows an example of the variation, due to an epoch, of an association between an input neuron activated by an input pattern and a one not activated, and a neuron in the competitive layer.

FIG. 40 shows a relation (active input) between a neuron activated by an input pattern and a neuron in the competitive layer, having acquired a symbol, and a relation (non-active input) between a neuron not activated and a neuron in an associative layer. In FIG. 40, the horizontal axis indicates an epoch while the vertical axis indicates an activation. As seen from FIG. 40, in case of an active input, the larger the epoch, the stronger the association between an input pattern and symbolic neuron becomes. It is because the memory is largely renewed at the first epoch that the association is suddenly enhanced at the second epoch. The curve of the active input will be made gentle by setting a lower learning coefficient. In case of a non-active input, however, the association with a neuron not activated by a new pattern is weaker.

Note that an associative memory system may be built with consideration given to the epoch as well as to a frequency of presentations for a pattern presented frequently should preferably be stored on the priority basis because the storage capacity is fixed (limited). In connection with this point, it is preferable to introduce a forgetting function. For example, a pattern having been stored by mistake due to a nonlinear factor such as a noise from the recognition unit has only to be presented once but may not be stored, and it is more preferable to store a newly presented important pattern while forgetting a pattern of which the epoch is small and the frequency of presentation is low.

It should be reminded that in this embodiment, the coefficient of learning is fixed and it is made based on a threshold to check if an input pattern is a new one or not, but the learning coefficient may be varied and it may be formulated to determine a threshold.

Next, the response to many input patterns will be described.

The results of tests made on the operations of the associative memory system when various patterns are supplied thereto are shown in Table 1.

TABLE 1

| Color | Shape | Speech | Instinct | Remarks | Evaluation |
|-------|-------|--------|----------|---------|------------|
| 1 | 1 | 1 | 1 | Memory | OK |
| 2 | 2 | 2 | 1 | Memory | OK |
| 2 | 2 | (2) | (1) | Recall | OK |
| (2) | (2) | 2 | (1) | Recall | OK |
| 1 | 3 | (1) | (1) | Recall (only color is known) | OK |
| 1 | 3 | 3 | 1 | Memory | OK |
| 1 | 3 | (3) | (1) | Recall | OK |
| 4 | 4 | 1 | 1 | Memory | OK |
| 4 | 4 | (1) | (1) | Recall | OK |
| (1) | (1) | 1 | (1) | Recall (thing first stored) | OK |
| 4 | 4 | 1 | 1 | Memory | OK |
| (4) | (4) | 1 | (1) | Recall (memory is enhanced) | OK |
| 3(1) | 3 | (3) | 1 | Recall (unknown pattern is supplied) | OK |
| 5 | 5 | 5 | 1 | Memory | OK |
| 6 | 6 | 6 | 1 | Memory | OK |
| 2 | 2 | 7 | 1 | Memory | OK |
| (2) | (2) | 2 | (1) | Recall | OK |
| 2 | 2 | (7) | (1) | Recall | OK |
| 7 | 7 | 0 | 2 | Memory | OK |

In Table 1, a prototype ID of each of color, shape, speech and instinct is indicated with a number like 1, 2, ... while a recalled prototype ID is indicated with a parethesized number like (1), (2), As will be seen from Table 2, when a color "1" and shape "3" are supplied by the fifth presentation after an input pattern [1, 1, 1, 1] is initially stored, a pattern [1, 3, (1), (1)] is recalled based on the color 1 alone. However, by the seventh presentation after a pattern [1, 3, 3, 1] is stored by the sixth presentation, a pattern [1, 3, (3), (1)] is recalled in response to entry of a color "1" and shape "3".

When the storage capacity is 20 symbols, 20 types of input patterns as shown in Table 2 are normally be stored, but when more than 20 kinds of input patterns (400 patterns in total) as shown in Table 3 are presented, symbols early stored like[1, 1, 1, 1] be overwritten while patterns learned later are will held as a memory.

TABLE 2

| Color | Shape | Speech | Instinct | Evaluation |
|-------|-------|--------|----------|------------|
| 1 | 1 | 1 | 1 | OK |
| 2 | 2 | 2 | 2 | OK |
| 3 | 3 | 3 | 3 | OK |
| ... | ... | ... | ... | OK |
| 19 | 19 | 19 | 19 | OK |
| 20 | 20 | 20 | 20 | OK |

TABLE 3

| Color | Shape | Speech | Instinct |
|-------|-------|--------|----------|
| 1 | 1 | 1 | 1 |
| 1 | 2 | 2 | 1 |
| 1 | 3 | 3 | 1 |
| ... | ... | ... | ... |
| 1 | 20 | 20 | 1 |
| 2 | 1 | 1 | 1 |
| ... | ... | ... | ... |
| 2 | 20 | 20 | 1 |
| ... | ... | ... | ... |
| 20 | 20 | 20 | 1 |

As shown in Table 3, only 20 symbols learned before a last learned one can be acquired (held).

On the assumption that whether a symbol is a new one is judged based on a condition that "an input pattern in which two or more neurons are different in activation" plurality of things different in any of color and shape for example from each other cannot be named identically to each other. However, in case the things are different in both color and shape from each other, they can be named identically to each other. That is to say, patterns [1, 1, 1, 1] and [2, 1, 1, 1] cannot be stored at the same time, but patterns [1, 1, 1, 1] and [2, 2, 1, 1] can be stored together. In this case, all input patterns as shown in Table 4 can be stored.

TABLE 4

| Color | Shape | Speech | Instinct |
|-------|-------|--------|----------|
| 1 | 1 | 1 | 1 |
| 2 | 2 | 1 | 1 |
| 3 | 3 | 1 | 1 |
| ... | ... | 1 | 1 |
| 20 | 20 | 1 | 1 |

In the associative memory system as having been described in the foregoing, since the storage capacity is limited, it should be utilized efficiently. To this end, patterns frequently presented or used should preferably be stored the priority basis.

Also it is preferable that in view of the storage capacity, it should made possible to forget a pattern having not to be stored while storing a new input pattern which is important. To this end, the following coupling-coefficient forgetting function f should be used:

$$W_{new} = f(W_{old})$$

where $W_{new}$ is a new coupling coefficient and $W_{old}$ is an old coupling. The most simple forgetting function is to reduce the coefficient of coupling with the loser neuron in the competitive layer each time a pattern is presented. For example, the new coupling coefficient $W_{new}$ may be determined as follows by the use of an old coupling coefficient $W_{old}$ and forgetting coupling coefficient $W_{forget}$:

$$W_{new} = f(W_{old}) = W_{old} - W_{forget}$$

Thus, the coupling with a pattern not presented is weakened and it is possible to forget an unimportant pattern not frequently used. For a humanoid robot, it is natural and preferable to set a forgetting function fbased on the findings in the field of the human cerebrophysiology.

This embodiment has been described concerning the storage of a word (noun). However, it is preferable to consider the storage of meaning and episode and acquisition of a verb. For example, a word "kick" is acquired through acquisition of "kicking" action.

To judge whether an input pattern is a new one, a threshold is set for the activation of a winner neuron in the competitive layer. However, since it is necessary to re-tune the activation as the number of input channels increases, it is preferable to automatically compute an activation in the course of a program being executed for example.

Furthermore, in case the number of input channels has increased up to a multi-modality, it is preferable to consider the normalization of each channel.

Next, decision of behavior of the robot according to the present invention will be described concerning the ISM (internal states model) unit 205 in FIG. 38. That is, in a robot in which an ethological approach is applied to decide behavior, an operation test for examining the action creation is effected based on an external cause factor and internal cause factor as will be described in detail here below.

In this embodiment, there are used eight gauges for the internal states and eight instincts corresponding to the gauges, respectively. The eight gauges include Nourishment, Movement, Moisture, Urine, Tiredness, Affection, Curiosity and Sleepy, and the eight instincts include Hunger, Defecation, Thirst, Urination, Exercise, Affection, Curiosity and Sleepy.

The internal state varies with a time elapse informed by the biorhythm for example or with a sensor input and success/failure in. The range of the variation is 0 to 100, and the degree of the variation depends on a coefficient in personality_gauge.cfg and personality_perception.cfg for example.

Also, a Frustration is created when no can be made even with a desire having reached the maximum value, and it is cleared when the gauge is varied by as expected.

Figure 41:
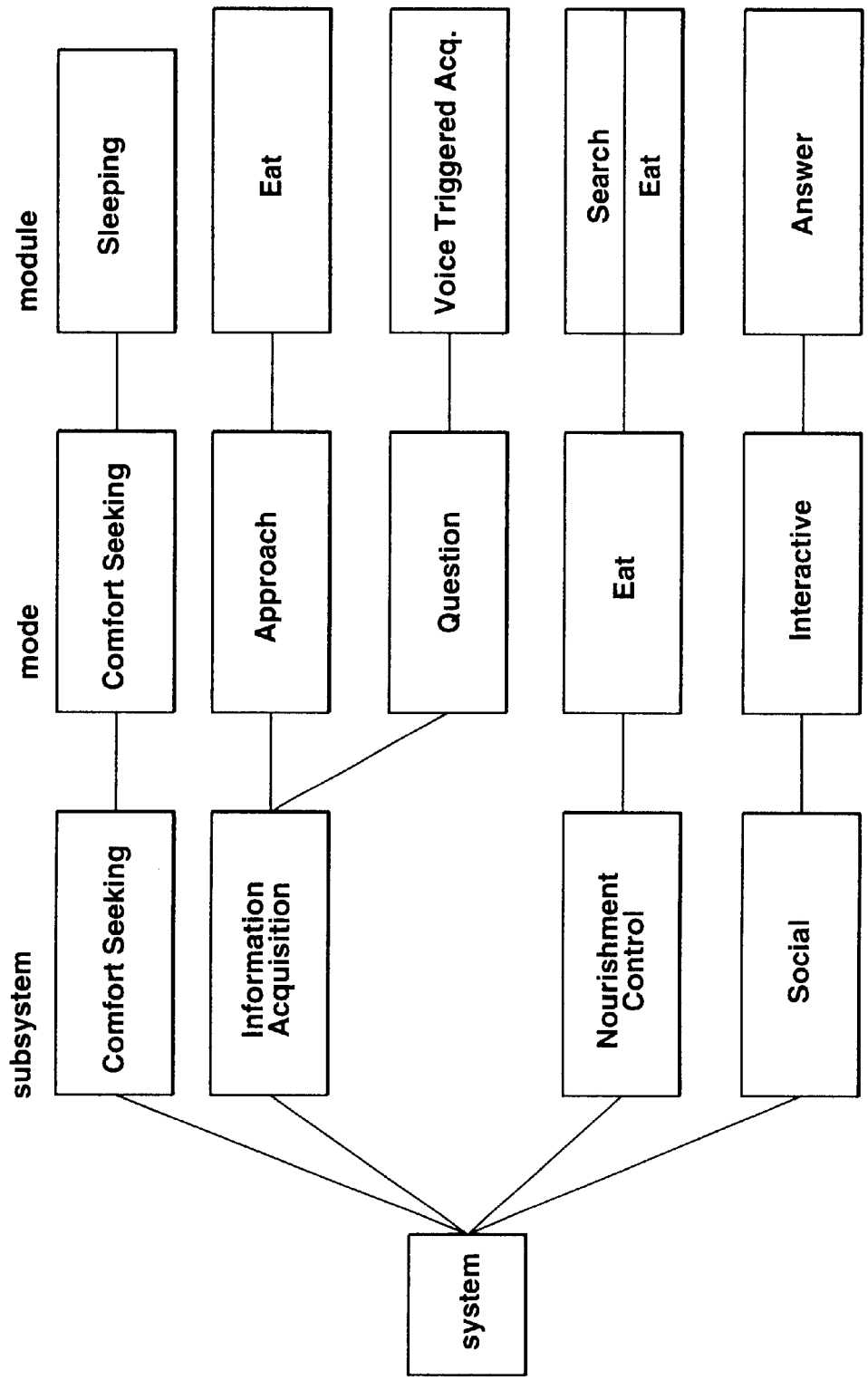
FIG. 41 shows a contents tree of hierarchical action decision system used for testing the action deciding operation of the robot apparatus.

In this operation test, a contents tree formed from a hierarchical structure (tree structure) of plural pieces of as shown in FIG. 41 is used as action selection/decision system adopting the ethological approach. The contents tree includes, from top to bottom, a system, subsystems, modes and modules. The plural pieces of action in the higher layer are abstract ones such as a desire, while those in the lower layer are concrete ones to accomplish such a desire. The tree shown in FIG. 41 is designed for minimum action based on an ethological model, switching to a tree using a speech recognition and an operation test, and a test for the learning. The operation test is made with the instincts supported by the tree in FIG. 41, that is, including Hunger, Affection, Curiosity, and Sleepy, and corresponding gauges including Nourishment, Affection, Curiosity and Sleepy. Note that in an actual operation test, a code is used to indicate a criteria for success or failure in execution of a module and a linear correspondence is used between the gauge and instinct but the present invention is not limited to these means.

In this embodiment, an emotion is expressed along a plurality of axes. More specifically, Activation and Pleasantness are used as the axes, and in addition Certainty is used. Namely, an emotion is expressed along these three axes, namely, three-dimensionally. The Activation is an extent to which a creature is activated or sleeping and which depends upon the biorhythm found mainly in the creatures, the Pleasantness is an extent indicating how much an instinct is fulfilled or not fulfilled, and the Certainty is an extent indicating with how definite a thing to which the robot is currently paying attention is. To determine the Pleasantness, the aforementioned eight gauges and eight instincts are used (however, up to four gauges and four instincts are used in the operation test). Each of the Activation, Pleasantness and Certainty takes a value falling within a range of −100 to 100, and the Pleasantness and Certainty vary with time elapse so as to always take a value "0". Also, the Activation included in the instincts takes a value "0" and the biorhythm takes an initial value as it is.

A fulfillment of an instinct is reflected by the Pleasantness. The Certainty with a vision object is used as it is when there is a thing to which the robot is paying attention. The Activation basically depends upon a value of the biorhythm, but when the Sleep has varied, the Activation is varied with the result of the Sleep variation.

In this embodiment, the above operation is restricted such that the biorhythm is reflected only by the Activation and the Certainty is varied within a range of 0 to 100 in this case. Of course, however, the present invention is not limited to these means.

Figure 42:
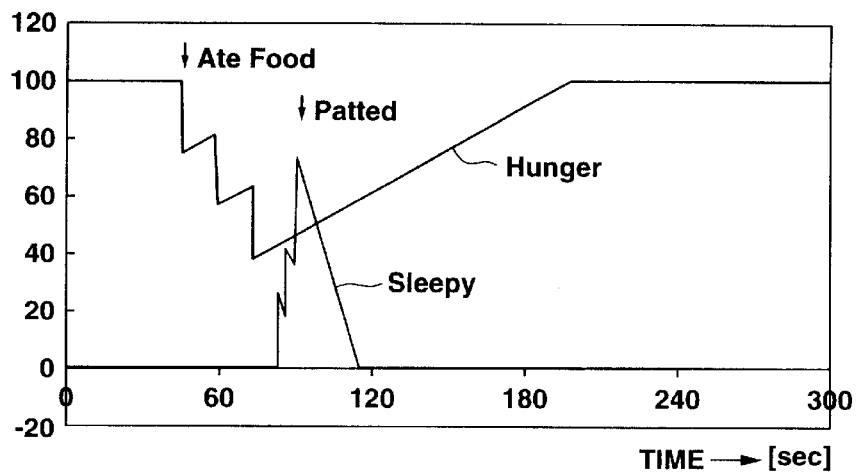
FIG. 42 shows time changes of Hunger and Sleepy included in the instincts in the first operation test.

Next, a first example of the operation test will be described concerning results of Sleep and Eat with reference to FIGS. 42 to 44. In this first example, changes of Search/Eat and Sleeping by a module in the contents tree in FIG. 41 are examined with the instincts other than the Hunger and Sleepy being fixed. FIG. 42 shows time changes of the Hunger and Sleepy included in the instincts, FIG. 43 shows time-changes of the Activation, Pleasantness and Certainty included in the emotions, and FIG. 44 shows time changes of the Sleep and Eat as motivations.

Figure 43:
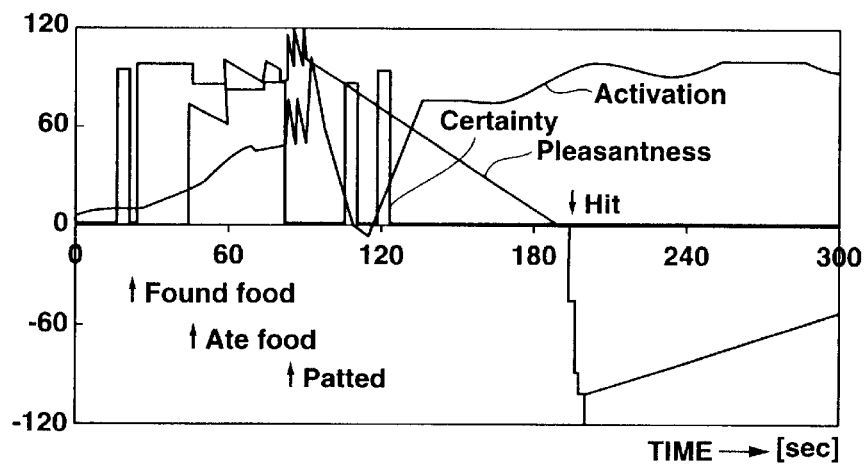
FIG. 43 shows time changes of Activity, Pleasantness and Certainty included in the emotions in the first operation test.
Figure 44:
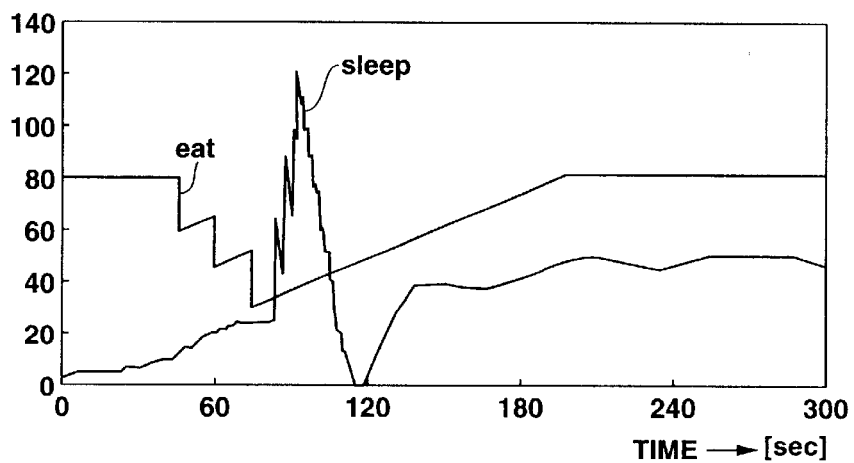
FIG. 44 shows time changes of Sleep and Eat as motivations in the first operation test.

As will be seen from FIGS. 42 to 44, patting pen-nits to shift the robot to a Sleep tree, and hitting permits to let the robot go out of the Sleep tree (not shown). When the Hunger increases, the robot can go to the Eat tree. When the Hunger is appeased, the robot can shift to the Sleep tee. The reason why the Activation will not be changed even when the robot is hit, is that the instinct is not changed since the Sleep is minimum, namely, it is −100. After the Hunger becomes maximum, that is, it becomes 100, the Frustration will have an increased value (not shown) so that the Pleasantness will be increased somewhat gently.

Figure 45:
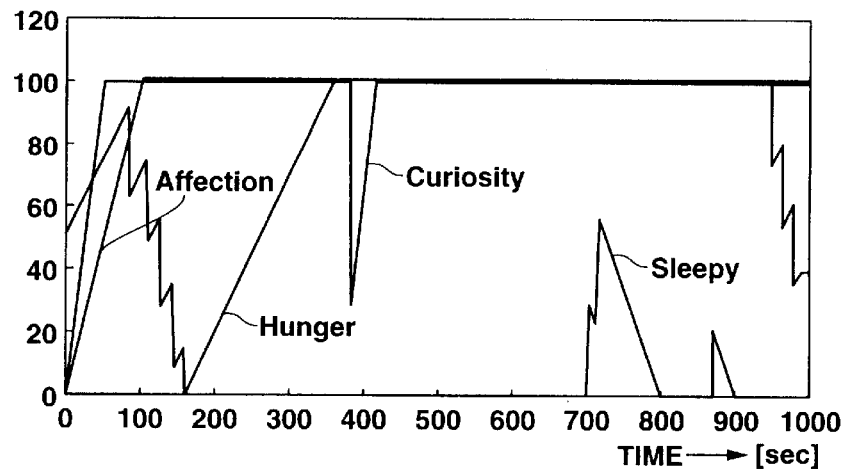
FIG. 45 shows time changes of the instincts in the second operation test.
Figure 46:
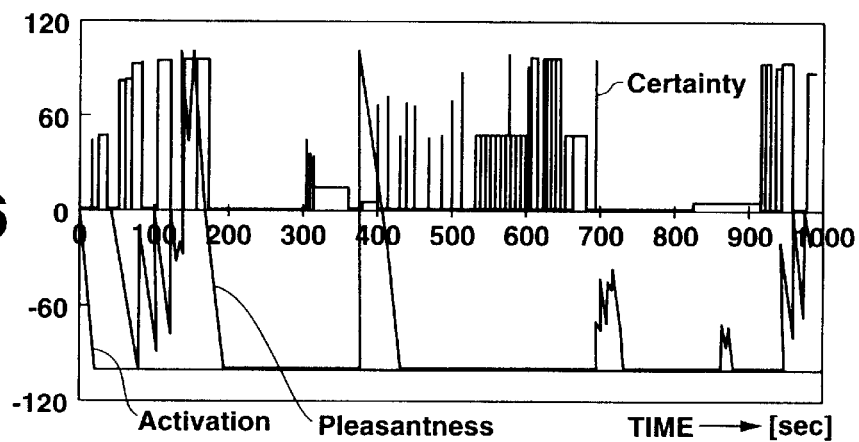
FIG. 46 shows time changes of the emotions in the second operation test.
Figure 47:
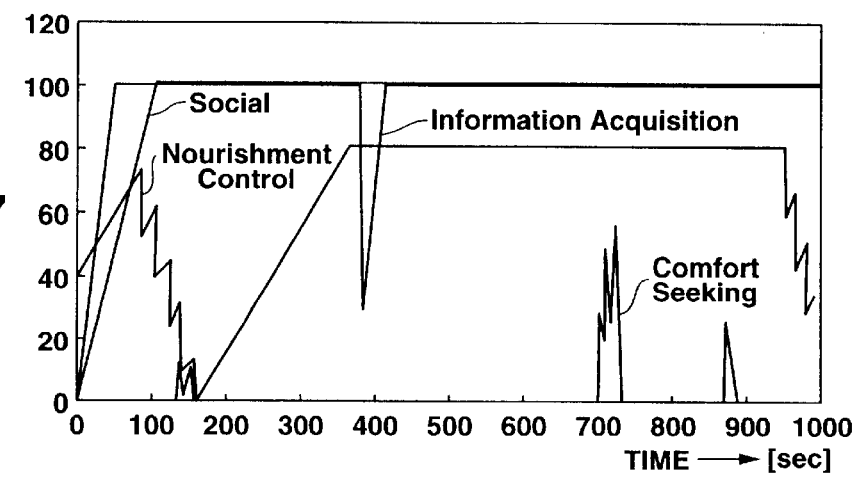
FIG. 47 shows time changes of a release mechanism (RM) in the second operation test.

Next, a second example of the operation test will be described in which the four gauges including the Nourishment, Affection, Curiosity and Sleepy and the corresponding instincts are used. FIGS. 45 to 47 show changes of the robot behavior and changes in value of the instincts in the contents tree shown in FIG. 41. FIG. 46 shows time change of the emotion, and FIG. 47 show time changes of the release mechanism.

As shown in FIGS. 45 to 47, shift to the Sleep tree by patting the robot, shift to the Eat tree due to the Hunger, and shift to information acquisition due to the Curiosity are done effectively. When no action is made even with the Curiosity included in the instincts is maximum (100), the Pleasantness has been changed rather to the unpleasantness. Further, when the Sleep is increased by patting the robot, the Pleasantness is improved and thus Comfort is sought.

The results of the operation tests show that the action selection/decision system in which the ethological approach based on the contents tree shown in FIG. 41 operates effectively.

INDUSTRIAL APPLICABILITY

As having been described in the foregoing, in the robot according to the present invention, information supplied just before or after a touch is detected by a touch sensor is detected by an information detector, action made correspondingly to the touch detection by the touch sensor is stored in association with the input information detected by the input information detector into a storage unit, action is recalled by action controller from the information in the storage unit based on newly acquired input information, the action is made to store the input information and action acquired when the input information has been detected in association with each other, and corresponding action is made when identical input information is supplied again.

The action controlling method adopted in the robot according to the present invention includes the steps of detecting a touch made to the robot; detecting information supplied just before or after the touch detection in the touch detecting step; storing action made correspondingly to the touch detection in the touch detecting step and input information detected in the input information detecting step in association with each other into a storage unit; and recalling action from the information in the storage unit based on newly acquired input information to control the robot to do the action.

In the robot according to the present invention, input information and action made when the input information has been detected are stored in association with each other, and when information identical to the input information is supplied again, corresponding action can be made.

Also, in the robot according to the present invention, action result information indicative of the result of action made correspondingly to input information detected by an input information detector and the input information itself are stored in association with each other into a storage unit, action result information in the storage unit is identified by action controller based on new input information, action is made based on the action result information, the input information and the action result information indicative of the result of the action made correspondingly to the input information are stored in association with each other, and when identical input information supplied again, past action can be recalled based on the corresponding action result information to make appropriate action.

The action controlling method adopted in the robot according to the present invention includes the steps of storing action result information indicative of the result of action made correspondingly to input information detected by an input information detector and the input information itself in association with each other into a storage unit; and identifying action result information in the storage unit based on new input information to control the robot to make action based on the action result information.

In the robot according to the present invention, input information and action made correspondingly to the input information are stored in association with each other, and when information identical to the input information is supplied again, past action can be recalled based on the corresponding action result information to make appropriate action.

Also, in the robot according to the present invention, a feature of input information detected by an input information detector is detected by a feature detector, the input information is classified by an information classification unit based on the feature, the robot is caused by action controller to act based on the classification of the input information, the classification of the input information having caused the robot action is changed by a classification changer based on action result information indicative of the result of the action made by the robot under the control of the action controller, and the robot is made to act correspondingly to the classification of the input information, thereby permitting to change the classification of the input information based on the result of the action of the robot.

The action controlling method adopted in the robot according to the present invention includes the steps of detecting a feature of input information detected by an input information detector; classifying the input information based on the feature detected in the feature detecting step; controlling the robot to act based on the classification of the input information, made in the information classifying step; and changing the classification of the input information having caused the robot action based on action result information indicative of the result of the action made by the robot controlled in the action controlling step.

The robot according to the present invention can act correspondingly to classification of input information and change the classification of the input information based on the result of the robot action.

Also, the robot according to the present invention stores information on a target object identified by a target object identification unit into a storage unit, acts based on a newly detected object and information on the target object, stored in the storage unit to store the target object, and thus acts in a predetermined manner when an identical object is supplied again.

Also, the action controlling method adopted in the robot according to the present invention includes the steps of identifying a target object; storing information on the target object identified in the target object identifying step into a storage unit; and controlling the robot to act based on a newly detected object and the information on the target object, stored in the storage unit.

The robot according to the present invention stores a target object, and when an identification target is supplied again, it can act in a predetermined manner.

Also, the robot according to the present invention includes moving members, joints to move the moving members, detectors each for detection of the state of the joint to which an external force is applied via the moving member, and a learning unit to learn the joint state detected by the detector and external force in association with each other, so that the state of the joint to which an external force is applied via the moving member can be detected by the detector and the joint state detected by the detector and external force can be learned in association with each other by the learning unit. That is, the robot can learn an external force in association with adjoint state which varies correspondingly to the external force acting on a moving member.

Also, the external force detector according to the present invention includes a detector to detect the state of a joint which moves a moving member, and an external force detector to detect an external force acting on the moving member based on the joint state detected by the joint state detector, so that the state of the joint which moves the moving member can be detected by the joint state detector and the external force acting on the moving member can be detected based on the joint state detected by the joint state detector. Namely, the external force detector can detect an external force acting on a moving member based on the state of a joint which moves the moving member.

Also, the external force detecting method according to the present invention includes the steps of detecting the state of a joint which moves a moving member, detecting an external force acting on the moving member based on the detected joint state, and detecting the external force acting on the moving member based on the state of the joint which moves the moving member.

Note that the present invention is not limited to the embodiments having been described in the foregoing and the examples of the associative memory system and contents tree for the operation test being non limitative and illustrative ones can be modified in various manners. The present invention can be modified variously without departing from the scope and spirit of the claims given later.

What is claimed is:

1. A robot apparatus comprising:

means for detecting a touch;

means for detecting information supplied simultaneously with, just before or after the touch detection by the touch detecting means;

means for storing action made correspondingly to the touch detection in association with input information detected by the input information detecting means; and means for recalling action from information in the storing means based on newly acquired information to control the robot apparatus to do the action.

2. The robot apparatus according to claim 1 wherein, the action made correspondingly to the touch detection by the touch detecting means is a result of a displacement of a moving part due to an external loading by the touch; and the touch detecting means detects a touch from a change of a control signal to the moving part due to the external loading.

3. The robot apparatus according to claim 1 further comprising means for allowing the robot apparatus to act correspondingly to the touch detection by the touch detecting means;

the storing means stores the action made correspondingly to the touch detection by the touch detecting means and input information detected by the input information detecting means in association with each other.

4. The robot apparatus according to claim 1, wherein the input information detecting means detects at least either image information or speech information.

5. A method for controlling an action of a robot apparatus, the method comprising the steps of:

detecting a touch made to the robot apparatus;

detecting information supplied simultaneously with or just before or after the touch detection in the touch detecting step;

storing action made in response to the touch detection in the touch detecting step and input information detected in the input information detecting step in association with each other into a storing device; and recalling action from the information in the storing device based on newly acquired input information to control the robot to do the action.

6. A robot apparatus comprising:

means for detecting input information;

means for storing the input information detected by the input information detecting means and action result information indicative of a result of action made correspondingly to the input information detected by the input information detecting means; and means for identifying action result information in the storing means based on a newly supplied input information to control the robot apparatus to do action based on the action result information.

7. A robot apparatus comprising:

means for detecting input information;

means for storing the input information detected by the input information detecting means and action result information indicative of a result of action made correspondingly to the input information detected by the input information detecting means; and means for identifying action result information in the storing means based on a newly supplied input information to control the robot apparatus to do action based on the action result information wherein, an emotion is changed correspondingly to an external factor and/or internal factor and action is made based on the state of the emotion;

the storing means stores the emotion state resulted from the action made based on the input information as the action result information and the input information in association with each other; and the action controlling means recalls a corresponding emotion state from the storing means based on the input information to control the robot apparatus to act based on the emotion state.

8. The robot apparatus according to claim 6, wherein the input information detecting means detects at least either image information or speech information.

9. A method for controlling an action of a robot apparatus, the method comprising the steps of:

storing action result information indicative of a result of action made correspondingly to input information detected by an input information detecting means and the input information in association with each other into a storing device; and identifying action result information in the storing device means based on newly supplied input information to control the robot apparatus to make action based on the action result information.

10. A robot apparatus comprising:

means for detecting input information;

means for detecting a feature of the input information detected by the input information detecting means;

means for classifying the input information based on the detected feature;

means for controlling the robot apparatus to do action based on the input information; and means for changing the classification of the input information having caused the robot apparatus to do the action based on action result information indicative of a result of the action made by the robot apparatus under the control of the action controlling means.

11. The robot apparatus according to claim 10, wherein the input information is image information or speech information.

12. The robot apparatus according to claim 10, wherein the classification changing means changes the classification of input information when the action result information indicates that the action result is unpleasant.

13. A method for controlling an action of a robot apparatus, the method comprising the steps of:

detecting a feature of input information detected by an input information detecting device;

classifying the input information based on the feature detected in the feature detecting step;

controlling the robot apparatus to act based on the classification of the input information, made in the information classifying step; and changing the classification of the input information having caused the robot apparatus to do the action based on action result information indicative of a result of the action made by the robot apparatus controlled in the action controlling step.

14. A robot apparatus comprising:

means for identifying a target object;

means for storing information on the target object identified by the target object identifying means; and means for controlling the robot apparatus to act based on information on a newly detected object and information on the target object, stored in the storing means.

15. The robot apparatus according to claim 14, wherein the target object identifying means segments input image information to detect a time change of the segmented area and identify an object corresponding to an area whose time change has reached a predetermined value.

16. The robot apparatus according to claim 14, wherein the target object identifying means identifies a target object based in input speech information.

17. The robot apparatus according to claim 16, wherein the target object identifying means identifies a target object from at least either sound volume or direction information of input speech information.

18. A robot apparatus comprising:

means for identifying a target object;

means for storing information on the target object identified by the target object identifying means; and means for controlling the robot apparatus to act based on information on a newly detected object and information on the target object, stored in the storing means, wherein the target object identifying means detects a sightline of a trainer teaching the target object to identify the target object from the sightline.

19. A method for controlling an action of a robot apparatus, the method comprising the steps of:

identifying a target object;

storing information on the target object identified in the target object identifying step into a storing device; and controlling the robot apparatus to act based on information on a newly detected object and information on the target object, stored in the storing device.

20. A robot apparatus comprising:

moving members, joints to move the moving members, detecting means for detecting the state of the joint to which an external force is applied via the moving member; and means for learning the joint state detected by the detecting means and external force in association with each other.

21. The robot apparatus according to claim 20 wherein, the detecting means detects an external force acting on the joint via the moving member as a state of the joint; and the learning means learns the external force detected by the detecting means and external force to the moving member in correlation with each other.

22. A robot apparatus comprising:

moving members, joints to move the moving members, detecting means for detecting the state of the joint to which an external force is applied via the moving member; and means for learning the joint state detected by the detecting means and external force in association with each other wherein, the detecting means detects a difference between a target value and measured value of the joint state; and the learning means learns the difference between the target and measured values, detected by the detecting means, and the external force in correlation with each other.

23. The robot apparatus according to claim 22 wherein the detecting means detects a change of a control signal to the joint due to the external force; and the learning means learns the changed control signal detected by the detecting means and the external force.

24. The robot apparatus according to claim 20, further comprising action controlling means for allowing the robot apparatus to act based on a result of the learning by the learning means and the joint state after the learning.

25. A robot apparatus comprising:

moving members, joints to move the moving members, detecting means for detecting the state of the joint to which an external force is applied via the moving member; and means for learning the joint state detected by the detecting means and external force in association with each other, wherein the learning means learns by a neural network including an input layer, hidden layer and an output layer.

26. An external force detector comprising:

means for detecting a state of a joint which moves a moving member; and means for detecting an external force acting on the moving member based on the joint state detected by the joint state detecting means.

27. A external force detector comprising:

means for detecting a state of a joint which moves a moving member; and means for detecting an external force acting on the moving member based on the joint state detected by the joint state detecting means wherein, the detecting means detects a difference between a target value and measured value of the joint state; and the external force detecting means detects the external force based on the difference between the target and measured values, detected by the detecting means.

28. The detector according to claim 27 wherein, the detecting means detects a change of a control signal to the joint due to the external force applied via the moving member; and the external force detecting means detects the external force based on the changed control signal detected by the detecting means.

29. A method for detecting an external force, comprising the steps of:

detecting a state of a joint which moves a moving member;

detecting an external force acting on the moving member based on the detected joint state;

detecting the external force acting on the moving member based on the state of the joint which moves the moving member.

* * * * *